(12) United States Patent
Rieder

(10) Patent No.: US 8,596,144 B2
(45) Date of Patent: *Dec. 3, 2013

(54) MEASURING SYSTEM HAVING A MEASURING TRANSDUCER OF VIBRATION-TYPE

(75) Inventor: Alfred Rieder, Landshut (DE)

(73) Assignee: Endress + Hauser Flowtec AG, Reinach (CH)

( * ) Notice: Subject to any disclaimer, the term of this patent is extended or adjusted under 35 U.S.C. 154(b) by 149 days.

This patent is subject to a terminal disclaimer.

(21) Appl. No.: 13/221,585

(22) Filed: Aug. 30, 2011

(65) Prior Publication Data

US 2012/0073384 A1 Mar. 29, 2012

Related U.S. Application Data

(60) Provisional application No. 61/344,631, filed on Sep. 2, 2010.

(30) Foreign Application Priority Data

Sep. 2, 2010 (DE) .................... 10 2010 040 168

(51) Int. Cl.
G01F 1/84 (2006.01)
(52) U.S. Cl.
USPC ...................................... 73/861.55
(58) Field of Classification Search
USPC .............. 73/861.355, 861.356, 861.357
See application file for complete search history.

(56) References Cited

U.S. PATENT DOCUMENTS

| 5,381,697 A | 1/1995 | van der Pol |
| 5,473,949 A | 12/1995 | Cage |
| 7,946,187 B2 | 5/2011 | Hussain |
| 2012/0090407 A1* | 4/2012 | Rieder et al. ............. 73/861.357 |

FOREIGN PATENT DOCUMENTS

| DE | 4224379 C1 | 12/1993 |
| DE | 19634663 A1 | 6/1997 |
| EP | 2159552 A1 | 3/2010 |
| WO | 9608697 | 3/1996 |
| WO | 02052230 A1 | 7/2002 |

OTHER PUBLICATIONS

Intl Srch Rpt, Jan. 30, 2012, The Netherlands.
English translation of IPR, Geneva, Switzerland, Mar. 14, 2013.

* cited by examiner

*Primary Examiner* — Jewel V Thompson
(74) *Attorney, Agent, or Firm* — Bacon & Thomas, PLLC

(57) ABSTRACT

A measuring system comprises a measuring transducer which includes: a transducer housing with an inlet-side flow divider having exactly four, mutually spaced flow openings and an outlet-side housing end having exactly four, mutually spaced flow openings; four measuring tubes connected to the flow dividers for guiding flowing medium along flow paths connected in parallel; an electromechanical, exciter mechanism for producing and/or maintaining mechanical oscillations of the four measuring tubes; as well as a vibration sensor arrangement reacting to vibrations of the measuring tubes for producing oscillation measurement signals representing vibrations of the measuring tubes. Transmitter electronics includes a driver circuit for the exciter mechanism, and a measuring circuit. The measuring circuit of the measuring system of the invention corrects a change of at least one characteristic variable of the oscillation measurement signals delivered from the measuring transducer.

98 Claims, 12 Drawing Sheets

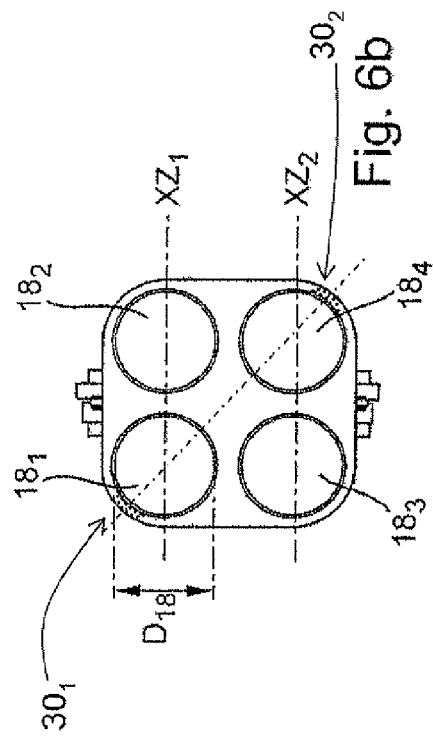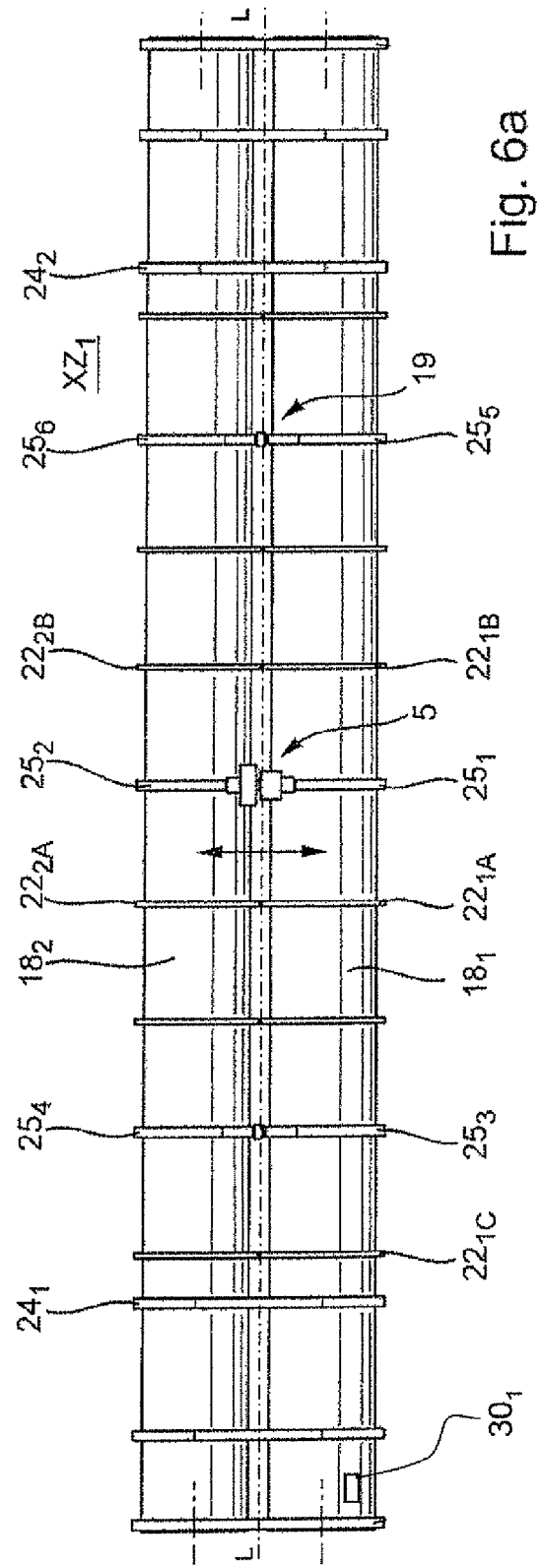

MEASURING SYSTEM HAVING A MEASURING TRANSDUCER OF VIBRATION-TYPE

CROSS-REFERENCE TO RELATED APPLICATION

This application is a nonprovisional which claims the benefit of U.S. Provisional Application No. 61/344,631 filed on Sep. 2, 2010.

TECHNICAL FIELD

The invention relates to a measuring transducer of vibration-type for measuring a medium flowably guided in a pipeline, especially a gas, liquid, powder or other flowable material, especially for measuring a density and/or a mass flow rate, especially also a mass flow integrated over a time interval, of a medium flowing, at least at times, in the pipeline with a mass flow rate of more than 2200 t/h, especially more than 2500 t/h. Additionally, the invention relates to a measuring system having such a measuring transducer.

BACKGROUND DISCUSSION

Often used in process measurements and automation technology for measuring physical parameters, such as e.g. mass flow, density and/or viscosity, of media flowing in pipelines are measuring systems (especially measuring systems developed as compactly constructed, inline measuring devices), which, by means of a measuring transducer of vibration-type, through which medium flows, and a measuring, and driver, circuit connected thereto, effect, in the medium, reaction forces, such as e.g. Coriolis forces corresponding with mass flow, inertial forces corresponding with density of the medium and/or frictional forces corresponding with viscosity of the medium, etc., and produce, derived from these, a measurement signal representing the particular mass flow, viscosity and/or density of the medium. Such measuring transducers, especially measuring transducers embodied as Coriolis, mass flow meters or Coriolis, mass flow/densimeters, are described at length and in detail e.g. in EP-A 1 001 254, EP-A 553 939, U.S. Pat. No. 4,793,191, US-A 2002/0157479, US-A 2006/0150750, US-A 2007/0151368, U.S. Pat. No. 5,370,002, U.S. Pat. No. 5,796,011, U.S. Pat. No. 6,308,580, U.S. Pat. No. 6,415,668, U.S. Pat. No. 6,711,958, U.S. Pat. No. 6,920,798, U.S. Pat. No. 7,134,347, U.S. Pat. No. 7,392,709, or WO-A 03/027616.

Each of the measuring transducers includes a transducer housing, of which 1) an inlet-side, first housing end is formed at least partially by means of a first flow divider having exactly two, mutually spaced, circularly cylindrical, or tapered or conical, flow openings and 2) an outlet-side, second housing end is formed at least partially by means of a second flow divider having exactly two, mutually spaced, flow openings. In the case of some of the measuring transducers illustrated in U.S. Pat. No. 5,796,011, U.S. Pat. No. 7,350,421, or US-A 2007/0151368, the transducer housing comprises a rather thick walled, circularly cylindrical, tubular segment, which forms at least a middle segment of the transducer housing.

For guiding the medium, which flows, at least at times, the measuring transducers include, furthermore, in each case, exactly two measuring tubes of metal, especially steel or titanium, which are connected such that the medium can flow in parallel and which are positioned within the transducer housing and held oscillatably therein by means of the aforementioned flow dividers. A first of the, most often, equally constructed and, relative to one another, parallelly extending, measuring tubes opens with an inlet-side, first, measuring tube end into a first flow opening of the inlet-side, first flow divider and with an outlet-side, second measuring tube end into a first flow opening of the outlet-side, second flow divider and a second of the measuring tubes opens with an inlet-side, first measuring tube end into a second flow opening of the first flow divider and with an outlet-side, second measuring tube end into a second flow opening of the second flow divider. Each of the flow dividers includes additionally, in each case, a flange with a sealing surface for fluid tight connecting of the measuring transducer to tubular segments of the pipeline serving, respectively, for supplying, and removing, medium, respectively, to and from the measuring transducer.

For producing the above discussed reaction forces, the measuring tubes are caused to vibrate during operation, driven by an exciter mechanism serving for producing, or maintaining, as the case may be, mechanical oscillations, especially bending oscillations, of the measuring tubes in the so-called wanted mode. The oscillations in the wanted mode are, most often, especially in the case of application of the measuring transducer as a Coriolis, mass flow meter and/or densimeter, developed, at least partially, as lateral bending oscillations and, in the case of medium flowing through the measuring tubes, as a result of therein induced Coriolis forces, as additional, equal frequency oscillations superimposed in the so-called Coriolis mode. Accordingly, the—here most often electrodynamic—exciter mechanism is, in the case of straight measuring tubes, embodied in such a manner, that, therewith, the two measuring tubes are excitable in the wanted mode, at least partially, especially also predominantly, to opposite equal, thus opposite phase, bending oscillations differentially in a shared plane of oscillation—thus through introduction of exciter forces acting simultaneously along a shared line of action, however, in opposed direction.

For registering vibrations, especially bending oscillations, of the measuring tubes excited by means of the exciter mechanism and for producing oscillation measurement signals representing vibrations, the measuring transducers have, additionally, in each case, a, most often, likewise electrodynamic, vibration sensor arrangement reacting to relative movements of the measuring tubes. Typically, the vibration sensor arrangement is formed by means of an inlet-side, oscillation sensor registering oscillations of the measuring tubes differentially—thus only relative movements of the measuring tubes—as well as by means of an outlet-side, oscillation sensor registering oscillations of the measuring tubes differentially. Each of the oscillation sensors, which are usually constructed equally with one another, is formed by means of a permanent magnet held on the first measuring tube and a cylindrical coil held on the second measuring tube and permeated by the magnetic field of the permanent magnet.

In operation, the above described inner part of the measuring transducer formed by means of the two measuring tubes as well as the exciter mechanism and vibration sensor arrangement attached thereto is excited by means of the electromechanical exciter mechanism, at least at times, to execute mechanical oscillations in the wanted mode at least one dominating, wanted, oscillation frequency. Selected as oscillation frequency for the oscillations in the wanted mode is, in such case, usually a natural, instantaneous, resonance frequency of the inner part, which, in turn, depends essentially both on size, shape and material of the measuring tubes as well as also on an instantaneous density of the medium; in given cases, this wanted oscillation frequency can also be influenced significantly by an instantaneous viscosity of the medium. As a result of fluctuating density of the medium being measured and/or as a result of media change occurring during operation, the wanted oscillation frequency during operation of the measuring transducer varies naturally, at least within a calibrated and, thus, predetermined, wanted frequency band, which correspondingly has a predetermined lower, and a predetermined upper, limit frequency.

For defining a free, oscillatory length of the measuring tubes and, associated therewith, for adjusting the band of the wanted frequency, measuring transducers of the above described type include, additionally, most often, at least one inlet-side, coupling element, which is affixed to both measuring tubes and spaced from the two flow dividers, for forming inlet-side, oscillation nodes for opposite equal vibrations, especially bending oscillations, of both measuring tubes, as well as at least one outlet-side, coupling element, which is affixed to both measuring tubes and spaced both from the two flow dividers, as well as also from the inlet-side, coupling element, for forming outlet-side, oscillation nodes for opposite equal vibrations, especially bending oscillations, of the measuring tubes. In the case of straight measuring tubes, in such case, a minimum distance between inlet side and the outlet-side coupling elements (thus coupling elements belonging to the inner part) corresponds to the free oscillatory length of the measuring tubes. By means of the coupling elements, additionally also an oscillation quality factor of the inner part, as well as also the sensitivity of the measuring transducer, in total, can be influenced, in a manner such that, for a minimum required sensitivity of the measuring transducer, at least one minimum, free, oscillatory length is provided.

Development in the field of measuring transducers of vibration-type has, in the meantime, reached a level, wherein modern measuring transducers of the described type can, for a broad application spectrum of flow measurement technology, satisfy highest requirements as regards precision and reproducibility of the measurement results. Thus, such measuring transducers are, in practice, applied for mass flow rates from some few l/h (gram per hour) up to some t/min (tons per minute), at pressures of up to 100 bar for liquids or even over 300 bar for gases. The accuracy of measurement achieved, in such case, lies usually at about 99.9% of the actual value, or above, or at a measuring error of about 0.1%, wherein a lower limit of the guaranteed measurement range can lie quite easily at about 1% of the measurement range end value. Due to the high bandwidth of their opportunities for use, industrial grade measuring transducers of vibration-type are available with nominal diameters (corresponding to the caliber of the pipeline to be connected to the measuring transducer, or to the caliber of the measuring transducer measured at the connecting flange), which lie in a nominal diameter range between 1 mm and 250 mm and at maximum nominal mass flow rate of 2200 t/h, in each case, for pressure losses of less than 1 bar. A caliber of the measuring tubes lies, in such case, for instance, in a range between 80 mm and 100 mm.

In spite of the fact that, in the meantime, measuring transducers for use in pipelines with very high mass flow rates and, associated therewith, very large calibers of far beyond 100 mm have become available, there is still considerable interest in obtaining measuring transducers of high precision and low pressure loss also for yet larger pipeline calibers, about 300 mm or more, or mass flow rates of 2500 t/h or more, for instance for applications in the petrochemical industry or in the field of transport and transfer of petroleum, natural gas, fuels, etc. This leads, in the case of correspondingly scaled enlarging of the already established measuring transducer designs known from the state of the art, especially from EP-A 1 001 254, EP-A 553 939, U.S. Pat. No. 4,793,191, US-A 2002/0157479, US-A 2007/0151368, U.S. Pat. No. 5,370, 002, U.S. Pat. No. 5,796,011, U.S. Pat. No. 6,308,580, U.S. Pat. No. 6,711,958, U.S. Pat. No. 7,134,347, U.S. Pat. No. 7,350,421, or WO-A 03/027616, to the fact that the geometric dimensions would be exorbitantly large, especially the installed length corresponding to a distance between the sealing surfaces of both flanges and, in the case of curved measuring tubes, a maximum lateral extension of the measuring transducer, especially dimensions for the desired oscillation characteristics, the required mechanical load bearing ability (especially a load bearing ability required also for preventing possible deformations of the measuring transducer significant for the oscillatory behavior of the measuring tubes), as well as the maximum allowed pressure loss. Along with that, also the empty mass of the measuring transducer increases unavoidably, with conventional measuring transducers of large nominal diameter already having an empty mass of about 400 kg. Investigations, which have been carried out for measuring transducers with two bent measuring tubes, constructed, for instance, according to U.S. Pat. No. 7,350,421 or U.S. Pat. No. 5,796,011, as regards their to-scale enlargement to still greater nominal diameters, have, for example, shown that, for nominal diameters of more than 300 mm, the empty mass of a to-scale enlarged, conventional measuring transducer would lie far above 500 kg, accompanied by an installed length of more than 3000 mm and a maximum lateral extension of more than 1000 mm. As a result, it can be said that industrial grade, mass producible, measuring transducers of conventional design and materials with nominal diameters far above 300 mm cannot be expected in the foreseeable future both for reasons of technical implementability, as well as also due to economic considerations.

SUMMARY OF THE INVENTION

Proceeding from the above recounted state of the art, it is consequently an object of the invention to provide a measuring system with a vibration-type measuring transducer of high sensitivity and high oscillation quality factor, which also in the case of large mass flow rates of more than 2200 t/h, causes only a small pressure loss of less than 1 bar and which also has a construction, which is as compact as possible at large nominal diameters of over 250 mm, coupled with an installed weight, which is as small as possible. Moreover, the measuring system formed by means of the measuring transducer should have as little as possible cross-sensitivity to possible changes of stress conditions in the measuring transducer, for instance, as a result of temperature changes, or -gradients within the measuring transducer and/or as a result of forces acting externally on the measuring transducer, such as e.g. clamping forces introduced via the connected pipeline.

For achieving the object, the invention resides in a measuring system for measuring density and/or mass flow rate, for example, also total mass flow totaled over a time interval and/or viscosity of a medium, for instance, a gas, a liquid, a powder or some other flowable material, flowing, at least at times, in a pipeline, for example, a medium flowing with a mass flow rate of more than 2200 t/h.

The measuring system, for example, one embodied as an in-line measuring device and/or a compactly constructed measuring device, comprises a measuring transducer of vibration-type for producing oscillation measurement signals, for instance, oscillation measurement signals serving for registering density and/or mass flow rate and/or viscosity.

The measuring transducer includes a transducer housing, for example, an essentially tubular and/or outwardly circularly cylindrical, transducer housing, of which an inlet-side, first housing end is formed by means of an inlet-side, first flow divider having exactly four flow openings spaced, in each case, from one another, for example, circularly cylindrical, or conical, flow openings and an outlet-side, second housing end formed by means of an outlet-side, second flow divider having exactly four flow openings spaced, in each case, from one another, for example, circularly cylindrical, or conical, flow openings, exactly four measuring tubes for conveying flowing medium and connected to the flow dividers, for example, equally-constructed, flow dividers, for forming flow paths connected for parallel flow, for example, four such measuring tubes held oscillatably in the transducer housing only by means of said flow dividers and/or four such measuring tubes, which are constructed equally to one another and/or four such measuring tubes, which are at least pairwise parallel to one another and/or, four such measuring tubes, which are straight, of which a first measuring tube, for example, a circularly cylindrical, first measuring tube, opens with an inlet-side, first measuring tube end into a first flow opening of the first flow divider and with an outlet-side, second measuring tube end into a first flow opening of the second flow divider, a second measuring tube, for example, a circularly cylindrical, second measuring tube, opens with an inlet-side, first measuring tube end into a second flow opening of the first flow divider and with an outlet-side, second measuring tube end into a second flow opening of the second flow divider, a third measuring tube, for example, a circularly cylindrical, third measuring tube, opens with an inlet-side, first measuring tube end into a third flow opening of the first flow divider and with an outlet-side, second measuring tube end into a third flow opening of the second flow divider and a fourth measuring tube, for example, a circularly cylindrical, fourth measuring tube, opens with an inlet-side, first measuring tube end into a fourth flow opening of the first flow divider and with an outlet-side, second measuring tube end into a fourth flow opening of the second flow divider, an electromechanical, exciter mechanism serving for producing and/or maintaining mechanical oscillations, for example, bending oscillations, of the four measuring tubes and formed by means of a first oscillation exciter, for example, an electrodynamic, first oscillation exciter and/or a first oscillation exciter differentially exciting oscillations of the first measuring tube relative to the second measuring tube, wherein the exciter mechanism is embodied in such a manner that, therewith, the first measuring tube and the second measuring tube are excitable during operation to opposite equal bending oscillations in a shared, imaginary, first plane of oscillation and the third measuring tube and the fourth measuring tube are excited during operation to opposite equal bending oscillations in a shared, imaginary, second plane of oscillation, for example, a second plane of oscillation essentially parallel to the first plane of oscillation, as well as a vibration sensor arrangement serving for producing oscillation measurement signals representing vibrations, for example, bending oscillations, of the measuring tubes, and reacting to vibrations of the measuring tubes, especially bending oscillations excited by means of the exciter mechanism, for example, an electrodynamic, vibration sensor arrangement and/or a vibration sensor arrangement formed by means of oscillation sensors constructed equally to one another.

Moreover, the measuring system comprises a transmitter electronics electrically coupled with the measuring transducer, for example, a transmitter electronics arranged in an electronics housing connected mechanically with the transducer housing, for activating the measuring transducer, especially its exciter mechanism, and for evaluating oscillation measurement signals delivered by the measuring transducer.

The transmitter electronics includes a driver circuit for the exciter mechanism, and a measuring circuit formed, for example, by means of a microcomputer and/or a digital signal processor. The measuring circuit, with application of at least one oscillation measurement signal delivered by the vibration sensor arrangement, generates a density measured value representing the density of the medium and/or a mass flow measured value representing its mass flow rate. In the case of the measuring system of the invention, the measuring circuit, for producing the density measured value and/or the mass flow measured value, is additionally adapted to correct a change of at least one characteristic variable (for example, a signal frequency) of the oscillation measurement signals delivered by the measuring transducer, for instance, a change of their signal frequency and/or a change of a phase difference between two oscillation measurement signals generated by means of the vibration sensor arrangement, wherein said changes are caused 1) by a change of a stress state in the measuring transducer, for instance, a change of a stress state accompanying thermally related deformation of the measuring transducer and/or deformation effected by external forces, and/or 2) by a deviation of an instantaneous stress state in the measuring transducer from a therefor predetermined, reference stress state, for example, a reference stress state ascertained earlier in the course of a manufacturer side, calibration of the measuring system and/or a calibration performed in the installed position, for instance, such a deviation accompanying thermally related deformation of the measuring transducer and/or deformation of the measuring transducer effected by external forces.

According to a first embodiment of the invention, it is additionally provided that said change of the stress state in the measuring transducer (especially a change influencing an oscillatory behavior of the measuring tubes and/or effecting a change of at least one resonance frequency of the measuring transducer) to be corrected by means of the measuring circuit and/or said deviation of the instantaneous stress state in the measuring transducer from the reference stress state predetermined therefor (especially such a deviation influencing an oscillatory behavior of the measuring tubes and/or effecting a change of at least one resonance frequency of the measuring transducer) result(s) from a deformation (for instance, a thermally related deformation and/or a deformation effected by external forces) of the measuring transducer, for example, a strain of one or a plurality of the measuring tubes.

According to a second embodiment of the invention, it is additionally provided that the measuring circuit ascertains the change of the stress state in the measuring transducer and/or the deviation of the instantaneous stress state in the measuring transducer from the reference stress state predetermined therefor by means of at least one oscillation measurement signal produced by the vibration sensor arrangement and representing, for example, two- or multimodal vibrations, especially bending oscillations, of the measuring tubes and having, for example, two or more signal components of different signal frequency. Alternatively, or in supplementation, it is additionally provided that the measuring circuit corrects the change of the at least one characteristic variable of the oscillation measurement signals delivered from the measuring transducer (which change results from the change of the stress state in the measuring transducer, or from the deviation of the instantaneous stress state in the measuring transducer from the reference stress state predetermined therefor) by means of at least one oscillation measurement signal produced by the vibration sensor arrangement, for example, a signal representing two- or multimodal vibrations, especially bending oscillations, of the measuring tubes, and having, for example, two or more signal components of different signal frequency.

According to a third embodiment of the invention, it is additionally provided that each of the four measuring tubes, especially measuring tubes of equal caliber and/or equal length, has a caliber, which amounts to more than 60 mm, especially more than 80 mm.

According to a fourth embodiment of the invention, is additionally provided, that the first flow divider has a flange, especially a flange having mass of more than 50 kg, for connecting the measuring transducer to a tubular segment of the pipeline serving for supplying medium to the measuring transducer and the second flow divider has a flange, especially a flange having a mass of more than 50 kg, for connecting the measuring transducer to a segment of the pipeline serving for removing medium from the measuring transducer. Developing this embodiment of the invention further, each of the flanges has a sealing surface for fluid tight connecting of the measuring transducer with the, in each case, corresponding tubular segment of the pipeline, wherein a distance between the sealing surfaces of both flanges defines an installed length of the measuring transducer, especially an installed length amounting to more than 1200 mm and/or less than 3000 mm. Especially, the measuring transducer is additionally so embodied that, in such case, a measuring tube length of the first measuring tube corresponding to a minimum distance between the first flow opening of the first flow divider and the first flow opening of the second flow divider is so selected that a measuring tube length to installed length ratio of the measuring transducer, as defined by a ratio of the measuring tube length of the first measuring tube to the installed length of the measuring transducer, amounts to more than 0.7, especially more than 0.8 and/or less than 0.95, and/or that a caliber to installed length ratio of the measuring transducer, as defined by a ratio of the caliber of the first measuring tube to the installed length of the measuring transducer, amounts to more than 0.02, especially more than 0.05 and/or less than 0.09. Alternatively thereto or in supplementation thereof, the measuring transducer is so embodied that a nominal diameter to installed length ratio of the measuring transducer, as defined by a ratio of the nominal diameter of the measuring transducer to the installed length of the measuring transducer, is smaller than 0.3, especially smaller than 0.2 and/or greater than 0.1, wherein the nominal diameter corresponds to a caliber of the pipeline, in whose course the measuring transducer is to be used.

In a fifth embodiment of the invention, it is additionally provided that a measuring tube length of the first measuring tube corresponding to a minimum distance between the first flow opening of the first flow divider and the first flow opening of the second flow divider amounts to more than 1000 mm, especially more than 1200 mm and/or less than 2000 mm.

In an sixth embodiment of the invention, it is additionally provided, that each of the four measuring tubes, especially four measuring tubes of equal caliber, is so arranged, that a smallest lateral separation of each of the four measuring tubes, especially measuring tubes of equal length, from a housing side wall of the transducer housing is, in each case, greater than zero, especially greater than 3 mm and/or greater than twice a respective tube wall thickness; and/or that a smallest lateral separation between two neighboring measuring tubes amounts to, in each case, greater than 3 mm and/or greater than the sum of their respective tube wall thicknesses.

In a seventh embodiment of the invention, it is additionally provided, that each of the flow openings is so arranged, that a smallest lateral separation of each of the flow openings from a housing side wall of the transducer housing amounts, in each case, to greater than zero, especially greater than 3 mm and/or greater than twice a smallest tube wall thickness of the measuring tubes; and/or that a smallest lateral separation between the flow openings amounts to greater than 3 mm and/or greater than twice a smallest tube wall thickness of the measuring tubes.

According to an eighth embodiment of the invention, it is additionally provided that a mass ratio of an empty mass of the total measuring transducer to an empty mass of the first measuring tube is greater than 10, especially greater than 15 and smaller than 25.

According to a ninth embodiment of the invention, it is additionally provided that an empty mass, $M_{18}$, of the first measuring tube, especially of each of the measuring tubes is greater than 20 kg, especially greater than 30 kg and/or less than 50 kg.

According to a tenth embodiment of the invention, it is additionally provided that an empty mass of the measuring transducer is greater than 200 kg, especially greater than 300 kg.

According to an eleventh embodiment of the invention, it is additionally provided that a nominal diameter of the measuring transducer, which corresponds to a caliber of the pipeline, in whose course the measuring transducer is to be used, amounts to more than 100 mm, especially is greater than 300 mm. In advantageous manner, the measuring transducer is additionally so embodied that a mass to nominal diameter ratio of the measuring transducer, defined by a ratio of the empty mass of the measuring transducer to the nominal diameter of the measuring transducer is less than 2 kg/mm, especially less than 1 kg/mm and/or greater than 0.5 kg/mm.

In a twelfth embodiment of the invention, it is additionally provided, that the first and the second measuring tubes are of equal construction, at least as regards a material, of which their tube walls are, in each case, composed, and/or as regards their geometrical tube dimensions, especially a tube length, a tube wall thickness, a tube outer diameter and/or a caliber.

According to a thirteenth embodiment of the invention, it is additionally provided, that the third and fourth measuring tubes are of equal construction, at least as regards a material, of which their tube walls are, in each case, composed, and/or as regards their geometric tube dimensions, especially a tube length, a tube wall thickness, a tube outer diameter and/or a caliber.

According to a fourteenth embodiment of the invention, it is additionally provided, that the four measuring tubes are of equal construction, as regards a material, of which their tube walls are composed, and/or as regards their geometric tube dimensions, especially a tube length, a tube wall thickness, a pipe outer diameter and/or a caliber. It can, however, also be advantageous, when, alternatively thereto, both the third measuring tube as well as also the fourth measuring tube are different from the first measuring tube and the second measuring tube as regards their respective geometric tube dimensions, especially a tube length, a tube wall thickness, a pipe outer diameter and/or a caliber.

In a fifteenth embodiment of the invention, it is additionally provided, that a material, of which the tube walls of the four measuring tubes are at least partially composed, is titanium and/or zirconium and/or duplex steel and/or super duplex steel.

According to a sixteenth embodiment of the invention, it is additionally provided that the transducer housing, the flow divider and tube walls of the measuring tubes are, in each case, composed of steel, for example, stainless steel.

According to a seventeenth embodiment of the invention, it is additionally provided that minimum bending oscillation resonance frequencies at least of the first and second measuring tube are essentially equal and minimum bending oscillation resonance frequencies at least of the third and fourth measuring tube are essentially equal. In such case, the minimum bending oscillation resonance frequencies of all four measuring tubes can be kept essentially equal or, however, also kept only pairwise equal.

According to an eighteenth embodiment of the invention, it is additionally provided that the four flow openings of the first flow divider are so arranged that imaginary areal centers of gravity associated with cross sectional areas, especially circularly shaped, cross sectional areas, of the flow openings of the first flow divider form the vertices of an imaginary square, wherein said cross sectional areas lie in a shared, imaginary, cutting plane of the first flow divider extending perpendicularly to a longitudinal axis of the measuring transducer, especially a longitudinal axis extending parallel to a principal flow axis of the measuring transducer.

In a nineteenth embodiment of the invention, it is additionally provided that the four flow openings of the second flow divider are so arranged that imaginary areal centers of gravity associated with cross sectional areas, especially circularly shaped, cross sectional areas, of the flow openings of the second flow divider form the vertices of an imaginary square, wherein said cross sectional areas lie in a shared, imaginary, cutting plane of the second flow divider extending perpendicularly to a longitudinal axis of the measuring transducer, especially a longitudinal axis extending parallel to a principal flow axis of the measuring transducer.

According to a twentieth embodiment of the invention, it is additionally provided that a middle segment of the transducer housing is formed by means of a straight tube, for example, a circularly cylindrical straight tube.

According to a twenty-first embodiment of the invention, it is additionally provided that the transducer housing is essentially tubularly embodied, for example, circularly cylindrically embodied. In such case, it is additionally provided, that the transducer housing has a largest housing inner diameter, which is greater than 150 mm, especially greater than 250 mm, especially in such a manner, that a housing to measuring tube inner diameter ratio of the measuring transducer, as defined by a ratio of the largest housing inner diameter to a caliber of the first measuring tube is kept greater than 3, especially greater than 4 and/or smaller than 5, and/or that a housing inner diameter to nominal diameter ratio of the measuring transducer, as defined by a ratio of the largest housing inner diameter to the nominal diameter of the measuring transducer is smaller than 1.5, especially smaller than 1.2 and/or greater than 0.9, wherein the nominal diameter corresponds to a caliber of the pipeline, in whose course the measuring transducer is to be used. The housing inner diameter to nominal diameter ratio of the measuring transducer can, in such case, in advantageous manner, be, for example, also equal to one.

According to a twenty-second embodiment of the invention, it is additionally provided that the vibration sensor arrangement is formed by means of an inlet-side, first oscillation sensor, especially an electrodynamic sensor and/or one differentially registering oscillations of the first measuring tube relative to the second measuring tube, as well as by means of an outlet-side, second oscillation sensor, especially an electrodynamic sensor and/or one differentially registering oscillations of the first measuring tube relative to the second measuring tube, especially in such a manner that a measuring length of the measuring transducer corresponding to a minimum distance between the first oscillation sensor and the second oscillation sensor amounts to more than 500 mm, especially more than 600 mm and/or less than 1200 mm, and/or that a caliber to measuring length ratio of the measuring transducer, defined by a ratio of a caliber of the first measuring tube to the measuring length of the measuring transducer amounts to more than 0.05, especially more than 0.09. Additionally, the first oscillation sensor can be formed by means of a permanent magnet held on the first measuring tube and a cylindrical coil permeated by its magnetic field and held on the second measuring tube, and the second oscillation sensor by means of a permanent magnet held on the first measuring tube and a cylindrical coil permeated by its magnetic field and held on the second measuring tube.

According to a twenty-third embodiment of the invention, it is additionally provided that the vibration sensor arrangement is formed by means of an inlet-side, first oscillation sensor, especially an electrodynamic sensor and/or one differentially registering oscillations of the first measuring tube relative to the second measuring tube, by means of an outlet-side, second oscillation sensor, especially an electrodynamic sensor and/or one differentially registering oscillations of the first measuring tube relative to the second measuring tube, by means of an inlet-side third oscillation sensor, especially an electrodynamic sensor and/or one differentially registering oscillations of the third measuring tube relative to the fourth measuring tube, as well as by means of an outlet-side fourth oscillation sensor, especially an electrodynamic sensor and/ or one differentially registering oscillations of the third measuring tube relative to the fourth measuring tube, this, for example, in such a manner that a measuring length of the measuring transducer corresponding to a minimum distance between the first oscillation sensor and the second oscillation sensor amounts to more than 500 mm, especially more than 600 mm and/or less than 1200 mm, and/or that a caliber to measuring length ratio of the measuring transducer, defined by a ratio of a caliber of the first measuring tube to the measuring length of the measuring transducer amounts to more than 0.05, especially more than 0.09. In such case, in advantageous manner, the first and third oscillation sensor can be electrically interconnected serially in such a manner that a common oscillation measurement signal represents shared inlet-side oscillations of the first and third measuring tube relative to the second and fourth measuring tube, and/or the second and fourth oscillation sensor can be electrically interconnected serially in such a manner that a common oscillation measurement signal represents shared outlet-side oscillations of the first and third measuring tube relative to the second and fourth measuring tube. Alternatively, or in supplementation, additionally, the first oscillation sensor can be formed by means of a permanent magnet held on the first measuring tube and a cylindrical coil permeated by its magnetic field and held on the second measuring tube, and the second oscillation sensor by means of a permanent magnet held on the first measuring tube and a cylindrical coil permeated by its magnetic field and held on the second measuring tube, and/or the third oscillation sensor by means of a permanent magnet held on the third measuring tube and a cylindrical coil permeated by its magnetic field and held on the fourth measuring tube and the fourth oscillation sensor by means of a permanent magnet held on the third measuring tube and a cylindrical coil permeated by its magnetic field and held on the fourth measuring tube.

According to a twenty-fourth embodiment of the invention, the exciter mechanism is formed by means of a second oscillation exciter, for example, an electrodynamic exciter and/or one exciting oscillations of the third measuring tube relative to the fourth measuring tube differential. In such case, it is additionally provided that the first and second oscillation exciters are electrically serially interconnected in such a manner that a common driver signal excites shared oscillations of the first and third measuring tube relative to the second and fourth measuring tube. The oscillation exciter of the exciter mechanism can, for example, be formed by means of a permanent magnet held on the first measuring tube and a cylindrical coil permeated by its magnetic field and held on the second measuring tube, and wherein the second oscillation exciter can, for example, be formed by means of a permanent magnet held on the third measuring tube and a cylindrical coil permeated by its magnetic field and held on the fourth measuring tube.

According to a first further development of the invention, the measuring transducer further comprises: A first, plate shaped, stiffening element, which, for tuning resonance frequencies of bending oscillations of the first measuring tube and the third measuring tube in a third plane of oscillation essentially perpendicular to the first and/or second plane of oscillation, is affixed to the first measuring tube and to the third measuring tube, and, indeed, in each case, to a segment of the first, or third measuring tube lying between the first oscillation exciter and the first flow divider; a second, plate shaped, stiffening element, which, for tuning resonance frequencies of bending oscillations of the second measuring tube and the fourth measuring tube in a fourth plane of oscillation essentially perpendicular to the first and/or second plane of oscillation, is affixed to the second measuring tube and to the fourth measuring tube, and, indeed, in each case, to a segment of the second, or fourth measuring tube lying between the first oscillation exciter and the first flow divider; a third, plate shaped, stiffening element, which, for tuning resonance frequencies of bending oscillations of the first measuring tube and the third measuring tube in the third plane of oscillation, is affixed to the first measuring tube and to the third measuring tube, and, indeed, in each case, to a segment of the first, or third measuring tube lying between the first oscillation exciter and the second flow divider; as well as a fourth, plate shaped, stiffening element, which for tuning resonance frequencies of bending oscillations of the second measuring tube and the fourth measuring tube in the fourth plane of oscillation, is affixed to the second measuring tube and to the fourth measuring tube, and, indeed, in each case, to a segment of the second, or fourth measuring tube lying between the first oscillation exciter and the second flow divider. The plate shaped stiffening elements can, for the case, in which the vibration sensor arrangement is formed by means of an inlet-side, first oscillation sensor and by means of an outlet-side, second oscillation sensor, be arranged e.g. in such a manner in the measuring transducer that the first plate shaped stiffening element is affixed to the segment of the first measuring tube lying between the first oscillation sensor and the first flow divider along one of the straight lateral surface elements of the first measuring tube—, for instance, that nearest the third measuring tube—as well as to the segment of the third measuring tube lying between the first oscillation sensor and the first flow divider along one of the straight lateral surface elements of the third measuring tube—, for instance, that nearest the first measuring tube—, the second plate shaped stiffening element is affixed to the segment of the second measuring tube lying between the first oscillation sensor and the first flow divider along one of the straight lateral surface elements of the second measuring tube—, for instance, that nearest the fourth measuring tube—as well as to the segment of the fourth measuring tube lying between the first oscillation sensor and the first flow divider along one of the straight lateral surface elements of the fourth measuring tube—, for instance, that nearest the second measuring tube—, the third plate shaped stiffening element is affixed to the segment of the first measuring tube lying between the second oscillation sensor and the second flow divider along one of the straight lateral surface elements of the first measuring tube—, for instance, that nearest the third measuring tube—as well as to the segment of the third measuring tube lying between the second oscillation sensor and the second flow divider along one of the straight lateral surface elements of the third measuring tube—, for instance, that nearest the first measuring tube—, and the fourth plate shaped stiffening element is affixed to the segment of the second measuring tube lying between the second oscillation sensor and the second flow divider along one of the straight lateral surface elements of the second measuring tube—, for instance, that nearest the fourth measuring tube—as well as to the segment of the fourth measuring tube lying between the second oscillation sensor and the second flow divider along one of the straight lateral surface elements of the fourth measuring tube—, for instance, that nearest the second measuring tube. Additionally, it is provided, in such case, that each of the four plate shaped stiffening elements, for example, plate shaped stiffening elements of equal construction, is so embodied and so placed in the measuring transducer that it has a height corresponding to a smallest distance between the lateral surface elements of those two measuring tubes, along which it is, in each case, affixed, which height is smaller, especially by more than half, than a length of said plate shaped stiffening element measured in the direction of said lateral surface element. In supplementation thereto, each of the four plate shaped stiffening elements can additionally, in each case, be so embodied that the length of each of the plate shaped stiffening elements is greater, especially by more than twice, than a thickness of the said plate shaped stiffening element.

According to a second further development of the invention, the measuring transducer further comprises a plurality of annular, especially equally-constructed, stiffening elements serving for increasing the oscillation quality factor of the measuring tubes, of which each is so placed on exactly one of the measuring tubes that it grips around this along one of its peripheral surface elements. According to an embodiment of the second further development of the invention, there are on each of the measuring tubes at least four annular, for example, equally constructed, stiffening elements, placed especially in such a manner that the stiffening elements are so placed in the measuring transducer that two adjoining stiffening elements mounted on the same measuring tube are separated by a distance, which amounts to at least 70% of a pipe outer diameter of said measuring tube, at most, however, 150% of such pipe outer diameter, for example, a distance in the range of 80% to 120% of such pipe outer diameter.

According to a third further development of the invention, the measuring system further comprises a temperature measuring arrangement, for example, a temperature measuring arrangement formed by means of a affixed resistance thermometer on one of the measuring tubes and/or by means of a resistance thermometer affixed on the transducer housing and/or electrically connected with the transmitter electronics, for registering a temperature of the measuring transducer, for example, a temperature of one or a plurality of the measuring tubes, especially a temperature influencing an oscillatory behavior of the measuring tubes and/or effecting a change of at least one resonance frequency of at least one of the measuring tubes.

According to a first embodiment of the third further development of the invention, it is additionally provided that the temperature measuring arrangement is formed by means of a resistance thermometer, for example, a resistance thermometer affixed on one of the measuring tubes, wherein the resistance thermometer has an ohmic resistance dependent on a temperature of the measuring transducer, for example, a temperature of one of the measuring tubes.

According to a second embodiment of the third further development of the invention, it is additionally provided that the measuring circuit ascertains the change of the stress state in the measuring transducer and/or the deviation of the instantaneous stress state in the measuring transducer from the reference stress state predetermined therefor based on a temperature of the measuring transducer, for example, a temperature of one or a plurality of the measuring tubes, registered by the temperature measuring arrangement, especially a temperature influencing an oscillatory behavior of the measuring tubes and/or effecting a change of at least one resonance frequency of at least one of the measuring tubes.

According to a third embodiment of the third further development of the invention, it is additionally provided that the measuring circuit corrects the change of the at least one characteristic variable of the oscillation measurement signals delivered from the measuring transducer (which change results from the change of the stress state in the measuring transducer, or the deviation of the instantaneous stress state in the measuring transducer from the reference stress state predetermined therefor) based on a temperature of the measuring transducer, for example, a temperature of one or a plurality of the measuring tubes, registered by the temperature measuring arrangement, especially a temperature influencing an oscillatory behavior of the measuring tubes and/or effecting a change of at least one resonance frequency of at least one of the measuring tubes.

According to a fourth further development of the invention, the measuring transducer further comprises a first coupling element of first type, especially a plate-shaped first coupling element of first type, which is affixed at least to the first measuring tube and to the second measuring tube and spaced on the inlet side both from the first flow divider as well as also from the second flow divider for forming inlet-side, oscillation nodes at least for vibrations, especially bending oscillations, of the first measuring tube and for thereto opposite equal vibrations, especially bending oscillations, of the second measuring tube, as well as a second coupling element of first type, especially a plate-shaped second coupling element of first type and/or a second coupling element constructed equally to the first coupling element and/or a second coupling element parallel to the first coupling element, which second coupling element of first type is affixed at least to the first measuring tube and to the second measuring tube and spaced on the outlet side both from the first flow divider as well as also from the second flow divider, as well as also from the first coupling element, for forming outlet-side, oscillation nodes at least for vibrations, especially bending oscillations, of the first measuring tube and for thereto opposite equal vibrations, especially bending oscillations, of the second measuring tube.

In a first embodiment of the fourth further development of the invention, it is additionally provided, that all four measuring tubes are connected with one another mechanically by means of the first coupling element of first type as well as by means of the second coupling element of first type.

In a second embodiment of the fourth further development of the invention, it is additionally provided, that the first coupling element of first type is plate shaped, especially in such a manner, that it has essentially a rectangular, square, round, cross, or X, shaped or H shaped, basic shape.

In a third embodiment of the fourth further development of the invention, it is additionally provided, that the second coupling element of first type, especially a coupling element of construction equal to that of the first coupling element of first type, is plate shaped, especially in such a manner, that it has a rectangular, square, round, cross, or X, shaped or H shaped, basic shape.

In a fourth embodiment of the fourth further development of the invention, it is additionally provided, that the first coupling element of first type is affixed also to the third measuring tube and to the fourth measuring tube, and that the second coupling element of first type is affixed to the third measuring tube and to the fourth measuring tube.

In a fifth embodiment of the fourth further development of the invention, it is additionally provided, that a center of mass of the first coupling element of first type has a distance to a center of mass of the measuring transducer, which is essentially equal to a distance of a center of mass of the second coupling element of first type to said center of mass of the measuring transducer.

In a sixth embodiment of the fourth further development of the invention, the measuring transducer is additionally so embodied that a free, oscillatory length, $L_{18x}$, of the first measuring tube, especially of each of the measuring tubes, corresponding to a minimum separation between the first coupling element of first type and the second coupling element of first type, amounts to less than 2500 mm, especially less than 2000 mm and/or more than 800 mm. Especially, the measuring transducer is, in such case, additionally so embodied that each of the four measuring tubes, especially measuring tubes of equal caliber and/or equal length, has a caliber, which amounts to more than 60 mm, especially more than 80 mm, especially in such a manner, that a caliber to oscillatory length ratio of the measuring transducer, as defined by a ratio of the caliber of the first measuring tube to the free, oscillatory length of the first measuring tube, amounts to more than 0.07, especially more than 0.09 and/or less than 0.15.

In supplementation to the fourth further development of the invention, it is additionally provided that the measuring transducer further comprises: A third coupling element of first type, for example, a plate shaped, third coupling element of first type, which, for forming inlet-side oscillation nodes at least for vibrations, especially bending oscillations, of the third measuring tube and thereto opposite-equal vibrations, especially bending oscillations, of the fourth measuring tube, is affixed on the inlet side at least to the third measuring tube and to the fourth measuring tube and spaced both from the first flow divider as well as also from the second flow divider; as well as a fourth coupling element of first type, for example, a plate shaped, fourth coupling element of first type, which, for forming outlet-side oscillation nodes at least for vibrations, especially bending oscillations, of the third measuring tube and thereto opposite-equal vibrations, especially bending oscillations, of the fourth measuring tube, is affixed on the outlet side at least to the third measuring tube and to the fourth measuring tube and spaced both from the first flow divider as well as also from the second flow divider, as well as also from the third coupling element of first type. In such case, for example, also all four measuring tubes can be mechanically connected with one another by means of the third coupling element of first type as well as by means of the fourth coupling element of first type. Additionally, the first and third coupling element of first type can be connected with one another supplementally with a first coupler connecting element (for example, a rod- or, plate shaped, first coupler connecting element and/or a first coupler connecting element extending parallel to the measuring tubes) affixed both to the first coupling element of first type as well as also to the third coupling element of first type and the second and fourth coupling element of first type can be connected with one another supplementally with a second coupler connecting element (for example, rod- or, plate shaped, second coupler connecting element and/or a second coupler connecting element extending parallel to the measuring tubes) affixed both to the second coupling element of first type as well as also to the fourth coupling element of first type.

In a fifth further development of the invention, the measuring transducer additionally comprises a first coupling element of second type, for example, a plate shaped or rod shaped, first coupling element of second type, which is affixed to the first measuring tube and to the third measuring tube and otherwise to none other of the measuring tubes and spaced both from the first coupling element of first type as well as also from the second coupling element of first type for synchronizing vibrations, especially bending oscillations, of the first measuring tube and thereto equal frequency vibrations, especially bending oscillations, of the third measuring tube, as well as a second coupling element of second type, for example, a plate shaped or rod shaped, second coupling element of second type, which is affixed to the second measuring tube and to the fourth measuring tube and otherwise to none other of the measuring tubes and spaced both from the first coupling element of first type as well as also from the second coupling element of first type, as well as also from the first coupling element of second type, especially in such a manner, that the first and second coupling elements of second type are placed in the measuring transducer lying opposite one another, for synchronizing vibrations, especially bending oscillations, of the second measuring tube and thereto equal frequency vibrations, especially bending oscillations, of the fourth measuring tube. In supplementation thereof, the measuring transducer can further comprise a third coupling element of second type, for example, a plate shaped or rod shaped, third coupling element of second type, which is affixed to the first measuring tube and to the third measuring tube and otherwise to none other of the measuring tubes and spaced from the first coupling element of second type, for synchronizing vibrations, especially bending oscillations, of the first measuring tube and thereto equal frequency vibrations, especially bending oscillations, of the third measuring tube, as well as a fourth coupling element of second type, for example, a plate shaped or rod shaped, fourth coupling element of second type, which is affixed to the second measuring tube and to the fourth measuring tube and otherwise to none other of the measuring tubes and spaced, in each case, from the second and third coupling elements of second type, especially in such a manner, that the third and fourth coupling elements of second type are placed lying opposite one another in the measuring transducer, for synchronizing vibrations, especially bending oscillations, of the second measuring tube and thereto equal frequency vibrations, especially bending oscillations, of the fourth measuring tube.

Moreover, the measuring transducer can comprise, additionally, a fifth coupling element of second type, for example, a plate shaped or rod shaped, fifth coupling element of second type, which is affixed to the first measuring tube and to the third measuring tube and otherwise to none other of the measuring tubes and spaced from the first and third coupling elements of second type, for synchronizing vibrations, especially bending oscillations, of the first measuring tube and thereto equal frequency vibrations, especially bending oscillations, of the third measuring tube, as well as a, for example, a plate shaped or rod shaped, sixth coupling element of second type, which is affixed to the second measuring tube and to the fourth measuring tube and otherwise to none other of the measuring tubes and spaced, in each case, from the second, fourth and fifth coupling elements of second type, especially in such a manner that the fifth and sixth coupling elements of second type are placed in the measuring transducer lying opposite one another, for synchronizing vibrations, especially bending oscillations, of the second measuring tube and thereto equal frequency vibrations, especially bending oscillations, of the fourth measuring tube.

According to a sixth further development of the invention, the measuring system further comprises a deformation measuring arrangement, for instance, one electrically connected with the transmitter electronics and/or mechanically coupled with at least one of the measuring tubes, for registering deformation of the measuring transducer, for instance, thermally related deformation and/or deformation effected by forces acting externally on the measuring transducer and/or deformation influencing an oscillatory behavior of the measuring tubes and/or effecting a change of at least one resonance frequency of at least one of the measuring tubes and/or a translational deformation, especially a strain of one or a plurality of the measuring tubes.

According to a first embodiment of the sixth further development of the invention, it is additionally provided that the deformation measuring arrangement is formed by means of a sensor element, for example, in the form of semiconductor strain gages or as metal foil strain gages formed, which has an ohmic resistance dependent on deformation of the measuring transducer, for example, a strain of one or a plurality of the measuring tubes.

According to a second embodiment of the sixth further development of the invention, it is additionally provided that the deformation measuring arrangement is formed by means of a sensor element, for example, in the form of semiconductor strain gages or metal foil strain gages, which has an ohmic resistance dependent on deformation of the measuring transducer, for example, a strain of one or a plurality of the measuring tubes, and that the sensor element, for instance, embodied as strain gages, is affixed, for example, adhesively, on one of the measuring tubes, for instance, in such a manner that it reacts to changes of a measuring tube length of the said measuring tube corresponding to a respective minimum distance between the flow opening of the first flow divider corresponding to the respective first measuring tube end and the flow opening of the second flow divider corresponding to the respective second measuring tube end with a change of its ohmic resistance and/or in such a manner that it is connected flushly with said measuring tube.

According to a third embodiment of the sixth further development of the invention, it is additionally provided that the at least one sensor element, embodied, for example, as strain gages, is affixed, for example, adhesively, on an outer surface of the wall of the said measuring tube.

According to a fourth embodiment of the sixth further development of the invention, it is additionally provided that the at least one sensor element, embodied, for example, as strain gages, is affixed, for example, adhesively on an outer surface of the wall of the said measuring tube. This, especially, in such a manner that it at least partially flushly contacts a detection region covered thereby on the surface of the wall of said tube; and/or that it is connected flushly with a detection region covered thereby on the surface of the wall of said tube; and/or that a detection region on the surface of the wall of said tube covered by the sensor element, for example, contacted flushly by this and/or connected flushly therewith, has at least one zone, in which the opposite equal bending oscillations excited by means of the exciter mechanism result in no bending stress.

According to a fifth embodiment of the sixth further development of the invention, it is additionally provided that—considering that each of the measuring tubes, in each case, has a measuring tube length, which corresponds to a respective minimum distance between the flow opening of the first flow divider corresponding to the respective first measuring tube end and the flow opening of the second flow divider corresponding to the respective second measuring tube end—changes of a measuring tube length of one or a plurality of the measuring tubes are registerable by means of the deformation measuring arrangement. For registering changes of the measuring tube length of one or a plurality of the measuring tubes, the deformation measuring arrangement can have at least one strain gage, for example, a semiconductor strain gage or a metal foil strain gage, affixed, for example, adhesively and/or flushly, for instance, externally, on one of the measuring tubes.

According to a sixth embodiment of the sixth further development of the invention, it is additionally provided that the deformation measuring arrangement is formed by means of at least one strain gage, for example, a semiconductor strain gage or a metal foil strain gage, mechanically coupled with at least one of the measuring tubes, for example, affixed adhesively to one of the measuring tubes.

According to a seventh embodiment of the sixth further development of the invention, it is additionally provided that the measuring circuit ascertains the change of the stress state in the measuring transducer and/or the deviation of the instantaneous stress state in the measuring transducer from the reference stress state predetermined therefor based on deformation of the measuring transducer (for instance, thermally related deformation and/or deformation effected by forces acting externally on the measuring transducer and/or deformation influencing an oscillatory behavior of the measuring tubes and/or deformation effecting a change of at least one resonance frequency of at least one of the measuring tubes and/or translational deformation), especially a strain of one or a plurality of the measuring tubes, registered by the deformation measuring arrangement.

According to an eighth embodiment of the sixth further development of the invention, it is additionally provided that the measuring circuit corrects the change of the at least one characteristic variable of the oscillation measurement signals delivered from the measuring transducer resulting from the change of the stress state in the measuring transducer, or the deviation of the instantaneous stress state in the measuring transducer from the reference stress state predetermined therefor, based on a deformation of the measuring transducer, especially a strain of one or a plurality of the measuring tubes, registered by the deformation measuring arrangement, for example, thermally related deformation and/or deformation effected by forces acting externally on the measuring transducer and/or deformation influencing an oscillatory behavior of the measuring tubes and/or deformation effecting a change of at least one resonance frequency of at least one of the measuring tubes and/or translational deformation.

According to a ninth embodiment of the sixth further development of the invention, it is additionally provided that the deformation measuring arrangement is formed by means of a first sensor element, for example, in the form of semiconductor strain gages or metal foil strain gages, having an ohmic resistance dependent on deformation of the measuring transducer, and by means of at least a second sensor element, for example, in the form of semiconductor strain gages or metal foil strain gages, having an ohmic resistance dependent on deformation of the measuring transducer, for example, in such a manner that the first sensor element and the second sensor element are electrically connected with one another by means of at least one wire extending within the transducer housing, and/or that the first sensor element and the second sensor element are electrically serially interconnected, and/or that the first sensor element and the second sensor element are of equal construction, and/or that the first sensor element and the second sensor element lie in an imaginary cutting plane of the measuring transducer, in which a longitudinal axis of the measuring transducer extends parallel to a principal flow axis of the measuring transducer. Developing this embodiment of the invention further, it is additionally provided that the first sensor element of the deformation measuring arrangement is affixed on the first measuring tube, for example, in such a manner that, by means of the first sensor element, a strain of the first measuring tube changing the measuring tube length of the first measuring tube is registerable. In supplementation thereto, the second sensor element of the deformation measuring arrangement can be affixed on other than the first measuring tube, especially on the measuring tube spaced laterally the farthest therefrom, for example, in such a manner that, by means of the sensor element, a strain of the fourth measuring tube changing the measuring tube length of the fourth measuring tube is registerable.

According to a tenth embodiment of the sixth further development of the invention, it is additionally provided that the measuring transducer further comprises: A first, plate shaped, stiffening element, which, for tuning resonance frequencies of bending oscillations of the first measuring tube and the third measuring tube in a third plane of oscillation essentially perpendicular to the first and/or second plane of oscillation, is affixed to the first measuring tube and to the third measuring tube, and, indeed, in each case, to a segment of the first, or third measuring tube lying between the first oscillation exciter and the first flow divider; a second, plate shaped, stiffening element, which, for tuning resonance frequencies of bending oscillations of the second measuring tube and the fourth measuring tube in a fourth plane of oscillation essentially perpendicular to the first and/or second plane of oscillation, is affixed to the second measuring tube and to the fourth measuring tube, and, indeed, in each case, to a segment of the second, or fourth measuring tube lying between the first oscillation exciter and the first flow divider; a third, plate shaped, stiffening element, which, for tuning resonance frequencies of bending oscillations of the first measuring tube and the third measuring tube in the third plane of oscillation, is affixed to the first measuring tube and to the third measuring tube, and, indeed, in each case, to a segment of the first, or third measuring tube lying between the first oscillation exciter and the second flow divider; as well as a fourth, plate shaped, stiffening element, which for tuning resonance frequencies of bending oscillations of the second measuring tube and the fourth measuring tube in the fourth plane of oscillation, is affixed to the second measuring tube and to the fourth measuring tube, and, indeed, in each case, to a segment of the second, or fourth measuring tube lying between the first oscillation exciter and the second flow divider; and that the at least one sensor element of the deformation measuring arrangement is affixed on one of the stiffening elements, for example, in such a manner that the sensor element reacts to a strain of the measuring tubes connected with said stiffening element by changing its ohmic resistance.

According to an eleventh embodiment of the sixth further development of the invention, it is additionally provided that the measuring transducer further comprises: A first, plate shaped, stiffening element, which, for tuning resonance frequencies of bending oscillations of the first measuring tube and the third measuring tube in a third plane of oscillation essentially perpendicular to the first and/or second plane of oscillation, is affixed to the first measuring tube and to the third measuring tube, and, indeed, in each case, to a segment of the first, or third measuring tube lying between the first oscillation exciter and the first flow divider; a second, plate shaped, stiffening element, which, for tuning resonance frequencies of bending oscillations of the second measuring tube and the fourth measuring tube in a fourth plane of oscillation essentially perpendicular to the first and/or second plane of oscillation, is affixed to the second measuring tube and to the fourth measuring tube, and, indeed, in each case, to a segment of the second, or fourth measuring tube lying between the first oscillation exciter and the first flow divider; a third, plate shaped, stiffening element, which, for tuning resonance frequencies of bending oscillations of the first measuring tube and the third measuring tube in the third plane of oscillation, is affixed to the first measuring tube and to the third measuring tube, and, indeed, in each case, to a segment of the first, or third measuring tube lying between the first oscillation exciter and the second flow divider; as well as a fourth, plate shaped, stiffening element, which for tuning resonance frequencies of bending oscillations of the second measuring tube and the fourth measuring tube in the fourth plane of oscillation, is affixed to the second measuring tube and to the fourth measuring tube, and, indeed, in each case, to a segment of the second, or fourth measuring tube lying between the first oscillation exciter and the second flow divider; and that the deformation measuring arrangement is formed by means of a first sensor element, for example, in the form of semiconductor strain gages or metal foil strain gages, having an ohmic resistance dependent on deformation of the measuring transducer, and by means of at least a second sensor element, for example, in the form of semiconductor strain gages or metal foil strain gages, having an ohmic resistance dependent on deformation of the measuring transducer, for example, in such a manner that the first sensor element of the deformation measuring arrangement is affixed to the first stiffening element, for instance, in such a manner that the first sensor element reacts to a strain of the first and/or third measuring tube by changing its ohmic resistance, and/or that the second sensor element of the deformation measuring arrangement is affixed to the second stiffening element, especially in such a manner that the second sensor element reacts to a strain of the second and/or fourth measuring tube by changing its ohmic resistance.

According to a twelfth embodiment of the sixth further development of the invention, it is additionally provided that the measuring transducer further comprises a coupler connecting element affixed both to the first coupling element of first type as well as also to the third coupling element of first type, for example, a rod, or plate, shaped, coupler connecting element and/or a coupler connecting element extending parallel to the measuring tubes, and that the at least one sensor element of the deformation measuring arrangement is affixed on the coupler connecting element, for instance, in such a manner that the sensor element reacts to a strain of one or a plurality of the measuring tubes by changing its ohmic resistance.

According to a thirteenth embodiment of the sixth further development of the invention, it is additionally provided that the measuring transducer further comprises: A first coupler connecting element affixed both to the first coupling element of first type as well as also to the third coupling element of first type, for example, a rod, or plate, shaped, first coupler connecting element and/or a first coupler connecting element extending parallel to the measuring tubes; as well as a second coupler connecting element affixed both to the second as well as also to the fourth coupling element, for example, a rod, or plate, shaped, second coupler connecting element and/or a second coupler connecting element extending parallel to the measuring tubes and/or one constructed equally to the first coupler connecting element; and that the deformation measuring arrangement is formed by means of a first sensor element, for example, in the form of semiconductor strain gages or metal foil strain gages, having an ohmic resistance dependent on deformation of the measuring transducer, and by means of at least a second sensor element, for example, in the form of semiconductor strain gages or metal foil strain gages, having an ohmic resistance dependent on deformation of the measuring transducer, in such a manner that the first sensor element of the deformation measuring arrangement is affixed on the first coupler connecting element, for instance, in such a manner that the first sensor element reacts to a strain of one or a plurality of the measuring tubes by changing its ohmic resistance, and/or that the second sensor element of the deformation measuring arrangement is affixed to the second coupler connecting element, especially in such a manner that the second sensor element reacts to a strain of one or a plurality of the measuring tubes by changing its ohmic resistance.

A basic idea of the invention is to use, instead of the two measuring tubes flowed through in parallel used in the case of conventional measuring transducers of large nominal diameter, four straight measuring tubes flowed through in parallel, and so, on the one hand, to enable an optimal exploitation of limited space, while, on the other hand, to be able to assure an acceptable pressure loss over a broad measuring range, especially also in the case of very high mass flow rates of far over 2200 t/h, at still very high accuracy of measurement. This, especially, also in applications with operationally widely fluctuating temperature ranges of more than 100K and/or in application with strong mechanical loading of the measuring transducer, for instance, as a result of axial forces or also pipeline forces acting asymmetrically on the measuring transducer. Moreover, the effective flow cross section of the inner part resulting from the total cross section of the four measuring tubes can be directly increased by more than 20% in comparison to conventional only two measuring tubes having measuring transducers of equal nominal diameter and equal empty mass. A further advantage of the measuring transducer of the invention is that predominantly established structural designs, as, for instance, as regards the used materials, the joining technology, the manufacturing steps etc., can be applied as is or only slightly modified, whereby also the manufacturing costs, as a whole, are quite comparable to those of conventional measuring transducers. Thus, the invention not only creates an opportunity to construct comparatively compact measuring transducers of vibration-type nevertheless with large nominal diameters of over 150 mm, especially with a nominal diameter of greater 250 mm, with manageable geometric dimensions and empty masses, but, also this permits this to be done with economically sensible budgets.

The measuring system of the invention, is due to its potentially large nominal diameter, on the one hand, and its relative small pressure loss, on the other hand, especially suitable for measuring flowable media, which are conveyed in a pipeline with a caliber of greater 150 mm, especially of 300 mm or greater, and at least at times with mass flow rates of more than 2200 t/h, especially also of more than 2500 t/h, as is quite usual especially in applications for measuring petroleum, natural gas or other petrochemical substances.

BRIEF DESCRIPTION OF THE DRAWINGS

The invention, as well as other advantageous embodiments thereof, will now be explained in greater detail on the basis of examples of embodiments presented in the figures of the drawing. Equal parts are provided in the figures with equal reference characters; when required to avoid clutter or when it otherwise appears sensible, already mentioned reference characters are omitted in subsequent figures. Other advantageous embodiments or further developments, especially also combinations of first only individually explained aspects of the invention, will become evident additionally from the figures of the drawing, as well as also alone from the dependent claims. In particular, the figures of the drawing show as follows:

FIGS. 6a and 6b show projections of an inner part of the measuring transducer of FIG. 4 in two different side views;

BRIEF DESCRIPTION OF THE DRAWINGS

Figure 1:
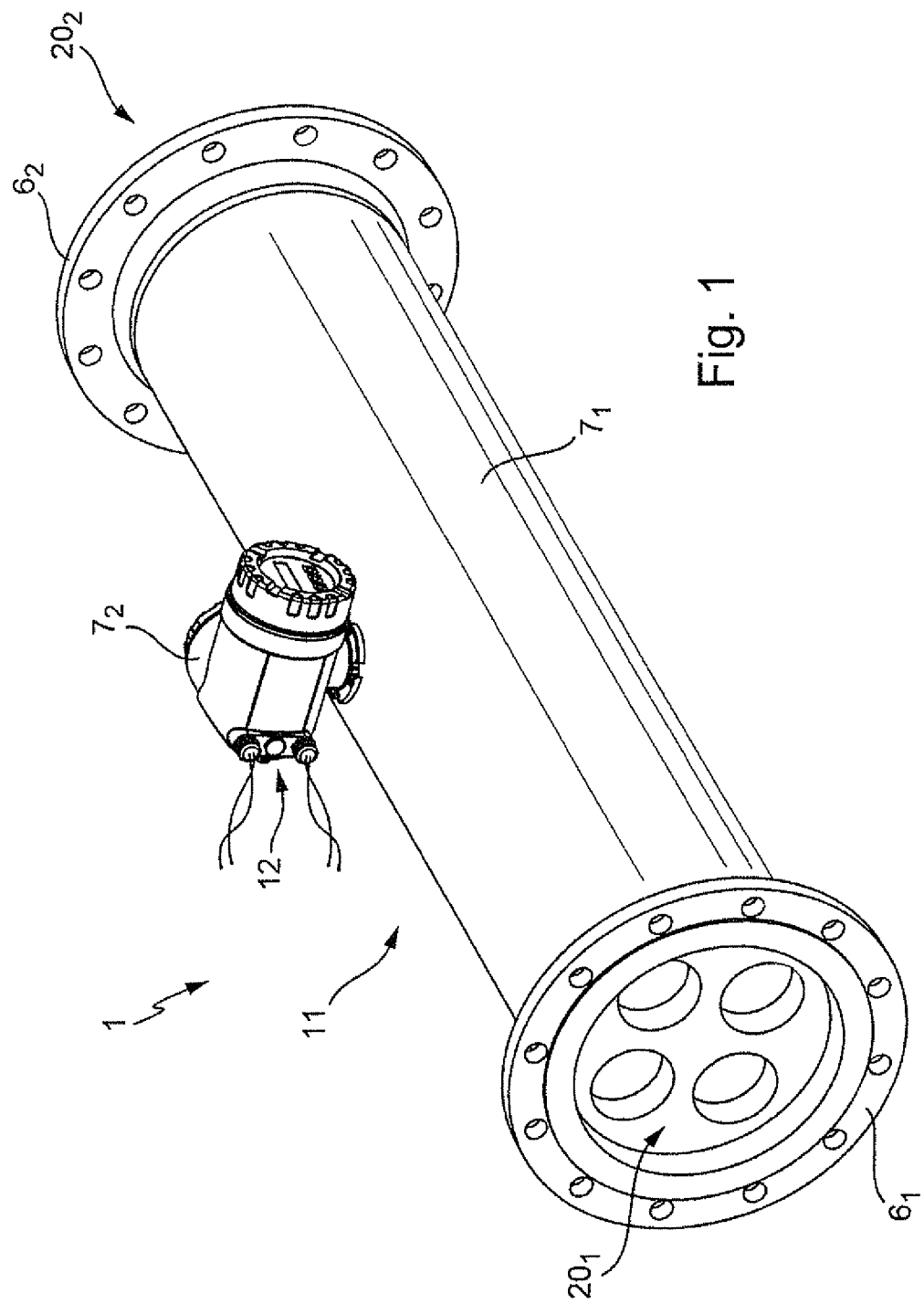
FIGS. 1 and 2 show a measuring system—here in the form of an in-line measuring device in compact construction—serving, for example, as a Coriolis flow/density/viscosity transducer, in perspective, also partially sectioned, side views.
Figure 2:
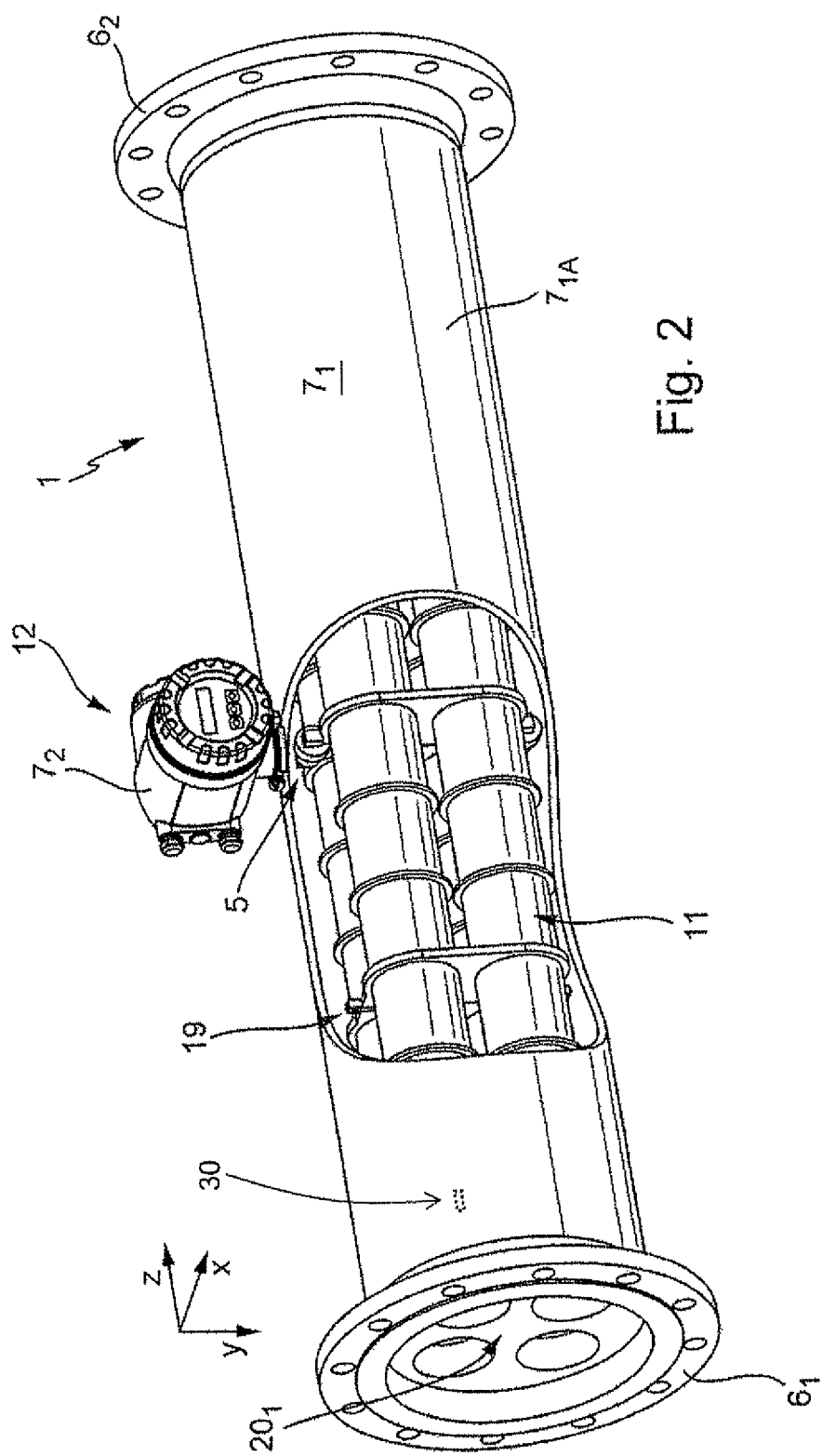

FIGS. 1, 2 show, schematically, a measuring system 1, especially a measuring system embodied as a Coriolis, mass flow, and/or density, measuring device, which serves for registering a mass flow m of a medium flowing in a pipeline (not shown) and for representing such in a mass flow, measured value representing this mass flow instantaneously. The medium can be practically any flowable material, for example, a powder, a liquid, a gas, a vapor, or the like. Alternatively or in supplementation, the measuring system 1 can, in given cases, also be used for measuring a density $\rho$ and/or a viscosity $\eta$ of the medium. Especially, the measuring system 1—here in the form of an in-line measuring device in compact construction—is provided for measuring media, such as e.g. petroleum, natural gas or other petrochemical materials, which are flowing in a pipeline having a caliber greater than 250 mm, especially a caliber of 300 mm or more. Especially, the measuring system is also provided for measuring flowing media of the aforementioned type, which are caused to flow with a mass flow rate of greater than 2200 t/h, especially greater than 2500 t/h.

The measuring system 1 comprises, for such purpose: A measuring transducer 11 of vibration-type, through which the medium being measured flows, during operation; as well as, electrically connected with the measuring transducer 11, a transmitter electronics 12, which is here not shown in detail, but, instead only schematically in the form of a contained unit. In advantageous manner, the transmitter electronics 12 is so designed that, during operation of the measuring system 1, it can exchange measuring, and/or other operating, data with a measured value processing unit superordinated to it, for example, a programmable logic controller (PLC), a personal computer and/or a work station, via a data transmission system, for example, a hardwired fieldbus system and/or wirelessly per radio. Furthermore, the transmitter electronics 12 is so designed, that it can be fed by an external energy supply, for example, also via the aforementioned fieldbus system. For the case, in which the measuring system 1 is provided for coupling to a fieldbus, or other communication, system, the transmitter electronics 12, especially a programmable measuring device electronics, includes, additionally, a corresponding communication interface for data communication, e.g. for sending the measured data to the already mentioned, programmable logic controller or a superordinated process control system.

FIGS. 4, 5a, 5b, 6a, 6b, 7, 8a, 8b show different representations of examples of embodiments for a measuring transducer 11 of vibration-type suited for the measuring system 1, especially one serving as a Coriolis, mass flow, density and/or viscosity, transducer, which measuring transducer 11 is applied, during operation, in the course of a pipeline (not shown), through which a medium to be measured, for example, a powdered, liquid, gaseous or vaporous medium, is flowing. The measuring transducer 11 serves to produce, as already mentioned, in a medium flowing therethrough, such mechanical reaction forces, especially Coriolis forces dependent on mass flow, inertial forces dependent on density of the medium and/or frictional forces dependent on viscosity of the medium, which react measurably, especially registerably by sensor, on the measuring transducer. Derived from these reaction forces describing the medium, by means of evaluating methods correspondingly implemented in the transmitter electronics in manner known to those skilled in the art, e.g. the mass flow, the density and/or the viscosity of the medium can be measured.

The measuring transducer 11 includes a transducer housing $7_1$, which is, here, essentially tubular, and externally circularly cylindrical, and which serves, among other things, also as a support frame, in which other components of the measuring transducer 11 serving for registering the at least one measured variable are accommodated to be protected against external, environmental influences. In the example of an embodiment shown here, at least one middle segment of the transducer housing $7_1$ is formed by means of a straight, especially circularly cylindrical, tube, so that, for manufacture of the transducer housing, for example, also cost effective, welded or cast, standard tubes, for example, of cast steel or forged steel, can be used.

An inlet-side, first housing end of the transducer housing $7_1$ is formed by means of an inlet-side, first flow divider $20_1$ and an outlet-side, second housing end of the transducer housing $7_1$ is formed by means of outlet-side, second flow divider $20_2$. Each of the two flow dividers $20_1$, $20_2$, which are, in this respect, formed as integral components of the housing, includes exactly four, for example, circularly cylindrical or tapered or conical, flow openings $20_{1A}$, $20_{1B}$, $20_{1C}$, $20_{1D}$, or $20_{2A}$, $20_{2B}$, $20_{2C}$, $20_{2D}$, each spaced from one another and/or each embodied as an inner cone.

Moreover, each of the flow dividers $20_1$, $20_2$, for example, manufactured of steel, is provided with a flange $6_1$, or $6_2$, for example, manufactured of steel, for connecting of the measuring transducer 11 to a tubular segment of the pipeline serving for supplying medium to the measuring transducer, or to a tubular segment of such pipeline serving for removing medium from the measuring transducer. Each of the two flanges $6_1$, $6_2$ has, according to an embodiment of the invention, a mass of more than 50 kg, especially more than 60 kg and/or less than 100 kg. For leakage free, especially fluid tight, connecting of the measuring transducer with the, in each case, corresponding tubular segment of the pipeline, each of the flanges includes additionally, in each case, a corresponding, as planar as possible, sealing surface $6_{1A}$, or $6_{2A}$. A distance between the two sealing surfaces $6_{1A}$, $6_{2A}$ of both flanges defines, thus, for practical purposes, an installed length, $L_{11}$, of the measuring transducer 11. The flanges are dimensioned, especially as regards their inner diameter, their respective sealing surface as well as the flange bores serving for accommodating corresponding connection bolts, according to the nominal diameter $D_{11}$ provided for the measuring transducer 11 as well as the therefor, in given cases, relevant industrial standards, corresponding to a caliber of the pipeline, in whose course the measuring transducer is to be used.

As a result of the large nominal diameter lastly desired for the measuring transducer, its installed length $L_{11}$ amounts, according to an embodiment of the invention, to more than 1200 mm. Additionally, it is, however, provided that the installed length of the measuring transducer 11 is kept as small as possible, especially smaller than 3000 mm. The flanges $6_1$, $6_2$ can, as well as also directly evident from FIG. 4 and such as quite usual in the case of such measuring transducers, be arranged, for this purpose, as near as possible to the flow openings of the flow dividers $20_1$, $20_2$, in order so to provide an as short as possible inlet, or outlet, as the case may be, region in the flow dividers and, thus, in total, to provide an as short as possible installed length $L_{11}$ of the measuring transducer, especially an installed length $L_{11}$ of less than 3000 mm. For an as compact as possible measuring transducer and especially also in the case of desired high mass flow rates of over 2200 t/h, according to another embodiment of the invention, the installed length and the nominal diameter of the measuring transducer are so dimensioned and matched to one another, that a nominal diameter to installed length ratio $D_{11}/L_{11}$ of the measuring transducer, as defined by a ratio of the nominal diameter $D_{11}$ of the measuring transducer to the installed length $L_{11}$ of the measuring transducer is smaller than 0.3, especially smaller than 0.2 and/or greater than 0.1.

In an additional embodiment of the measuring transducer, the transducer housing comprises an essentially tubular, middle segment. Additionally, it is provided that the transducer housing is so dimensioned, that a housing inner diameter to nominal diameter ratio of the measuring transducer defined by a ratio of the largest housing inner diameter to the nominal diameter of the measuring transducer is, indeed, greater than 0.9, however, smaller than 1.5, as much as possible, however, smaller than 1.2.

In the case of the here illustrated example of an embodiment, there adjoin on the inlet and outlet sides of the middle segment, additionally, likewise tubular end segments of the transducer housing. For the case illustrated in the example of an embodiment, in which the middle segment and the two end segments, as well as also the flow dividers connected with the respective flanges in the inlet and outlet regions all have the same inner diameter, the transducer housing can in advantageous manner also be formed by means of a one piece, for example, cast or forged, tube, on whose ends the flanges are formed or welded, and in the case of which the flow dividers are formed by means of plates having the flow openings, especially plates somewhat spaced from the flanges and welded to the inner wall orbitally and/or by means of laser. Especially for the case, in which the mentioned housing inner diameter to nominal diameter ratio of the measuring transducer is selected equal to one, for manufacture of the transducer housing, for example, a tube matched to the pipeline to be connected to as regards caliber, wall thickness and material and, in that respect, also as regards the allowed operating pressure and with suitable length corresponding to the selected measuring tube length can be used. For simplifying the transport of the measuring transducer, or the totally therewith formed, in-line measuring device, additionally, such as, for example, also provided in the initially mentioned U.S. Pat. No. 7,350,421, transport eyes can be provided affixed on the inlet side and on the outlet side externally on the transducer housing.

For conveying the medium flowing, at least at times, through pipeline and measuring transducer, the measuring transducer of the invention comprises, additionally, exactly four, straight, for example mutually parallel and/or equally long, measuring tubes $18_1$, $18_2$, $18_3$, $18_4$, which are held oscillatably in the transducer housing 10 and which, in operation, each communicate with the pipeline and are, at least at times, caused to vibrate in at least one oscillatory mode, the so-called wanted mode, suited for ascertaining the physical, measured variable. Especially suited as wanted mode and naturally inherent to each of the measuring tubes $18_1$, $18_2$, $18_3$, and $18_4$ is e.g. a bending oscillation, fundamental mode, which at a minimum bending oscillation, resonance frequency, $f_{181}$, $f_{182}$, $f_{183}$, or $f_{184}$, has exactly one oscillatory antinode.

Of the four measuring tubes (here essentially circularly cylindrical, equally long and parallel to one another as well as to the above mentioned, middle tube segment of the transducer housing), a first measuring tube $18_1$ opens with an inlet-side, first measuring tube end into a first flow opening $20_{1A}$ of the first flow divider $20_1$ and with an outlet-side, second measuring tube end into a first flow opening $20_{2A}$ of the second flow divider $20_2$, a second measuring tube $18_2$ opens with an inlet-side, first measuring tube end into a second flow opening $20_{1B}$ of the first flow divider $20_1$ and with an outlet-side, second measuring tube end into a second flow opening $20_{2B}$ of the second flow divider $20_2$, a third measuring tube $18_3$ opens with an inlet-side, first measuring tube end into a third flow opening $20_{1C}$ of the first flow divider $20_1$ and with an outlet-side, second measuring tube end into a third flow opening $20_{2C}$ of the second flow divider $20_2$ and a fourth measuring tube $18_4$ opens with an inlet-side, first measuring tube end into a fourth flow opening $20_{1D}$ of the first flow divider $20_1$ and with an outlet-side, second measuring tube end into a fourth flow opening $20_{2D}$ of the second flow divider $20_2$. The four measuring tubes $18_1$, $18_2$, $18_3$, $18_4$ are, thus, connected to the flow dividers $20_1$, $20_2$, especially equally constructed flow dividers $20_1$, $20_2$, to form flow paths connected in parallel, and, indeed, in a manner enabling vibrations, especially bending oscillations, of the measuring tubes relative to one another, as well as also relative to the transducer housing. Additionally, it is provided, that the four measuring tubes $18_1$, $18_2$, $18_3$, $18_4$ are held in the transducer housing $7_1$ only by means of said flow dividers $20_1$, $20_2$.

Figure 4:
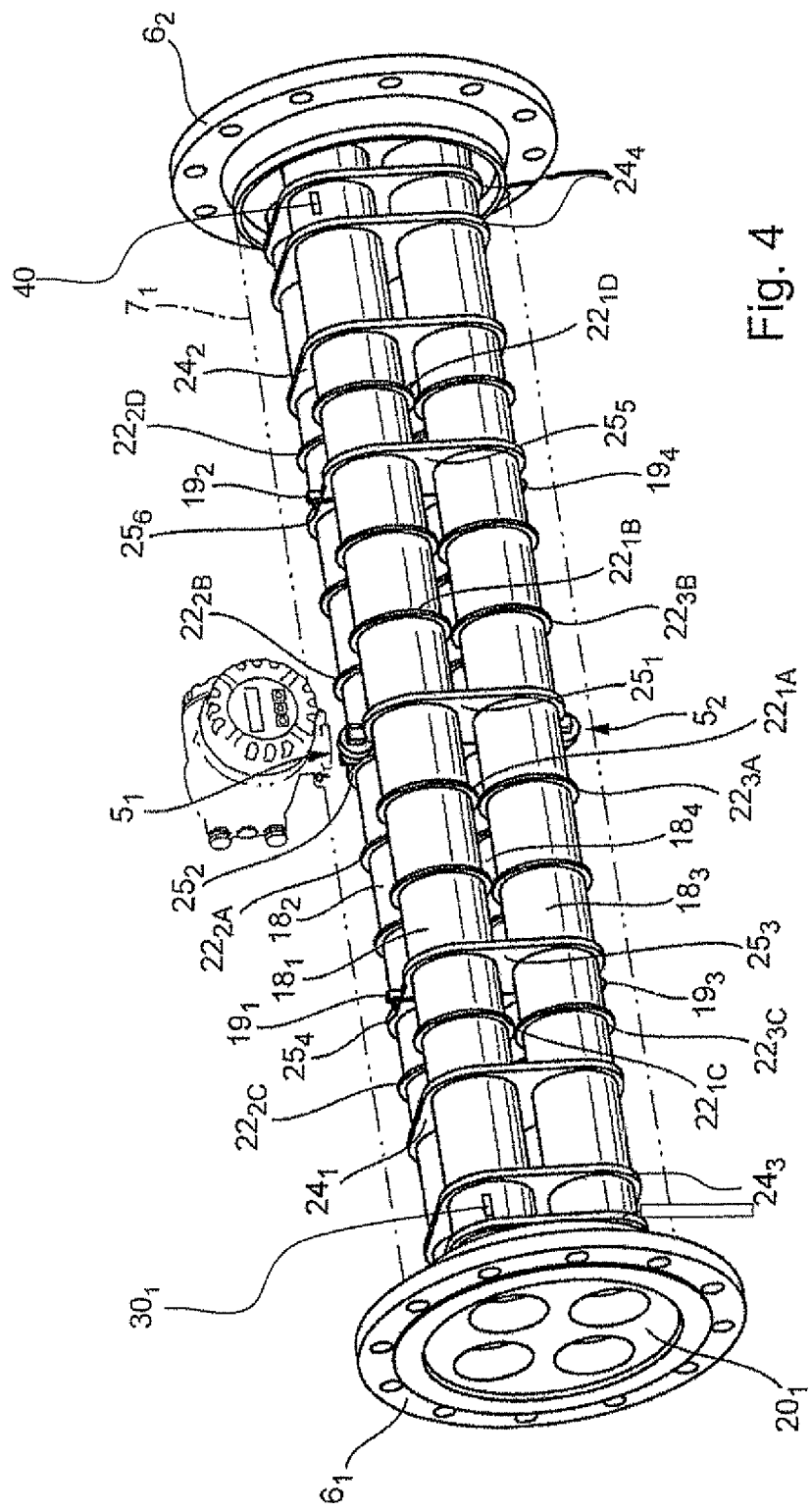
FIG. 4 shows in perspective, a side view of a measuring transducer of vibration-type as component of a measuring system of FIG. 1.

The measuring tubes $18_1$, $18_2$, $18_3$, $18_4$, and, respectively, a therewith formed, tube arrangement of the measuring transducer 11, are, such as directly evident from the combination of FIGS. 1, 2 and 4, and, as also usual in the case of such measuring transducers, encased by the transducer housing $7_1$, in the illustrated case practically completely. Transducer housing $7_1$ serves, in this regard, thus not only as support frame or holder of the measuring tubes $18_1$, $18_2$, $18_3$, $18_4$, but also for protecting them, as well as also other components of the measuring transducer placed within the transducer housing $7_1$, from external environmental influences, such as e.g. dust or water spray. Moreover, the transducer housing $7_1$ can additionally also be so embodied and so dimensioned, that it can, in the case of possible damage to one or a plurality of the measuring tubes, e.g. through crack formation or bursting, completely retain outflowing medium up to a required maximum positive pressure in the interior of the transducer housing $7_1$ as long as possible, wherein such critical state can, such as, for example, also indicated in the initially mentioned U.S. Pat. No. 7,392,709, be registered and signaled by means of corresponding pressure sensors and/or on the basis of operating parameters produced internally, during operation, by the mentioned transmitter electronics 12. Used as material for the transducer housing $7_1$ can be, accordingly, especially, steels, such as, for instance, structural steel, or stainless steel, or also other suitable, or usually suitable for this application, high strength materials.

According to an embodiment of the invention, the four measuring tubes $18_1$, $18_2$, $18_3$, $18_4$ are additionally so embodied and so installed in the measuring transducer 11, that at least the minimum bending oscillation, resonance frequencies $f_{181}$, $f_{182}$ of the first and second measuring tubes $18_1$, $18_2$ are essentially equal and at least the minimum bending oscillation, resonance frequencies $f_{183}$, $f_{184}$ of the third and fourth measuring tubes $18_3$, $18_4$ are essentially equal.

According to an additional embodiment of the invention, at least the first and second measuring tubes $18_1$, $18_2$ are of equal construction as regards a material, of which their tube walls are composed, and/or as regards their geometric tube dimensions, especially a tube length, a tube wall thickness, a tube outer diameter and/or a caliber. Additionally, also at least the third and fourth measuring tubes $18_3$, $18_4$ are of equal construction as regards a material, of which their tube walls are composed, and/or as regards their geometric tube dimensions, especially a tube length, a tube wall thickness, a tube outer diameter and/or a caliber, so that, as a result, the four measuring tubes $18_1$, $18_2$, $18_3$, $18_4$ are, at least pairwise, essentially of equal construction. According to an additional embodiment of the invention, it is, in such case, additionally provided, to construct both the third measuring tube as well as also the fourth measuring tube, such that the two measuring tubes are different from the first measuring tube and from the second measuring tube, as regards their respective geometric tube dimensions, especially a tube length, a tube wall thickness, a tube outer diameter and/or a caliber, especially in such a manner, that the minimum bending oscillation, resonance frequencies of the four measuring tubes are only pairwise equal. Through the, thus, created symmetry breaking in the case of the four measuring tubes $18_1$, $18_2$, $18_3$, $18_4$, among other things, the sensitivity, the oscillatory behavior, especially the mechanical eigenfrequencies, and/or the cross sensitivity to the primary, measuring influencing, disturbance variables, such as, for instance, a temperature, or pressure, distribution, the loading of the medium with impurities, etc., of the two, in this respect, mutually different, measuring tube pairs $18_1$, $18_2$, or $18_3$, $18_4$, can be matched, with targeting, to one another and, thus, an improved diagnosis of the measuring transducer, during operation, can be enabled. Of course, the four measuring tubes $18_1$, $18_2$, $18_3$, $18_4$ can, in case required, however, also be of equal construction as regards a material, of which their tube walls are composed, and/or as regards their geometric tube dimensions, especially a tube length, a tube wall thickness, a tube outer diameter, and/or a caliber, especially in such a manner, that, as a result, the minimum bending oscillation, resonance frequencies of all four measuring tubes $18_1$, $18_2$, $18_3$, $18_4$ are essentially equal.

Suited as material for the tube walls of the measuring tubes is, again, especially, titanium, zirconium or tantalum. However, serving as material for the four measuring tubes $18_1$, $18_2$, $18_3$, $18_4$ can be also practically any other therefor usually applied, or at least suitable, material, especially such with a thermal expansion coefficient as small as possible and a yield point as high as possible. For most applications of industrial measurements technology, especially also in the petrochemical industry, consequently, also measuring tubes of stainless steel, for example, also duplex steel or super duplex steel, would satisfy the requirements as regards mechanical strength, chemical resistance as well as thermal requirements, so that in numerous cases of application of the transducer housing $7_1$, the flow dividers $20_1$, $20_2$, as well as also the tube walls of the measuring tubes $18_1$, $18_2$, $18_3$, $18_4$ can, in each case, be made of steel of, in each case, sufficiently high quality, this being of advantage, especially as regards material, and manufacturing, costs, as well as also as regards the thermally related dilation behavior of the measuring transducer 11, during operation.

In an additional advantageous embodiment of the invention, the flow openings of the first flow divider $20_1$ are additionally so arranged, that those imaginary areal centers of gravity, which belong to the cross sectional areas (here circularly shaped cross sectional areas) of the flow openings of the first flow divider and lie in a shared, imaginary, cutting plane of the first flow divider extending perpendicular to a longitudinal axis L of the measuring transducer, especially an axis parallel to a principal flow axis of the measuring transducer, form the vertices of an imaginary square. Additionally, also the flow openings of the second flow divider $20_2$ are so arranged, that imaginary areal centers of gravity associated with—here likewise circularly shaped—cross sectional areas of the flow openings of the second flow divider $20_2$ form the vertices of an imaginary square, wherein said cross sectional areas lie, again, in a shared imaginary, cutting plane of the second flow divider extending perpendicular to the mentioned longitudinal axis, L of the measuring transducer. As a result of this, an envelope of the four measuring tubes $18_1$, $18_2$, $18_3$, $18_4$ forms practically a straight, cuboid-like body having a square-like base having an at least four-fold symmetry, whereby the space requirement of the inner part formed by means of the four measuring tubes $18_1$, $18_2$, $18_3$, $18_4$ can be minimized in a manner supporting the compactness of the measuring transducer 11 as a whole.

According to an additional embodiment of the invention, each of the measuring tubes is additionally so arranged in the measuring transducer, that a smallest lateral separation of each of the four measuring tubes (here, of equal length) from a housing side wall of the transducer housing is, in each case, greater than zero, especially, however, greater than 3 mm and/or greater than twice a respective tube wall thickness, or that a smallest lateral separation between two neighboring measuring tubes is, in each case, greater than 3 mm and/or greater than the sum of their respective tube wall thicknesses. Accordingly, additionally, each of the flow openings is so arranged, that a smallest lateral separation of each of the flow openings from a housing side wall of the transducer housing $7_1$ is, in each case, greater than zero, especially greater than 3 mm and/or greater than twice a smallest tube wall thickness of the measuring tubes $18_1$, $18_2$, $18_3$, $18_4$, or that a smallest lateral separation between the flow openings is greater than 3 mm and/or greater than twice a smallest tube wall thickness of the measuring tubes $18_1$, $18_2$, $18_3$, $18_4$. For such purpose, according to an additional embodiment of the invention, the four measuring tubes $18_1$, $18_2$, $18_3$, $18_4$ and the transducer housing $7_1$ are so dimensioned and matched to one another, that a housing to measuring tube, inner diameter ratio of the measuring transducer, as defined by a ratio of the largest housing inner diameter to a caliber at least of the first measuring tube is greater than 3, especially greater than 4 and/or smaller than 5.

As already initially mentioned, in the case of the measuring transducer 11, the reaction forces required for the measuring are effected in the medium being measured by causing the measuring tubes $18_1$, $18_2$, $18_3$, $18_4$ to oscillate in the so-called wanted mode. For such purpose, the measuring transducer comprises additionally an exciter mechanism 5 formed by means of at least one electromechanical, for example, electrodynamic, oscillation exciter acting on the measuring tubes $18_1$, $18_2$, $18_3$, $18_4$, and serving for causing each of the measuring tubes, operationally, at least at times, to execute, and to maintain, oscillations suitable, in each case, for the particular measuring, especially bending oscillations, in the so-called wanted mode, with, in each case, sufficiently large oscillation amplitude for producing and registering the above named reaction forces in the medium. The at least one oscillation exciter serves, in such case, especially for converting an electrical excitation power $P_{exc}$ fed from a corresponding driver circuit e.g. of the above named Coriolis, mass flow meter into such, e.g. pulsating or harmonic, exciter forces Fexc, which act, as simultaneously as possible, uniformly, however, with opposite sense, on the measuring tubes. The exciter forces $F_{exc}$ can be tuned, in manner known, per se, to those skilled in the art, by means of an electrical current and/or voltage controller provided in the already mentioned driver circuit as regards their amplitude, and e.g. by means of phase control loop (PLL) likewise provided in the driver circuit as regards their frequency; compare, for this, for example, also U.S. Pat. No. 4,801,897 or U.S. Pat. No. 6,311,136.

As a result of medium flowing through the measuring tubes excited to oscillations in the wanted mode, there are induced in the medium Coriolis forces, which, in turn, effect deformations of the measuring tubes corresponding to an additional, higher oscillation mode of the measuring tubes, the so-called Coriolis mode. For example, the measuring tubes $18_1$, $18_2$, $18_3$, $18_4$ can, during operation, be excited, by the electromechanical exciter mechanism acting thereon, to bending oscillations, especially to an instantaneous mechanical eigenfrequency of the inner part formed by means of the four measuring tubes $18_1$, $18_2$, $18_3$, $18_4$, in the case of which they are—at least predominantly—laterally deflected in a respective oscillation plane and, such as directly evident from the combination of FIG. 3a, 3b, or 6a, 6b, are caused to oscillate pairwise relative to one another with essentially opposite equally in a shared plane $XZ_1$ or $XZ_2$. This occurs, especially, in such a manner, that vibrations executed by each of the measuring tubes $18_1$, $18_2$, $18_3$, $18_4$ during operation at the same time, at least at times and/or at least partially, in each case, are developed as bending oscillations about a measuring tube longitudinal axis connecting the first and the, in each case, associated second measuring tube end of the respective measuring tube, wherein the four measuring tube longitudinal axes in the here illustrated example of an embodiment with four mutually parallel measuring tubes $18_1$, $18_2$, $18_3$, $18_4$ are equally parallel to one another, as well as also to the imaginary longitudinal axis L of the total measuring transducer imaginarily connecting the two flow dividers through a center of mass of the measuring transducer. In other words, the measuring tubes can, as quite usual in the case of measuring transducers of vibration-type, in each case, be caused to oscillate at least sectionally in a bending oscillation mode in the manner of a string held at both ends. Accordingly, in an additional embodiment, the first and second measuring tubes $18_1$, $18_2$, are caused, in each case, to execute bending oscillations, which lie in a shared first plane of oscillation $XZ_1$ and, insofar, are essentially coplanar. Additionally, it is provided the third and fourth measuring tube $18_3$, $18_4$ are equally caused to in a shared, especially to the first plane of oscillation $XZ_1$ essentially parallel, second plane of oscillation $XZ_2$ to oscillate opposite equally one another; compare, in this connection, also FIGS. 6a, 6b.

In an additional embodiment of the invention, the measuring tubes $18_1$, $18_2$, $18_3$, $18_4$ are excited by means of the exciter mechanism 5, during operation, at least partially, especially predominantly, to bending oscillations, which have a bending oscillation frequency, which is about equal to an instantaneous mechanical resonance frequency of the inner part comprising the four measuring tubes $18_1$, $18_2$, $18_3$, $18_4$ or which at least lies in the vicinity of such an eigen-, or resonance, frequency. The instantaneous mechanical bending oscillation resonance frequencies are, in such case, as is known, dependent in special measure on size, shape and material of the measuring tubes $18_1$, $18_2$, $18_3$, $18_4$, as well as also on an instantaneous density of the medium flowing through the measuring tubes, and can, thus, during operation of the measuring transducer, be variable within a wanted frequency band having an expanse of several kilohertz. In the exciting of the measuring tubes to a bending oscillation resonance frequency, on the one hand, an average density of the medium instantaneously flowing through the four measuring tubes can be easily ascertained on the basis of the instantaneously excited oscillation frequency. On the other hand, also, in such manner, the electrical power instantaneously required for maintaining the oscillations excited in the wanted mode can be minimized. Especially, the four measuring tubes $18_1$, $18_2$, $18_3$, $18_4$, driven by the exciter mechanism, additionally, are, at least at times, caused to oscillate with essentially equal oscillation frequency, especially at a shared natural mechanical eigenfrequency of the inner part. Moreover, it is provided that the measuring tubes $18_1$, $18_2$, $18_3$, $18_4$, caused to oscillate at essentially equal frequency, are so excited, that, at least in the case of no flowing medium, the first and third measuring tubes $18_1$, $18_3$ oscillate essentially synchronously relative to one another, i.e. with essentially equal oscillation form, essentially equal phase position and about equal oscillation amplitude. In manner analogous thereto, in the case of this embodiment of the invention, also the second and fourth measuring tubes $18_2$, $18_4$ are caused to oscillate essentially synchronously relative to one another.

The exciter mechanism is embodied according to an embodiment of the invention in such a manner that the first measuring tube $18_1$ and the second measuring tube $18_2$ are excitable during operation to execute opposite equal bending oscillations in the shared first plane of oscillation $XZ_1$ and the third measuring tube $18_3$ and the fourth measuring tube $18_4$ to opposite equal bending oscillations in the shared second plane of oscillation $XZ_2$, especially one essentially parallel to the first plane of oscillation $XZ_1$. In an additional embodiment of the invention, the exciter mechanism 5 is formed therefor by means of a first oscillation exciter $5_1$, especially an electrodynamic, first oscillation exciter $5_1$ and/or a first oscillation exciter $5_1$ differentially exciting oscillations of the first measuring tube $18_1$ relative to the second measuring tube $18_2$.

Additionally, it is provided, that the first oscillation exciter $5_1$ is an oscillation exciter of electrodynamic type acting simultaneously, especially differentially, on at least two of the measuring tubes $18_1$, $18_2$, $18_3$, $18_4$. Accordingly, the first oscillation exciter $5_1$ is formed additionally by means of a permanent magnet held on the first measuring tube and a cylindrical coil permeated by the magnetic field of the permanent magnet and held on the second measuring tube, especially in such a manner of a coil, plunging arrangement, in the case of which the cylindrical coil is arranged coaxially to the permanent magnet and the permanent magnet is embodied in the form of an armature moved plungingly within the coil. In a further development of the invention, the exciter mechanism comprises additionally a second oscillation exciter $5_2$, especially an electrodynamic, second oscillation exciter $5_2$ and/or a second oscillation exciter $5_2$ constructed equally to the first oscillation exciter $5_1$ and/or differentially exciting oscillations of the third measuring tube $18_3$ relative to the fourth measuring tube $18_4$. The two oscillation exciters can, in advantageous manner, be interconnected electrically in series, especially in such a manner, that a combined driver signal excites oscillations of the first and third measuring tubes $18_1$, $18_3$ together relative to the second and fourth measuring tubes $18_2$, $18_4$. In an additional embodiment, the second oscillation exciter $5_2$ is formed by means of a permanent magnet held on the third measuring tube and a cylindrical coil permeated by the magnetic field of the permanent magnet and held on the fourth measuring tube.

As shown in FIG. 4, the first oscillation exciter $5_1$ is arranged above the first and second measuring tubes $18_1$, $18_2$ and, insofar, also above a shared, local center of gravity of all four measuring tubes $18_1$, $18_2$, $18_3$, $18_4$, which lies in an imaginary cross sectional plane of the inner part formed by means of the four measuring tubes passing through the installed position of said oscillation exciter. As a result of the arrangements of at least one oscillation exciter of the exciter mechanism 5 outside of the above-described shared center of gravity, the four measuring tubes can be excited to execute, simultaneously or intermittently and supplementally to bending oscillations, in advantageous manner, also wanted torsional oscillations. In this way, in considerable measure, also frictional, or shear, forces mainly dependent on viscosity can be induced in the medium instantaneously located in the respective measuring tube $18_1$, $18_2$, $18_3$, or $18_4$, which, in turn, react dampingly and, insofar, measurably, on the oscillations of the measuring tubes $18_1$, $18_2$, $18_3$, or $18_4$. Then, for example, based on the driver signal, especially its electrical current level, fed into the exciter mechanism 5, in case required, also a viscosity of the medium guided in the measuring transducer can be ascertained.

It is noted here, additionally, that, although the oscillation exciter of the exciter mechanism illustrated in the example of an embodiment acts, in each case, about centrally on the measuring tubes, alternatively or in supplementation also oscillation exciters acting on the inlet and on the outlet sides on the respective measuring tubes can be used, for instance in the manner of the exciter mechanisms proposed in U.S. Pat. No. 4,823,614, U.S. Pat. No. 4,831,885, or US-A 2003/0070495.

As evident from FIGS. 2 and 4 and usual in the case of measuring transducers of the type being discussed, additionally provided in the measuring transducer 11 is a vibration sensor arrangement 19, for example, an electrodynamic sensor arrangement, reacting to vibrations of the measuring tubes $18_1$, $18_2$, $18_3$, or $18_4$, especially inlet, and outlet-side vibrations, especially bending oscillations excited by means of the exciter mechanism 5, for producing oscillation measurement signals representing vibrations, especially bending oscillations, of the measuring tubes and influenced, for example, as regards a frequency, a signal amplitude and/or a phase position—relative to one another and/or relative to the driver signal—by the measured variable to be registered, such as, for instance, the mass flow rate and/or the density and a viscosity of the medium, respectively.

In an additional embodiment of the invention, the vibration sensor arrangement is formed by means of an inlet-side, first oscillation sensor $19_1$, especially an electrodynamic, first oscillation sensor and/or a first oscillation sensor differentially registering at least oscillations of the first measuring tube $18_1$ relative to the second measuring tube $18_2$, as well as an outlet-side, second oscillation sensor $19_2$, especially an electrodynamic, second oscillation sensor and/or a second oscillation sensor differentially registering at least oscillations of the first measuring tube $18_1$ relative to the second measuring tube $18_2$, which two oscillation sensors deliver, respectively, a first, and a second, oscillation measurement signal reacting to movements of the measuring tubes $18_1$, $18_2$, $18_3$, $18_4$, especially their lateral deflections and/or deformations. This, especially, in such a manner, that at least two of the oscillation measurement signals delivered by the vibration sensor arrangement 19 have a phase shift relative to one another, which corresponds to, or depends on, the instantaneous mass flow rate of the medium flowing through the measuring tubes, as well as, in each case, a signal frequency, which depends on an instantaneous density of the medium flowing in the measuring tubes. The two oscillation sensors $19_1$, $19_2$, for example, oscillation sensors constructed equally to one another, can, for such purpose—such as quite usual in the case of measuring transducers of the type being discussed—be placed essentially equidistantly from the first oscillation exciter $5_1$ in the measuring transducer 11. Moreover, the oscillation sensors of the vibration sensor arrangement 19 can, at least, insofar as they are of equal construction to that of the at least one oscillation exciter of the exciter mechanism 5, work analogously to its principle of action, for example, thus be likewise of electrodynamic type. In a further development of the invention, the vibration sensor arrangement 19 is additionally formed also by means of an inlet-side, third oscillation sensor $19_3$, especially an electrodynamic, oscillation sensor and/or an oscillation sensor differentially registering oscillations of the third measuring tube $18_3$ relative to the fourth measuring tube $18_4$, as well as an outlet-side, fourth oscillation sensor $19_4$, especially an electrodynamic, fourth oscillation sensor $19_4$ and/or an electrodynamic oscillation sensor differentially registering oscillations of the third measuring tube $18_3$ relative to the fourth measuring tube $18_4$. For additional improving of the signal quality, as well as also for simplifying the transmitter electronics 12 receiving the measurement signals, furthermore, the first and third oscillation sensors $19_1$, $19_3$ can be electrically in series interconnected, for example, in such a manner, that a combined oscillation measurement signal represents combined inlet-side oscillations of the first and third measuring tubes $18_1$, $18_3$ relative to the second and fourth measuring tubes $18_2$, $18_4$. Alternatively or in supplementation, also the second and fourth oscillation sensors $19_2$, $19_4$ can be electrically in series interconnected in such a manner, that a combined oscillation measurement signal of both oscillation sensors $19_2$, $19_4$ represents combined outlet-side oscillations of the first and third measuring tubes $18_1$, $18_3$ relative to the second and fourth measuring tubes $18_2$, $18_4$.

For the aforementioned case, that the oscillation sensors of the vibration sensor arrangement 19, especially oscillation sensors constructed equally to one another, should register oscillations of the measuring tubes differentially and electrodynamically, the first oscillation sensor $19_1$ is formed by means of a permanent magnet held to the first measuring tube—here in the region of oscillations to be registered on the inlet side—and a cylindrical coil permeated by the magnetic field of the permanent magnet and held to the second measuring tube—here correspondingly likewise in the region of oscillations to be registered on the inlet side—, and the second oscillation sensor $19_2$ is formed by means of a permanent magnet held—in the region of oscillations to be registered on the outlet side—to the first measuring tube and a cylindrical coil permeated by the magnetic field of the permanent magnet and held to the second measuring tube—here correspondingly likewise in the region of oscillations to be registered on the outlet side. Equally, additionally also the, in given cases, provided, third oscillation sensor $19_3$ can correspondingly be formed by means of a permanent magnet held to the third measuring tube and a cylindrical coil permeated by the magnetic field of the permanent magnet and held to the fourth measuring tube, and the, in given cases, provided, fourth oscillation sensor $19_4$ by means of a permanent magnet held to the third measuring tube and a cylindrical coil permeated by the magnetic field of the permanent magnet and held to the fourth measuring tube.

It is to be noted here additionally that, although, in the case of the oscillation sensors of the vibration sensor arrangement 19 illustrated in the example of an embodiment, the oscillation sensor is, in each case, of electrodynamic type, thus, in each case, formed by means of a cylindrical magnet coil affixed to one of the measuring tubes and a therein plunging permanent magnet correspondingly affixed to an oppositely lying measuring tube, additionally also other oscillation sensors known to those skilled in the art, such as e.g. optoelectronic sensors, can be used for forming the vibration sensor arrangement.

For assuring an as high as possible sensitivity of the measuring transducer to the mass flow, according to an additional embodiment of the invention, the measuring tubes and the oscillation sensors are so arranged in the measuring transducer, that a measuring length, $L_{19}$, of the measuring transducer corresponding to a minimum separation between the first oscillation sensor $19_1$ and the second oscillation sensor $19_2$ amounts to more than 500 mm, especially more than 600 mm.

The exciter mechanism 5 and the vibration sensor arrangement 19 are additionally, as usual in the case of such measuring transducers, coupled, for example, by means of corresponding cable connections, with the transmitter electronics, especially with a therein provided measuring circuit and a driver circuit equally implemented in the transmitter electronics. The transmitter electronics, in turn, produces by means of the driver circuit, on the one hand, an exciter signal correspondingly driving the exciter mechanism 5 and controlled, for example, as regards an exciter current and/or an exciter voltage. On the other hand, the transmitter electronics receives, by means of the, measuring circuit formed, for instance, by means of a microcomputer and/or a digital signal processor, the oscillation measurement signals of the vibration sensor arrangement 19 and generates therefrom, in given cases, also with application of the driver signal, the desired measured values, for example, thus a mass flow rate, or a totaled mass flow, representing mass flow, measured values, density measured values representing a density of the medium and/or viscosity measured values representing a viscosity of the medium to be measured. The measured values can, in given cases, be displayed on-site and/or also sent in the form of digital measured data to a data processing system superordinated to the measuring system and there correspondingly further processed.

The above mentioned application of differentially acting oscillation exciter, and, respectively, oscillation sensors in the case of the here shown inner part provides, in such case, among other things, also the advantage that, for operating the measuring transducer of the invention, also such established measuring-, or driver circuits can be used, such as are, for example, already widely used in conventional Coriolis-mass flow/density measuring devices. The transmitter electronics 12 including the measuring-, or driver circuit can, furthermore, be accommodated, for example, in a separate electronics housing $7_2$, which is arranged remotely from the measuring transducer or, as shown in FIG. 1, for forming a single compact device, is affixed directly on the measuring transducer 1, for example, externally on the transducer housing $7_1$. In the case of the example of an embodiment shown here, there is, consequently, on the transducer housing $7_1$ additionally a necklike transition piece serving for holding the electronics housing $7_2$. Arranged within the transition piece can be, additionally, a hermetically sealed and/or pressure resistant feedthrough, for example, manufactured by means of glass- and/or plastic potting compound, for the electrical connecting lines between measuring transducer 11, especially the therein placed oscillation exciters and sensors, and the mentioned transmitter electronics 12.

As already multiply mentioned, the measuring system and, thus, also the measuring transducer 11, is provided, especially, for measurements also of high mass flows of more than 2200 t/h in a pipeline of large caliber of more than 250 mm. Taking this into consideration, according to an additional embodiment of the invention, the nominal diameter of the measuring transducer 11, which, as already mentioned, corresponds to a caliber of the pipeline, in whose course the measuring transducer 11 is to be used, is so selected, that it amounts to more than 100 mm, especially, however, is greater than 300 mm. Additionally, according to a further embodiment of the measuring transducer, it is provided, that each of the measuring tubes $18_1$, $18_2$, $18_3$, $18_4$ has, in each case, a caliber $D_{18}$ corresponding to a particular tube inner diameter, which amounts to more than 60 mm. Especially, the measuring tubes $18_1$, $18_2$, $18_3$, $18_4$ are additionally so embodied that each has a caliber $D_{18}$ of more than 80 mm. Alternatively thereto or in supplementation thereof, the measuring tubes $18_1$, $18_2$, $18_3$, $18_4$ are, according to another embodiment of the invention, additionally so dimensioned, that they have, in each case, a measuring tube length $L_{18}$ of at least 1000 mm. The measuring tube length $L_{18}$ corresponds, in the here illustrated example of an embodiment with equal length measuring tubes $18_1$, $18_2$, $18_3$, $18_4$, in each case, to a minimum distance between the first flow opening $20_{1A}$ of the first flow divider $20_1$ and the first flow opening $20_{2A}$ of the second flow divider $20_2$. Especially, the measuring tubes $18_1$, $18_2$, $18_3$, $18_4$ are, in such case, so designed, that their measuring tube length $L_{18}$ is, in each case, greater than 1200 mm.

Accordingly, there results, at least for the mentioned case, that the measuring tubes $18_1$, $18_2$, $18_3$, $18_4$ are composed of steel, in the case of the usually used wall thicknesses of over 1 mm, a mass of, in each case, at least 20 kg, especially more than 30 kg. One tries, however, to keep the empty mass of each of the measuring tubes $18_1$, $18_2$, $18_3$, $18_4$ smaller than 50 kg.

In consideration of the fact that, as already mentioned, each of the measuring tubes $18_1$, $18_2$, $18_3$, $18_4$, in the case of the measuring transducer of the invention, can weigh well over 20 kg and, in such case, such as directly evident from the above dimensional specifications, can have a capacity of easily 10 l or more, the inner part comprising then the four measuring tubes $18_1$, $18_2$, $18_3$, $18_4$ can, at least in the case of medium with high density flowing through, reach a total mass of far over 80 kg. Especially in the case of the application of measuring tubes with comparatively large caliber $D_{18}$, large wall thickness and large measuring tube length $L_{18}$, the mass of the inner part formed by the measuring tubes $18_1$, $18_2$, $18_3$, $18_4$ can directly, however, also be greater than 100 kg or, at least with medium flowing through, e.g. oil or water, be more than 120 kg. As a result of this, an empty mass $M_{11}$ of the measuring transducer amounts, in total, also to far more than 200 kg, and, in the case of nominal diameters $D_{11}$ of significantly greater than 250 mm, even more than 300 kg. As a result of this, the measuring transducer of the invention can have a mass ratio $M_{11}/M_{18}$ of an empty mass $M_{11}$ of the total measuring transducer to an empty mass $M_{18}$ of the first measuring tube of easily greater than 10, especially greater than 15.

In order, in the case of the mentioned high empty mass $M_{11}$ of the measuring transducer, to employ the therefor, in total, applied material as optimally as possible and, thus, to utilize the—most often also very expensive—material, in total, as efficiently as possible, according to an additional embodiment, the nominal diameter $D_{11}$ of the measuring transducer is so dimensioned relative to its empty mass $M_{11}$, that a mass to nominal diameter ratio $M_{11}/D_{11}$ of the measuring transducer 11, as defined by a ratio of the empty mass $M_{11}$ of the measuring transducer 11 to the nominal diameter $D_{11}$ of the measuring transducer 11, is smaller than 2 kg/mm, especially as much as possible, however, smaller than 1 kg/mm. In order to assure a sufficiently high stability of the measuring transducer 11, the mass to nominal diameter ratio $M_{11}/D_{11}$ of the measuring transducer 11 is, at least in the case use of the above mentioned conventional materials, however, to be chosen as much as possible greater than 0.5 kg/mm. Additionally, according to an additional embodiment of the invention, for additional improvement of the efficiency of the installed material, the mentioned mass ratio $M_{11}/M_{18}$ is kept smaller than 25.

For creation of a nevertheless as compact as possible measuring transducer of sufficiently high oscillation quality factor and as little pressure drop as possible, according to an additional embodiment of the invention, the measuring tubes are so dimensioned relative to the above mentioned, installed length $L_{11}$ of the measuring transducer 11, that a caliber to installed length ratio $D_{18}/L_{11}$ of the measuring transducer, as defined by a ratio of the caliber $D_{18}$ at least of the first measuring tube to the installed length $L_{11}$ of the measuring transducer 11, amounts to more than 0.02, especially more than 0.05 and/or less than 0.09. Alternatively or in supplementation, the measuring tubes $18_1$, $18_2$, $18_3$, $18_4$ are so dimensioned relative to the above mentioned installed length $L_{11}$ of the measuring transducer, that a measuring tube length to installed length ratio $L_{18}/L_{11}$ of the measuring transducer, as defined by a ratio of the measuring tube length $L_{18}$ at least of the first measuring tube to the installed length $L_{11}$ of the measuring transducer, amounts to more than 0.7, especially more than 0.8 and/or less than 0.95.

In case required, possibly or at least potentially, mechanical stresses and/or vibrations caused by the vibrating, especially in the mentioned manner, relatively large dimensioned, measuring tubes at the inlet side or at the outlet side in the transducer housing can e.g. be minimized by connecting the four measuring tubes $18_1$, $18_2$, $18_3$, $18_4$ with one another mechanically at least pairwise on the inlet side, and at least pairwise on the outlet side, in each case, by means of coupling elements serving as so-called node plates—in the following referred to as coupling elements of first type. Moreover, by means of such coupling elements of first type, be it through their dimensioning and/or their positioning on the measuring tubes, mechanical eigenfrequencies of the measuring tubes and, thus, also mechanical eigenfrequencies of the inner part formed by means of the four measuring tubes as well as thereon placed, additional components of the measuring transducer and, thus, also the oscillatory behavior of the inner part as a whole can, with targeting, be influenced.

The coupling elements of first type serving as node plates can, for example, be thin plates, or washers, manufactured especially from the same material as the measuring tubes, which, in each case, corresponding with the number and the outer dimensions of the measuring tubes to be coupled with one another, are provided with bores, in given cases, supplementally, slitted to the edge, so that the washers can first be mounted onto the respective measuring tubes $18_1$, $18_2$, $18_3$, or $18_4$ and, in given cases, thereafter still be bonded to the respective measuring tubes, for example, by hard soldering or welding.

Accordingly, the measuring transducer comprises, according to an additional embodiment of the invention, a first coupling element $24_1$ of first type, which is affixed on the inlet side at least to the first measuring tube and to the second measuring tube and spaced both from the first flow divider as well as also from the second flow divider for forming inlet-side, oscillation nodes at least for vibrations, especially bending oscillations, of the first measuring tube and for thereto opposite equal vibrations, especially bending oscillations, of the second measuring tube, as well as a second coupling element $24_2$ of first type, especially a second coupling element $24_2$ constructed equally to the first coupling element, which is affixed on the outlet side at least to the first measuring tube $18_1$ and to the second measuring tube $18_2$ and spaced both from the first flow divider $20_1$ as well as also from the second flow divider $20_2$, as well as also from the first coupling element $24_1$, for forming outlet-side, oscillation nodes at least for vibrations, especially bending oscillations, of the first measuring tube $18_1$ and for thereto opposite equal vibrations, especially bending oscillations, of the second measuring tube $18_2$. As directly evident amongst others from FIGS. 4a, 4b, and FIGS. 5a, 5b, respectively, the first coupling element $24_1$ of first type is affixed on the inlet side also to the third measuring tube $18_3$ and to the fourth measuring tube $18_4$ and spaced both from the first flow divider $20_1$ as well as also from the second flow divider $20_2$, for forming inlet-side, oscillation nodes also for vibrations, especially bending oscillations, of the third measuring tube $18_3$ and for thereto opposite equal vibrations, especially bending oscillations, of the fourth measuring tube $18_4$, and the second coupling element $24_2$ of first type is affixed on the outlet side also to the third measuring tube $18_3$ and to the fourth measuring tube $18_4$ and spaced both from the first flow divider $20_1$ as well as also from the second flow divider $20_2$, as well as also from the first coupling element $24_1$, for forming outlet-side, oscillation nodes at least for vibrations, especially bending oscillations, of the third measuring tube $18_3$ and for thereto opposite equal vibrations, especially bending oscillations, of the fourth measuring tube $18_4$, so that, as a result, all four measuring tubes $18_1$, $18_2$, $18_3$, $18_4$ are mechanically connected with one another by means of the first coupling element $24_1$ of first type as well as by means of the second coupling element $24_2$ of first type. Each of the two aforementioned coupling elements $24_1$, $24_2$ of first type, especially coupling elements constructed equally to one another, is, according to an additional embodiment of the invention, plate shaped, especially in such a manner, that it has, as well as also directly evident from the combination of figures, a rather rectangular or also square, basic shape or, however, that it has, rather, a round, an oval, a cross shaped or, such as, for example, also provided in US-A 2006/0283264, a rather H-shaped basic shape. Additionally, the two coupling elements $24_1$, $24_2$, are oriented to extend essentially parallel to one another.

Figure 5A:
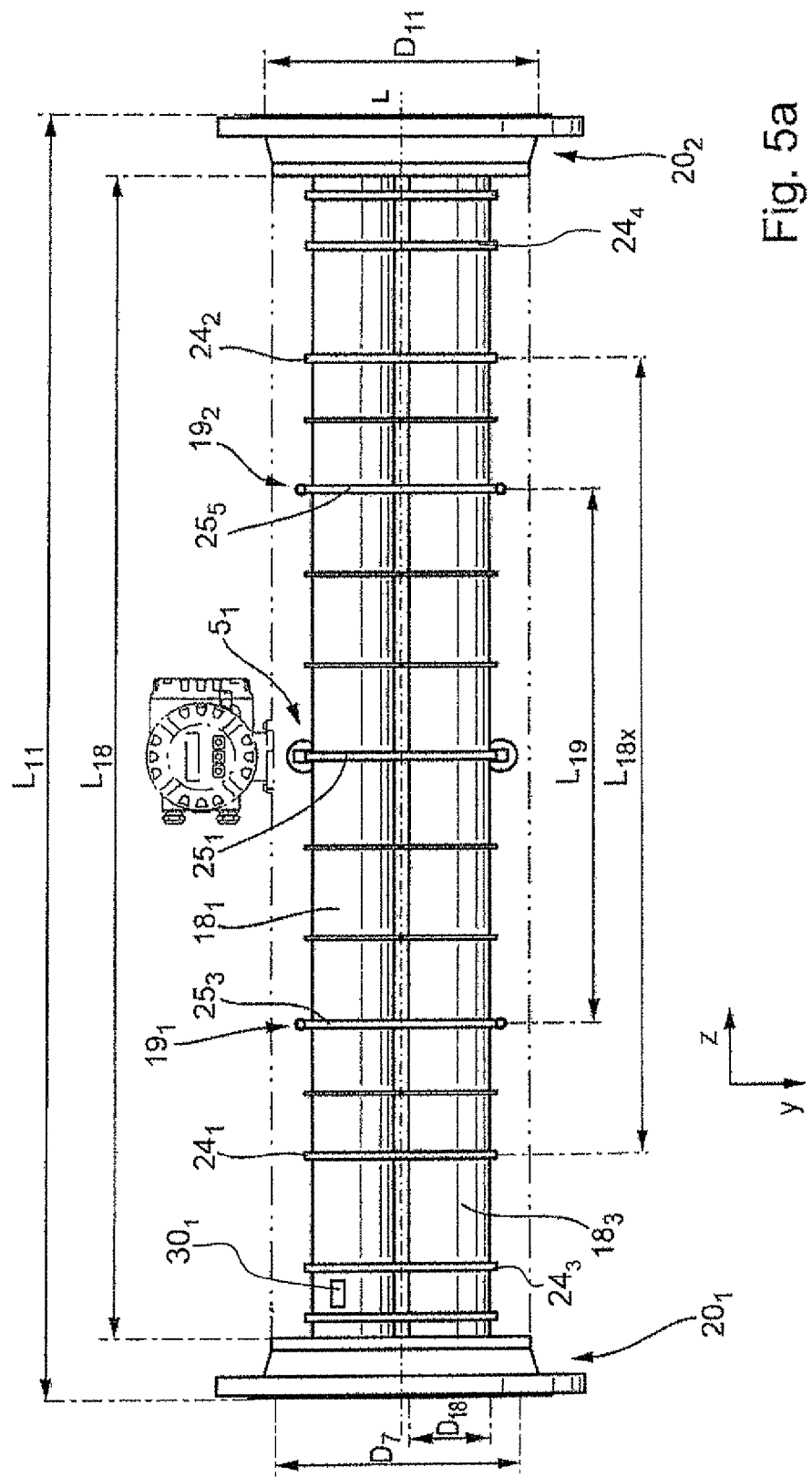
FIGS. 5a and 5b show a projection of the measuring transducer of FIG. 4 in two different side views.
Figure 5B:
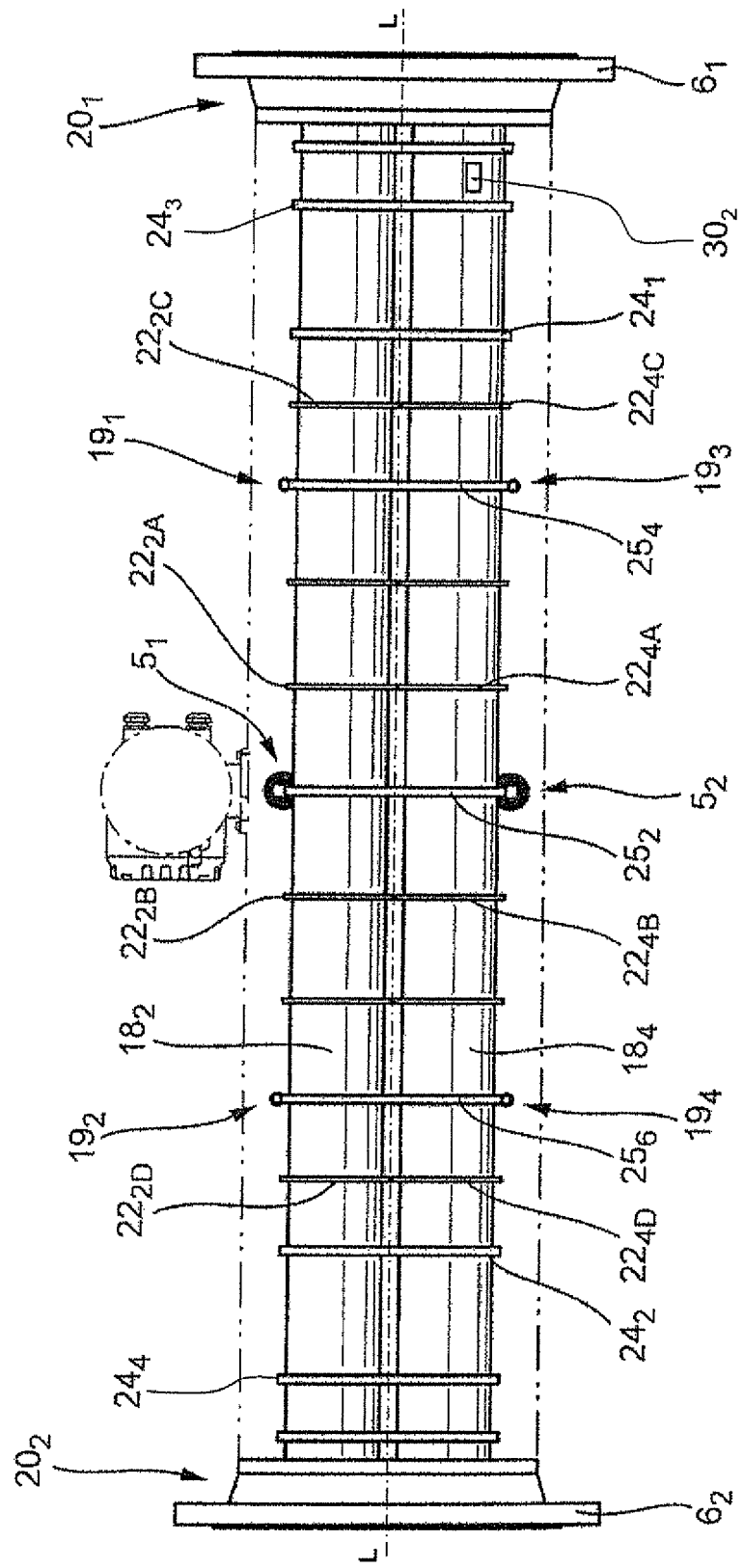

As amongst others directly evident from FIGS. 4 and 5a, 5b, respectively, the two aforementioned coupling elements $24_1$, $24_2$ are additionally so embodied and so placed in the measuring transducer, that a center of mass of the first coupling element $24_1$ of first type has a distance to a center of mass of the measuring transducer 11, which is essentially equal to a distance of a center of mass of the second coupling element $24_2$ of first type to said center of mass of the measuring transducer 11, especially in such a manner, that the two coupling elements $24_1$, $24_2$ are, as a result, arranged symmetrically to a shared imaginary cross sectional plane, in each case, cutting centrally through the measuring tubes $18_1$, $18_2$, $18_3$, $18_4$.

For additionally increasing the degrees of freedom in the case of optimizing the oscillatory behavior of the inner part formed by means of the four measuring tubes $18_1$, $18_2$, $18_3$, $18_4$, the measuring transducer 11 comprises, according to a further development of the invention, additionally a third coupling element $24_3$ of first type, which is affixed on the inlet side at least to the third measuring tube $18_3$ and to the fourth measuring tube $18_4$ and spaced both from the first flow divider $20_1$ as well as also from the second flow divider $20_2$ for forming inlet-side, oscillation nodes at least for vibrations, especially bending oscillations, of the third measuring tube $18_3$ and for thereto opposite equal vibrations, especially bending oscillations, of the fourth measuring tube $18_4$. Moreover, the measuring transducer 11 comprises, in the case of this further development, a fourth coupling element $24_4$ of first type, especially a fourth coupling element constructed equally to the third coupling element $24_3$ of first type, which fourth coupling element is affixed on the outlet side at least to the third measuring tube $18_3$ and to the fourth measuring tube $18_4$ and spaced both from the first flow divider $20_1$ as well as also from the second flow divider $20_2$, as well as also from the third coupling element $24_3$ of first type, for forming outlet-side, oscillation nodes at least for vibrations, especially bending oscillations, of the third measuring tube $18_3$ and for thereto opposite equal vibrations, especially bending oscillations, of the fourth measuring tube $18_4$.

Each of the two aforementioned third and fourth coupling elements $24_3$, $24_4$ of first type, especially third and fourth coupling elements constructed equally to one another, is embodied, according to an additional embodiment of the invention, again, plate shaped, especially in such a manner, that it has a rectangular, square, round, X, or cross, shaped or H-shaped, basic shape. Additionally, the two aforementioned third and fourth coupling elements $24_3$, $24_4$, are oriented to extend essentially parallel to one another.

As shown in FIGS. 4, and 5a, 5b, respectively, the third coupling element $24_3$ of first type is affixed on the inlet side also to the first measuring tube $18_1$ and to the second measuring tube $18_2$ and spaced both from the first flow divider $20_1$, as well as also from the second flow divider $20_2$, as well as also from the first coupling element of first type $24_1$, and the fourth coupling element $24_4$ of first type is affixed on the outlet side also to the first measuring tube and to the second measuring tube and spaced both from the first flow divider as well as also from the second flow divider, as well as also from the second coupling element, so that, as a result, all four measuring tubes $18_1$, $18_2$, $18_3$, $18_4$ are connected mechanically with one another also by means of the third coupling element $24_3$ of first type as well as by means of the fourth coupling element $24_4$ of first type.

As directly evident from the combination of FIGS. 4, 5a, 5b, also the third and fourth coupling elements $24_3$, $24_4$ are additionally so embodied and so placed in the measuring transducer, that a center of mass of the third coupling element $24_3$ of first type has a distance to the center of mass of the measuring transducer, which essentially is equal to a distance of a center of mass of the fourth coupling element $24_4$ of first type to said center of mass of the measuring transducer, especially in such a manner, that the two coupling elements $24_3$, $24_4$ are, as a result, arranged symmetrically to a shared imaginary cross sectional plane, in each case, cutting centrally through the four measuring tubes $18_1$, $18_2$, $18_3$, $18_4$. Additionally, according to a further embodiment of the invention, the four coupling element $24_1$, $24_2$, $24_3$, $24_4$ of first type are so arranged in the measuring transducer, that the distance of the center of mass of the third coupling element $24_3$ of first type from the center of mass of the measuring transducer is greater than the distance of the center of mass of the first coupling element $24_1$ of first type from said center of mass of the measuring transducer and greater than the distance of the center of mass of the second coupling element $24_2$ of first type from said center of mass of the measuring transducer.

As directly evident from the combination of FIGS. 4, 5a and 5b, a minimum distance between the coupling element of first type affixed on the inlet side to the respective measuring tube and lying nearest the center of mass of the measuring transducer 11—here thus the first coupling element $24_1$ of first type—and the coupling element of first type affixed on the outlet side to said measuring tube and lying nearest the center of mass of the measuring transducer—here thus the second coupling element $24_2$ of first type—define, in each case, a free oscillatory length, $L_{18x}$, of such measuring tube, wherein, according to an additional embodiment of the invention, the coupling elements of first type are so placed in the measuring transducer, that, as a result, the free, oscillatory length of each of the measuring tubes $18_1$, $18_2$, $18_3$, $18_4$ amounts to less than 2500 mm, especially less than 2000 mm and/or more than 800 mm. Alternatively or in supplementation, it is additionally provided that all four measuring tubes $18_1$, $18_2$, $18_3$, $18_4$, as a result, have the same free oscillatory length, $L_{18x}$.

It can additionally, in the context of a still simpler and yet more exact adjusting of the oscillatory behavior of the measuring transducer, be quite of advantage, when the measuring transducer, such as, for example, provided in US-A 2006/0150750, moreover, has still other coupling elements of the aforementioned type serving for forming inlet, or outlet, side, oscillation nodes for vibrations, especially bending oscillations, of the first measuring tube and for thereto opposite equal vibrations, especially bending oscillations, of the second measuring tube, or for vibrations, especially bending oscillations, of the third measuring tube and for thereto opposite equal vibrations, especially bending oscillations, of the fourth measuring tube, for example, thus, in total, 6 or 8 such coupling elements of first type.

For creation of an as compact as possible measuring transducer of sufficiently high oscillation quality factor and high sensitivity in the case of as little pressure drop as possible, according to an additional embodiment of the invention, the measuring tubes $18_1$, $18_2$, $18_3$, $18_4$ are so dimensioned relative to the mentioned free, oscillatory length that a caliber to oscillatory length ratio $D_{18}/L_{18x}$ of the measuring transducer, as defined by a ratio of the caliber $D_{18}$ of the first measuring tube to the free, oscillatory length $L_{18x}$ of the first measuring tube, amounts to more than 0.07, especially more than 0.09 and/or less than 0.15. Alternatively or in supplementation, for this, according to an additional embodiment of the invention, the measuring tubes $18_1$, $18_2$, $18_3$, $18_4$ are so dimensioned relative to the above mentioned installed length $L_{11}$ of the measuring transducer that an oscillatory length to installed length ratio $L_{18x}/L_{11}$ of the measuring transducer, as defined by a ratio of the free, oscillatory length $L_{18x}$ of the first measuring tube to the installed length $L_{11}$ of the measuring transducer, amounts to more than 0.55, especially more than 0.6 and/or less than 0.9.

According to an additional embodiment of the invention, the oscillation sensors, relative to the free, oscillatory length, are so arranged in the measuring transducer, that a measuring length to oscillatory length ratio of the measuring transducer, as defined by a ratio of the mentioned measuring length of the measuring transducer to the free, oscillatory length of the first measuring tube, amounts to more than 0.6, especially more than 0.65 and/or less than 0.95.

For creation of an as compact as possible measuring transducer, which is, nevertheless, however, as sensitive as possible to mass flow, according to an additional embodiment of the invention, the oscillation sensors are so arranged in the measuring transducer relative to the installed length of the measuring transducer that a measuring length to installed length ratio of the measuring transducer, which is defined by a ratio of the measuring length to the installed length of the measuring transducer, amounts to more than 0.3, especially more than 0.4 and/or less than 0.7. Alternatively or in supplementation, the oscillation sensors are, according to an additional embodiment of the invention, so placed in the measuring transducer relative to the measuring tubes, that a caliber to measuring length ratio $D_{18}/L_{19}$ of the measuring transducer, which is defined by a ratio of the caliber $D_{18}$ of the first measuring tube to the measuring length $L_{19}$ of the measuring transducer, amounts to more than 0.05, especially more than 0.09. In an additional embodiment of the invention, additionally, the above mentioned measuring length $L_{19}$ is kept smaller than 1200 mm.

In an additional embodiment of the invention, it is further provided that the measuring tubes $18_1$, $18_2$, $18_3$, $18_4$ are driven, during operation, pairwise synchronously, thus with equal phase position, so that the oscillations of all four measuring tubes $18_1$, $18_2$, $18_3$, $18_4$ are only pairwise out of phase. In advantageous manner, the oscillatory behavior of the inner part formed by means of the four measuring tubes $18_1$, $18_2$, $18_3$, $18_4$ together with the exciter mechanism and the vibration sensor arrangement, as well as also the driver signals controlling the exciter mechanism, are so matched to one another, that at least the oscillations of the four measuring tubes $18_1$, $18_2$, $18_3$, $18_4$ excited in the wanted mode are so developed, that the first and the second measuring tubes $18_1$, $18_2$ oscillate essentially opposite equally relative to one another, and also the third and fourth measuring tubes $18_3$, $18_4$ oscillate essentially opposite equally relative to one another, while, simultaneously, the first and third measuring tubes $18_1$, $18_3$ oscillate with essentially equal phase relative to one another and the second and fourth measuring tubes $18_2$, $18_4$ oscillate with essentially equal phase relative to one another.

Therefore, the measuring transducer includes, according to a further embodiment of the invention, additionally a first coupling element $25_1$ of second type, especially a plate shaped or rod shaped, first coupling element $25_1$ of second type, which is affixed to the first measuring tube $18_1$ and to the third measuring tube $18_3$ but to none other of the measuring tubes, and thus only to the first measuring tube $18_1$ and to the third measuring tube $18_3$, and spaced both from the first coupling element $24_1$ of first type as well as also from the second coupling element $24_2$ of first type, for synchronizing vibrations, especially bending oscillations, of the first measuring tube $18_1$ and thereto equal frequency vibrations, especially bending oscillations, of the third measuring tube $18_3$. Furthermore, the measuring transducer comprises, at least in the case of this embodiment of the invention, at least a second coupling element $25_2$ of second type, especially a plate shaped or rod shaped, second coupling element $25_2$ of second type, which is affixed to the second measuring tube $18_2$ and to the fourth measuring tube $18_4$ but to none other of the measuring tubes, and thus only to the second measuring tube $18_2$ and to the fourth measuring tube $18_4$, and spaced both from the first coupling element $24_1$ of first type as well as also from the second coupling element $24_1$ of first type, as well as also from the first coupling element $25_1$ of second type, for synchronizing vibrations, especially bending oscillations, of the second measuring tube $18_2$ and thereto equal frequency vibrations, especially bending oscillations, of the fourth measuring tube $18_4$. As directly evident from the combination of FIGS. 4, 5a and 5b, the first and second coupling elements $25_1$, $25_2$ of second type are placed in the measuring transducer 11 as oppositely lying to one another as possible.

An advantage of the mechanical coupling of the measuring tubes in the above described manner is, among other things, to be seen in the fact that the four measuring tubes $18_1$, $18_2$, $18_3$, $18_4$ are reduced to two measuring tube composites acting, in each case, effectively as one oscillatory system, each thus acting essentially as a single measuring tube, since the exciter forces produced by the exciter mechanism 5 act, due to the mechanical coupling, both between the first and second measuring tubes $18_1$, $18_2$ as well as also equally between the third and fourth measuring tubes $18_3$, $18_4$, and, in turn, also the reaction forces caused in the through-flowing media for purposes of the measuring are transmitted, in each case, together back to the oscillation sensors of the vibration sensor arrangement 5. Furthermore, possible differences between the individual measuring tubes $18_1$, $18_2$, $18_3$, $18_4$ can as regards their nominal oscillatory behavior, e.g. as a result of non-uniform flow, different temperatures, and/or different density distributions, etc., be cancelled in very simple manner. The application of coupling elements of second type has additionally also the advantage, that each of the two measuring tube composites formed, thus, in very simple manner, acts, not only for the exciter mechanism, but equally also for the vibration sensor arrangement 19, and, thus, also for the measuring, and driver, circuit of the transmitter electronics 12, in total, practically, in each case, as a single measuring tube, and the measuring transducer 11, thus, from the point of view of the measuring, and driving, circuit, seems to have only two measuring tubes oscillating relative to one another. As a result of this, at least for the preprocessing and possible digitizing of the oscillation measurement signals, proven signal processing technologies and also proven, especially two channel (thus processing oscillation measurement signals delivered from only two oscillation sensors) measuring circuits from the field of Coriolis, mass flow, or density measurement, can be utilized. Equally, thus, also for the driver circuit driving the exciter mechanism, driver circuits known to those skilled in the art, especially such operating on one channel, thus delivering exactly one driver signal for the exciter mechanism, can be directly used. In case required, however, also the oscillation measurement signals delivered, in each case, from the two or more oscillation sensors can, however, also be individually preprocessed and correspondingly digitized in, in each case, separate measuring channels; equally, in case required, also the, in given cases, present, two or more oscillation exciters can be operated separately by means of separate driver signals.

According to an embodiment of the invention, the measuring tubes $18_1$, $18_2$, $18_3$, $18_4$, as well as the coupling elements connecting these with one another, are, consequently, additionally so formed and so mechanically coupled with one another by means of coupling elements of second type, in given cases, supplementally also by means of coupling elements of first type, that a first measuring tube composite formed from the first and the third measuring tubes $18_1$, $18_3$ and a second measuring tube composite formed by the second and the fourth measuring tubes $18_2$, $18_4$ have essentially the same mechanical eigenfrequencies.

In the example of an embodiment shown here, the first coupling element $25_1$ of second type is affixed to the first and third, measuring tubes $18_1$, $18_3$, respectively, in the region of 50% of a minimum separation between the first coupling element $24_1$ of first type and the second coupling element $24_2$ of first type—, as a result, thus at about half the free, oscillatory length of the first and third measuring tubes $18_1$, $18_3$, respectively. Additionally, also the second coupling element of second type is in corresponding manner affixed to the second and fourth measuring tubes $18_2$, $18_4$, respectively, in the region of 50% of a minimum separation between the first coupling element $24_1$ of first type and the second coupling element $24_2$ of first type, thus at about half the free, oscillatory length of the second and fourth measuring tubes $18_2$, $18_4$, respectively.

In advantageous manner, the coupling elements of second type can supplementally also serve as holders of components of the exciter mechanism 5. Therefore, according to an additional embodiment of the invention, it is provided, that each of the oscillation exciters $5_1$, $5_2$, especially equally constructed oscillation exciters, is held, partially, in each case, on two coupling elements of second type—here, the first and second coupling elements $25_1$, $25_2$—lying opposite to one another. Thus, it can, in very effective and, equally as well, very simple manner, be assured, that the exciter force generated by means of the oscillation exciter $5_1$ effects at least predominantly synchronous, especially also of essentially equal phase to one another, bending oscillations of the first and third measuring tubes $18_1$, $18_3$, or the second and fourth measuring tubes $18_2$, $18_4$. For example, in the case of electrodynamic oscillation exciters, the cylindrical coils can be affixed to the first coupling element of second type and the, in each case, associated permanent magnet to the oppositely lying, second coupling element of second type. For the mentioned case, in which the exciter mechanism 5 has two oscillation exciters $5_1$, $5_2$, both the first oscillation exciter $5_1$ as well as also the second oscillation exciter $5_2$ can, in each case, be held on the first and second coupling elements $25_1$, $25_2$ of second type, for example, also in such a manner, that, as directly evident from FIG. 4, or FIG. 5a, there is a minimum separation between the first and second oscillation exciters $5_1$, $5_2$ of more than two times as large as a tube outer diameter of the measuring tubes $18_1$, $18_2$, $18_3$, $18_4$, at least, however, of the first measuring tube $18_1$. In this way, an optimal exploitation of the available room in the inner space of the transducer housing $7_1$ and also a simple mounting of the oscillation exciters $5_1$, $5_2$ are enabled.

According to an additional embodiment of the invention, the measuring transducer comprises, additionally, a third coupling element $25_3$ of second type, for example, again, a plate shaped or rod shaped, coupling element of second type, which is affixed to the first measuring tube $18_1$ and to the third measuring tube $18_3$ and otherwise to none other of the measuring tubes, and thus only to the first measuring tube $18_1$ and to the third measuring tube $18_3$, and spaced both from the first coupling element $24_1$ of first type as well as also from the second coupling element $24_2$ of first type, as well as also from the first coupling element $25_1$ of second type, for synchronizing vibrations, especially bending oscillations, of the first measuring tube $18_1$ and thereto equal frequency vibrations, especially bending oscillations, of the third measuring tube $18_3$, as well as a fourth coupling element $25_4$ of second type, especially a plate shaped or rod shaped, coupling element of second type, which is affixed to the second measuring tube $18_2$ and to the fourth measuring tube $18_4$ and otherwise to none other of the measuring tubes, and thus only to the second measuring tube $18_2$ and to the fourth measuring tube $18_4$, and spaced both from the first and second coupling elements of first type as well as also from the second and third coupling elements of second type, in each case, for synchronizing vibrations, especially bending oscillations, of the second measuring tube $18_2$ and thereto equal frequency vibrations, especially bending oscillations, of the fourth measuring tube $18_4$. The third and fourth coupling elements $25_3$, $25_4$ of second type are, such as directly evident from the combination of FIGS. 4, 5*a* and 5*b*, preferably placed in the measuring transducer 11 lying opposite to one another.

Additionally, the measuring transducer 11 comprises, according to an additional embodiment of the invention, a fifth coupling element $25_5$ of second type, especially a plate shaped or rod shaped fifth coupling element $25_5$ of second type, which is affixed to the first measuring tube $18_1$ and to the third measuring tube $18_3$ and otherwise to none other of the measuring tubes, and thus only to the first measuring tube $18_1$ and to the third measuring tube $18_3$, and spaced both from the first and second coupling elements of first type as well as also from the first and third coupling elements of second type, for synchronizing vibrations, especially bending oscillations, of the first measuring tube $18_1$ and of thereto equal frequency vibrations, especially bending oscillations, of the third measuring tube $18_3$, as well as a sixth coupling element $25_6$ of second type, especially a plate shaped or rod shaped, sixth coupling element $25_6$ of second type, which is affixed to the second measuring tube $18_2$ and to the fourth measuring tube $18_4$ and otherwise to none other of the measuring tubes, and thus only to the second measuring tube $18_2$ and to the fourth measuring tube $18_4$, and spaced, in each case, both from the first and second coupling elements of first type as well as also from the second, fourth and fifth coupling elements of second type, for synchronizing vibrations, especially bending oscillations, of the second measuring tube and of thereto equal frequency vibrations, especially bending oscillations, of the fourth measuring tube. The fifth and sixth coupling elements $25_5$, $25_6$ of second type are, preferably, again, placed lying opposite to one another in the measuring transducer 11.

Furthermore, it can be of advantage to use the aforementioned coupling elements of second type additionally also for holding individual components of the vibration sensor arrangement. In accordance therewith, it is provided, according to an additional embodiment of the invention, that the inlet-side, first oscillation sensor $19_1$ is held, partially, in each case, on the third and fourth coupling elements $25_3$, $25_4$ of second type. Additionally, the second oscillation sensor $19_2$ is, in corresponding manner, held on the fifth and sixth coupling elements $25_5$, $25_6$ of second type. Thus, it can, in very effective, equally as well very simple manner, be assured, that the oscillation measurement signal generated, during operation, by means of the first oscillation sensor $19_1$ represents. at least predominantly, synchronous, inlet-side, bending oscillations (especially also bending oscillations of equal phase to one another) of the first and third measuring tubes $18_1$, $18_3$ relative to the equally synchronized, inlet-side, bending oscillations (especially also bending oscillations of phase equal to one another) of the second and fourth measuring tubes $18_2$, $18_4$, or that the oscillation measurement signal generated, during operation, by means of the second oscillation sensor $19_2$ represents, at least predominantly, synchronous, outlet-side, bending oscillations (especially also bending oscillations of phase equal to one another) of the first and third measuring tubes $18_1$, $18_3$ relative to the equally synchronized, outlet-side, bending oscillations (especially also bending oscillations of phase equal to one another) of the second and fourth measuring tubes $18_2$, $18_4$. For example, in the case of electrodynamic oscillation sensors, the cylindrical coil of the first oscillation sensor $19_1$ can be affixed to the third coupling element of second type and the associated permanent magnet to the oppositely lying, fourth coupling element of second type, or the cylindrical coil of the second oscillation sensor $19_2$ can be affixed to the fifth, and the associated permanent magnet to the oppositely lying, sixth coupling element of second type. For the mentioned case, in which the vibration sensor arrangement 19 is formed by means of four oscillation sensors $19_1$, $19_2$, $19_3$, $19_4$, according to an additional embodiment of the invention, both the first oscillation sensor $19_1$ as well as also the third oscillation sensor $19_3$ are, in each case, partially held on the third and fourth coupling elements of second type, especially in such a manner, that, such as directly evident from the combination of FIGS. 4, 5*a* and 5*b*, a minimum separation between the first and third oscillation sensors $19_1$, $19_3$ is more than twice as large as a tube outer diameter of the first measuring tube $18_1$. In corresponding manner, additionally, also the second oscillation sensor $19_2$ and the fourth oscillation sensor $19_4$ can, in each case, be held on the fifth and sixth coupling elements of second type, especially in such a manner that, as directly evident from the combination of FIGS. 4, 5*a* and 5*b*, a minimum distance between the second and fourth oscillation sensors $19_2$, $19_4$ is more than twice as large as a tube outer diameter of the first measuring tube $18_1$, whereby, as a whole, an optimal exploitation of the room available in the inner space of the transducer housing $7_1$ and also a simple mounting of the oscillation sensors of the vibration sensor arrangement 19 are enabled. Therefore, is according to an additional embodiment of the invention, each of the oscillation sensors, especially equally constructed oscillation sensors, of the vibration sensor arrangement 19 held on two mutually opposing coupling elements of second type.

Figure 3A:
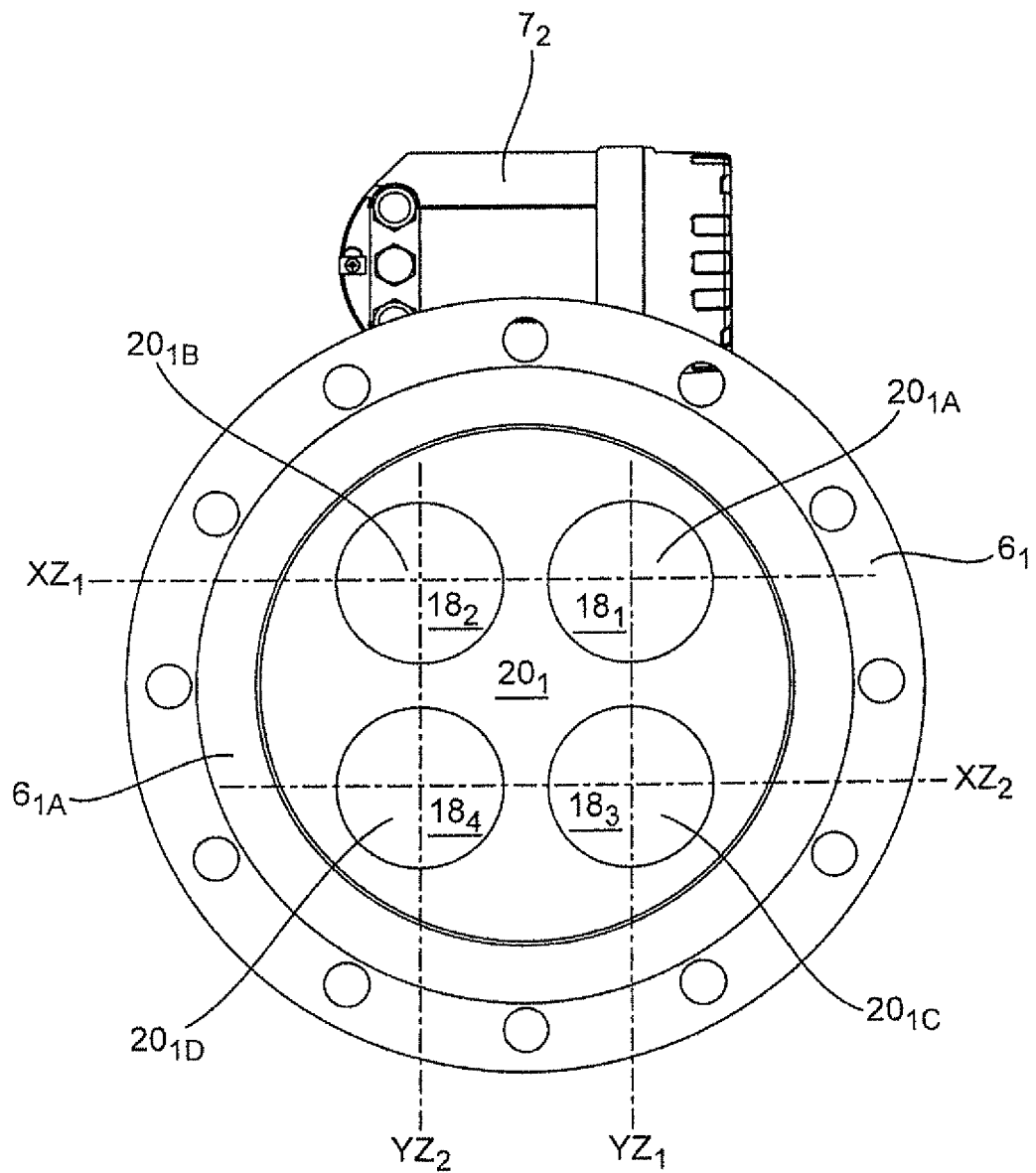
FIGS. 3a and 3b show a projection of the measuring system of FIG. 1 in two different side views.
Figure 3B:
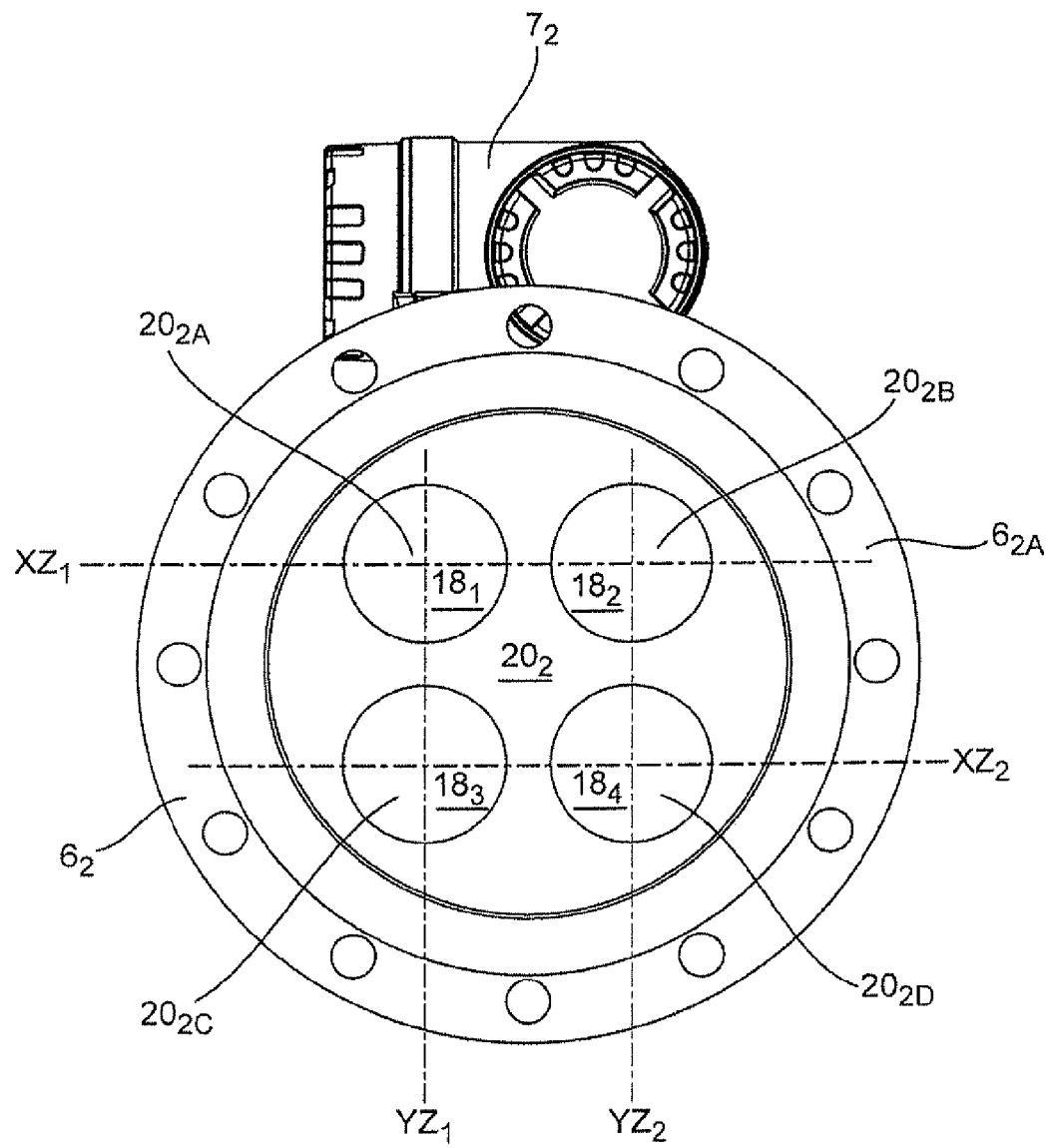
Figure 7:
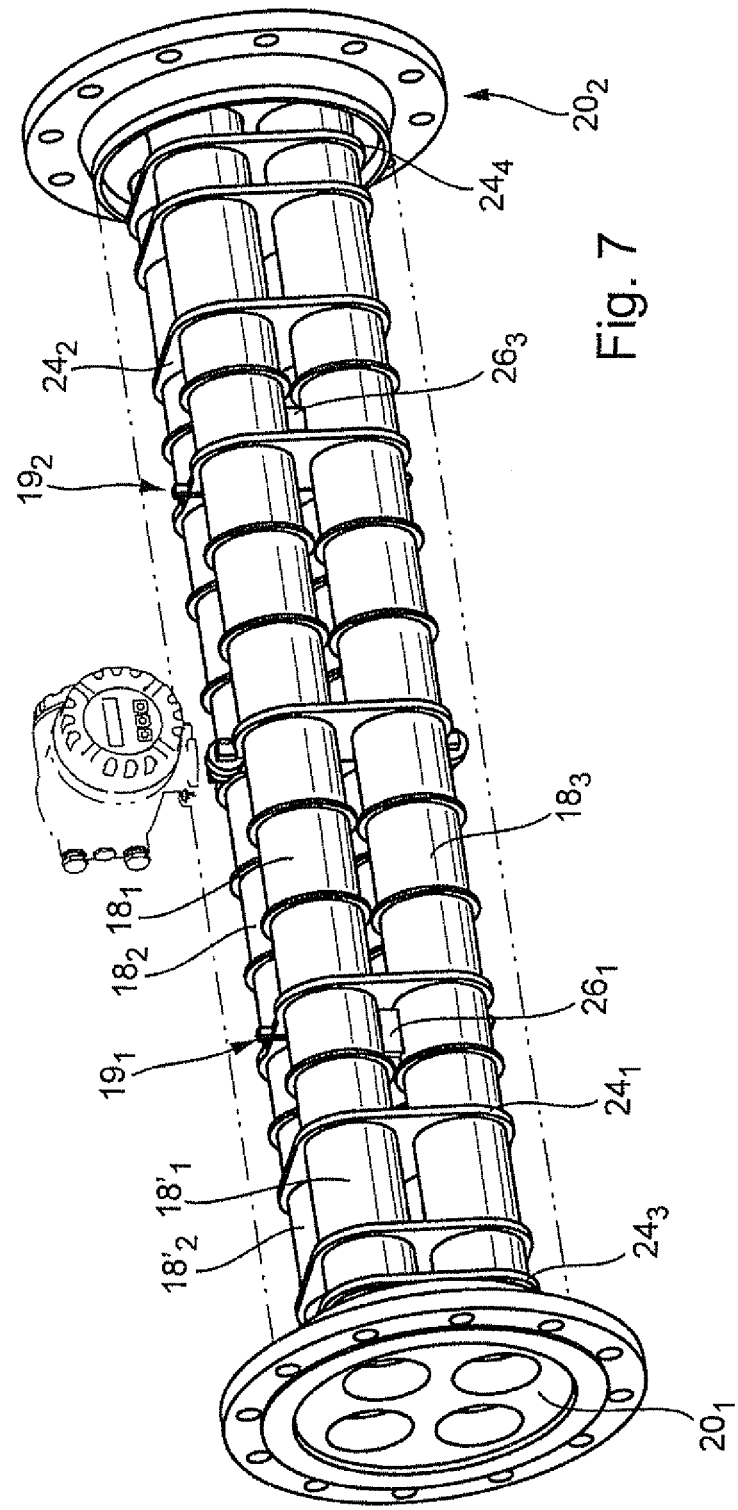
FIG. 7 shows in perspective side view, a further development of the measuring transducer according to FIG. 4, as a component of a measuring system according to FIG. 1.
Figure 8A:
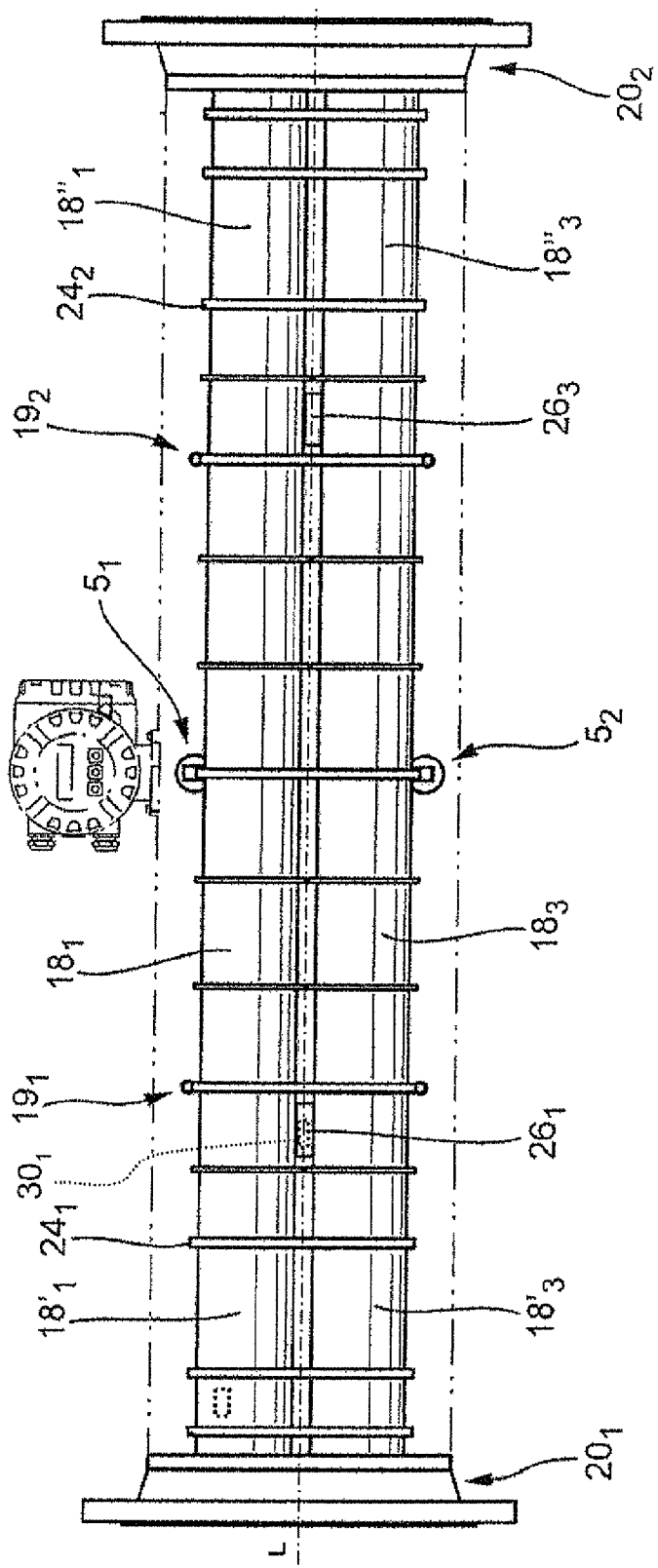
FIGS. 8a and 8b show a projection of the measuring transducer according to FIG. 7 in two different side views.
Figure 8B:
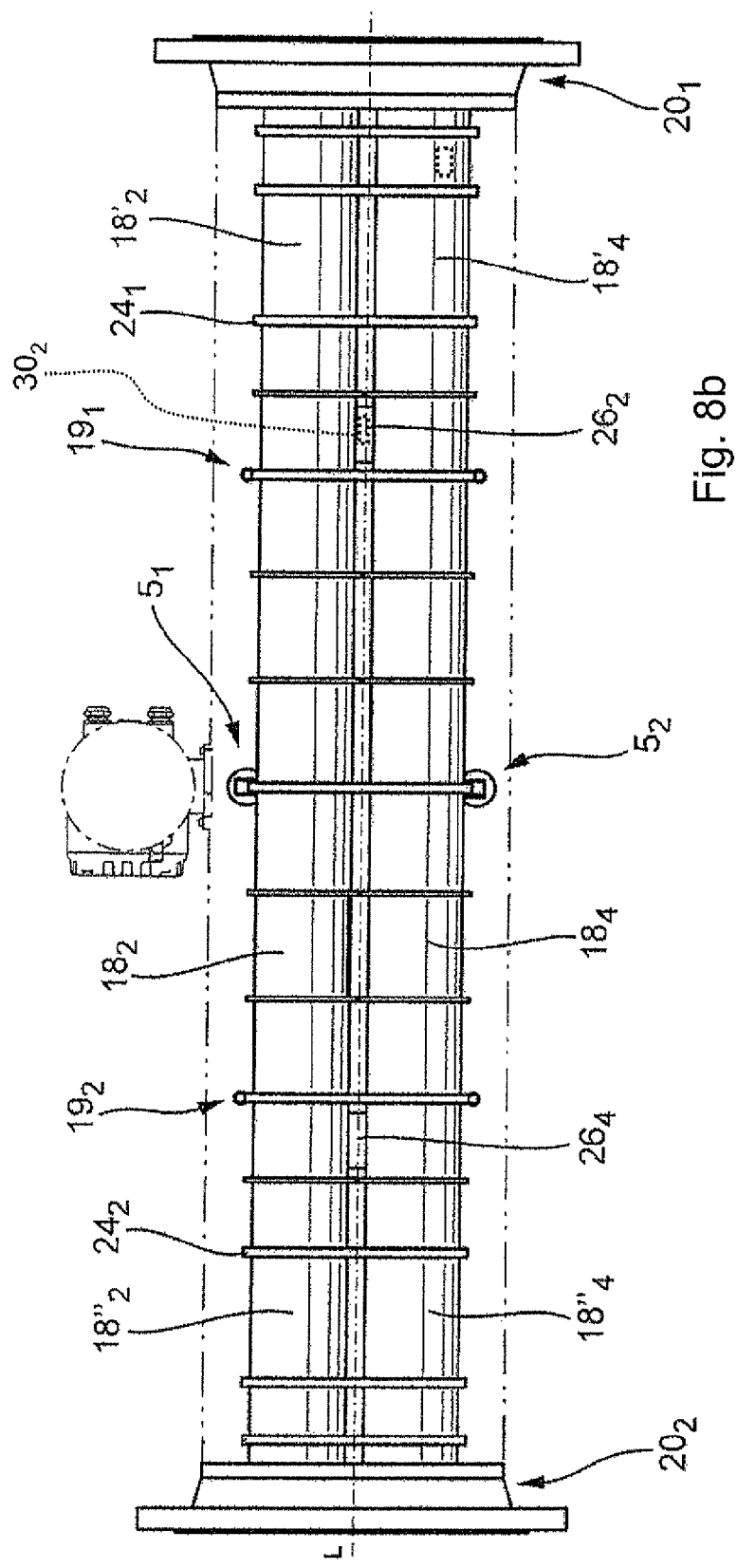

For additional improving of the oscillation quality factor of the inner part in the case of an as short as possible installed length $L_{11}$ of the measuring transducer 11, or as short as possible free oscillatory length $L_{18x}$ of the measuring tubes $18_1$, $18_2$, $18_3$, or $18_4$, the measuring transducer comprises, according to an additional embodiment of the invention, a plurality of annular stiffening elements $22_{1A}$, . . . $22_{2A}$, . . . $22_{3A}$, . . . $22_{4A}$, . . . , especially stiffening elements of equal construction, of which each is so placed on exactly one of the measuring tubes $18_1$, $18_2$, $18_3$, $18_4$ that it grips around such along one of its, especially encircling, imaginary peripheral surface elements; compare, in this connection, also the initially mentioned U.S. Pat. No. 6,920,798. Especially, it is, in such case, additionally provided that at least four of said stiffening elements $22_{1A}$, $22_{1B}$, $22_{1C}$, $22_{1D}$, respectively $22_{2A}$, $22_{2B}$, $22_{2C}$, $22_{2D}$, respectively $22_{3A}$, $22_{3B}$, $22_{3C}$, $22_{3D}$, respectively $22_{4A}$, $22_{4B}$, $22_{4C}$, $22_{4D}$, especially equally constructed stiffening elements, are placed on each of the measuring tubes $18_1$, $18_2$, $18_3$, and $18_4$, respectively. The stiffening elements $22_{1A}$, . . . $22_{2A}$, . . . $22_{3A}$, . . . $22_{4A}$, . . . are placed in advantageous manner in such a way in the measuring transducer 11 that two adjoining stiffening elements mounted on the same measuring tube have a distance from one another that amounts to at least 70% of a tube outer diameter of said measuring tube, at most, however, 150% of such tube outer diameter. Proved as especially suitable has been, in such case, a spacing of neighboring stiffening elements relative to one another, which lies in the range of 80% to 120% of the tube outer diameter of the respective measuring tube $18_1$, $18_2$, $18_3$, or $18_4$. Alternatively thereto or in supplementation thereof, for improving the oscillation characteristics of the inner part, and, insofar, also for improving the accuracy of measurement of the measuring transducer, it is additionally provided that the measuring transducer has, as schematically shown in FIGS. 7, 8*a*, 8*b*, furthermore, plate shaped stiffening elements $26_1$, $26_2$, $26_3$, $26_4$ for tuning the natural eigenfrequencies of bending oscillations of the measuring tubes $18_1$, $18_2$, $18_3$, or $18_4$ also in those oscillation planes $YZ_1$, $YZ_2$, which, as evident from FIGS. 3*a*, 3*b*, are essentially perpendicular to the above mentioned plane $XZ_1$, $XZ_2$, of oscillation. The plate shaped stiffening elements $26_1$, $26_2$, $26_3$, $26_4$, for example, plate shaped stiffening elements of equal construction, are, in such case, especially, so embodied and, in each case, so connected with the measuring tubes that, as a result, at least the bending oscillation resonance frequencies of the bending oscillations of the measuring tubes $18_1$, $18_2$, $18_3$, or $18_4$ in the wanted mode excited in the aforementioned—primary—oscillation planes $XZ_1$, $XZ_2$ are always lower than the natural eigenfrequencies of bending oscillations of the measuring tubes, which are of equal modal order as the wanted mode, however, would be executed within the—, thus, secondary—oscillation planes $YZ_1$, $YZ_2$. In this way, in very simple yet very effective manner, a significant separating of the bending oscillation modes of the measuring tubes is achieved with respect to the respective resonance frequencies of the measuring tubes in the mutually perpendicular, here primary and secondary, oscillation planes of the inner part, and, respectively, the measuring tubes.

For such purpose, the measuring transducer comprises in an additional embodiment of the invention directly evident from the combination of FIGS. 7, 8a, 8b, a first, plate shaped, stiffening element $26_1$, which for tuning one or more resonance frequencies of bending oscillations of the first measuring tube $18_1$ and of the third measuring tube $18_3$ in a—secondary—third plane of oscillation $YZ_1$, in each case, essentially perpendicular to the—primary—oscillation planes $XZ_1$, or $XZ_2$, is affixed to the first measuring tube $18_1$ and to the third measuring tube $18_3$, and, indeed, in each case, to a segment $18'1$, $18'3$ of the first, or third measuring tube $18_1$, $18_3$ lying between the first oscillation exciter $5_1$ and the first flow divider $20_1$.

Additionally, the measuring transducer comprises, in the case of this embodiment of the invention, a second, plate shaped, stiffening element $26_2$, which, for tuning one or more resonance frequencies of bending oscillations of the second measuring tube $18_2$ and of the fourth measuring tube $18_4$ in a fourth plane of oscillation $YZ_2$—, insofar, thus also essentially parallel to the aforementioned third plane of oscillation $YZ_1$, secondary—essentially perpendicular to the —primary—oscillation planes $XZ_1$, or $XZ_2$, is affixed to the second measuring tube $18_2$ and to the fourth measuring tube $18_4$, namely, in each case, to segments $18'_2$, $18'_4$ of the second and, respectively, fourth measuring tube $18_2$, $18_4$ lying between the first oscillation exciter $5_1$ and the first flow divider $20_1$. Moreover, the measuring transducer includes a third, plate shaped, stiffening element $26_3$, which for tuning said resonance frequencies of the first measuring tube $18_1$ and of the third measuring tube $18_3$ in the third plane of oscillation $YZ_1$, is affixed to the first measuring tube $18_1$ and to the third measuring tube $18_3$—here, in each case, to segments $18''_1$, $18''_3$ of the first and, respectively, third measuring tube $18_1$, $18_3$ lying between the first oscillation exciter $5_1$ and the second flow divider $20_2$—, as well as a fourth, plate shaped, stiffening element $26_4$, which, for tuning said resonance frequencies of the second measuring tube $18_2$ and of the fourth measuring tube $18_4$ in the fourth plane of oscillation $YZ_2$, is affixed to the second measuring tube $18_2$ and to the fourth measuring tube $18_4$—here, in each case, to segments $18''_2$, $18''_4$ of the second and, respectively, fourth measuring tube $18_2$, $18_4$ likewise lying between the first oscillation exciter $5_1$ and the second flow divider $20_2$. For example, in such case, the first and second plate shaped stiffening elements $26_1$, $26_2$ can be placed, in each case, between the first oscillation sensor $19_1$ and the first flow divider $20_1$, especially also between the above mentioned first and third coupling elements $24_1$, $24_3$ of first type and the third and fourth plate shaped stiffening element $26_3$, $24_4$ can be placed, in each case, between the second oscillation sensor $19_2$ and the second flow divider $20_2$, especially also between the above mentioned second and fourth coupling elements $24_2$, $24_4$ of first type. The plate shaped stiffening elements can, for example, however, also be so arranged in the measuring transducer that, as well as also evident from the combination of FIGS. 7, 8a, 8b, the first and second plate shaped stiffening elements $26_1$, $26_2$ are, in each case, placed between the first coupling element $24_1$ of first type and the first oscillation sensor $19_1$; and the third and fourth plate shaped stiffening element $26_3$, $26_4$ are, in each case, placed between the second coupling element $24_2$ of first type and the second oscillation sensor $19_2$.

The plate shaped stiffening elements can be connected with the respective measuring tubes by soldering, brazing or welding. For example, the stiffening elements can, in such case, be connected in such a manner with the measuring tubes that, as well as also evident from the combination of FIGS. 7, 8a, 8b, the first plate shaped stiffening element $26_1$ is affixed to the segment $18'_1$ of the first measuring tube $18_1$ along one of its straight lateral surface elements lying between the first oscillation sensor $19_1$ and the first flow divider $20_1$—here, for instance, that element nearest the third measuring tube $18_3$—as well as to the segment $18'_3$ of the third measuring tube $18_3$ along one of its straight lateral surface elements lying equally between the first oscillation sensor $19_1$ and the first flow divider $20_1$—here, for instance, that element nearest the first measuring tube. In manner analogous thereto, then also the second plate shaped stiffening element $26_2$ is correspondingly affixed to the segments $18'_2$, $18'_4$ of the second and fourth measuring tubes $18_2$, $18_4$ lying, in each case, between the first oscillation sensor $19_1$ and the first flow divider $20_1$, the third plate shaped stiffening element $26_3$ to the segments $18''_1$, or $18''_3$ of the first and third measuring tubes $18_1$, $18_3$ lying, in each case, between the second oscillation sensor $19_2$ and the second flow divider $20_2$ and the fourth plate shaped stiffening element $26_4$ to the segments $18''_2$, $18''_4$ of the second and fourth measuring tubes $18_2$, $18_4$ lying, in each case, between the second oscillation sensor $19_2$ and the second flow divider $20_2$, and, indeed, in each case, along one of the straight lateral surface elements of the respective measuring tube. For achieving a sufficient separating of the resonance frequencies, each of the four plate shaped stiffening elements $26_1$, $26_2$, $26_3$, $26_4$ is, in a further embodiment of the invention, additionally, in each case, so embodied and so placed in the measuring transducer that it has a breadth corresponding to a smallest distance between the lateral surface elements of those two measuring tubes $18_1$, $18_3$, or $18_2$, $18_4$, along which it is, in each case, affixed, which breadth is smaller than a length of the respective plate shaped stiffening element $26_1$, $26_2$, $26_3$, $26_4$, measured in the direction of said lateral surface elements for example, in such a manner that the height amounts to less than 50%, especially less than 30%, said length. Furthermore, it is advantageous, when each of the four plate shaped stiffening elements $26_1$, $26_2$, $26_3$, $26_4$ additionally, in each case, is so embodied that the length of each of the plate shaped stiffening elements is greater, for example, more than twice, especially more than the 5 times, than an associated thickness of the said plate shaped stiffening element $26_1$, $26_2$, $26_3$, $26_4$—measured transversely to length and breadth. Alternatively, for affixing to the, in each case, nearest lying lateral surface elements, the stiffening elements can, for example, however, also, especially also be so embodied, along with ensuring the aforementioned breadth to thickness to length ratios, and so connected with the measuring tubes, that each of the stiffening elements contacts the respective two measuring tubes essentially tangentially, for example, in each case, along the farthest outwardly, or, in each case, along the farthest internally, lying lateral element of each of the measuring tubes.

As already mentioned, the measuring transducer of the measuring system of the invention can, in spite of its very compact construction, be deformed temporarily. Such—most often reversible—deformations can, for example, be caused thermally, for instance, as a result of different thermal coefficients of expansion of the materials, in each case, used for the measuring tubes and the transducer housing and/or as a result of temperature gradients between the measuring tubes and the transducer housing, and/or as a result of external forces, such as, for instance, clamping forces introduced via the connected pipeline into the measuring transducer, and/or high media pressure. As a result, such deformations, or distortions, of the measuring transducer can lead, especially, to translational expansions, of one or more of the measuring tubes, thus causing changes of the respective measuring tube lengths (lengthening, or shortening), and, associated therewith, to an undesired (because of the influencing of the oscillatory behavior of the measuring tubes in a manner harmful for the desired high accuracy of measurement) change of the instantaneous stress condition, namely the spatial distribution all mechanical stresses within the measuring transducer; this surprisingly also being true for the mentioned cases of large nominal diameters of more than 150 mm and comparatively short free oscillatory lengths $L_{18x}$ of less than 2000 mm, or comparatively large caliber to oscillatory length ratios, D18/$L_{18x}$, of more than 0.09.

Taking this into consideration, in the case of the measuring system of the invention, the measuring circuit is additionally adapted, in the case of producing the density measured value and/or the mass flow measured value, to correct a change (caused by aforementioned deformations of the measuring transducer, or the therefrom resulting changes of the stress state of the measuring transducer) of at least one characteristic variable, for instance, a signal frequency, of oscillation measurement signals delivered from the measuring transducer, for example, thus a change of their signal frequency and/or a change of a phase difference between the two oscillation measurement signals and/or between the at least one oscillation measurement signal and the at least one driver signal generated by means of the vibration sensor arrangement, consequently thus correspondingly to compensate for the damaging influence of deformations of the measuring transducer on the accuracy of measurement, with which density measured values, or mass flow measured values, are produced. The reference stress state can be ascertained, for example, earlier in the course of calibration of the measuring system, for example, in the form of a corresponding zero correction of the measuring circuit, performed manufacturer side, for instance, in the factory, and/or in the installed state, thus in the case of measuring transducer installed, operationally capable, into the pipeline.

According to an additional embodiment of the invention, the measuring transducer includes, consequently, additionally, a deformation measuring arrangement 30, electrically connected, for example, by means of connecting lines led through the mentioned feedthrough, with the transmitter electronics, for registering by sensor such a deformation of the measuring transducer, especially a deformation influencing an oscillatory behavior of the measuring tubes and/or effecting a change of at least one resonance frequency of the measuring transducer, for example, by direct registering by sensor a strain of one or more of the measuring tubes. The deformation measuring arrangement is, according to an additional embodiment of the invention, formed by means of at least one sensor element $30_1$, for instance, embodied as a semiconductor strain gage or a metal foil strain gage, for example, affixed externally on the measuring tube. Sensor element $30_1$ has an ohmic resistance dependent on deformation of the measuring transducer—here a strain of one or more of the measuring tubes. The sensor element, embodied especially in the form of strain gages, can be affixed, for example, directly on an outer surface of a wall of one of the measuring tubes adhesively, for example, by means of epoxide resin, for instance, in such a manner that that it is connected flushly with said measuring tube and/or it reacts to changes of the measuring tube length of the said measuring tube—here the respective minimum distance between the flow opening $20_{1A}$ of the first flow divider $20_1$ corresponding to the respective first measuring tube end and the flow opening $20_{2A}$ of the second flow divider $20_2$ corresponding to the respective second measuring tube end—by changing its ohmic resistance; in case required, however, for example, the sensor element can also be soldered to the respective measuring tube. Both for the case of adhering with adhesive as well as also for the case of soldering the at least one sensor element to the outer surface of the wall of the said measuring tube for thus directly registering during operation possible expansions of the respective measuring tube, the sensor element for the purpose of optimum registering of strain is affixed as much as possible in such a manner that it at least partially flushly contacts a detection region covered thereby on said surface of the wall of the tube, or that it is connected flushly, especially completely flushly, with a detection region covered thereby on said surface of the wall of the tube.

In an additional embodiment of the invention, it is additionally provided that at least one sensor element is so placed on the outer surface of the wall of one of the measuring tubes that a detection region on said surface of the wall of the tube and covered by said sensor element, in given cases, also flushly contacted thereby and/or flushly connected therewith, has at least one zone, in which the opposite equal bending oscillations excited by means of the exciter mechanism effect no bending stresses, or at least none significant for the accuracy of measurement. In other words, thus, the detection region of the at least one sensor element $30_1$ is so selected that it lies as exactly as possible on that neutral fiber, which is associated with the bendings of the said measuring tube accompanying the bending oscillations in the wanted mode. In the case of a measuring transducer of the measuring system of the invention, one of the said neutral fibers of each of the measuring tubes extends, as, among other things, also evident from the combination of FIGS. 3a, 3b, 4, 5a, 5b, 6a, 6b, for example, in each case, also in a quarter sector of each of the measuring tubes most remote from the longitudinal axis L of the measuring transducer and produced by means of cutting planes lying in the oscillation planes $XZ_1$, $XZ_2$, $YZ_1$, $YZ_2$. In the here shown examples of embodiments, thus, one of the said neutral fibers, consequently also a neutral fiber well suited for placing the sensor element $30_1$, of each of the measuring tubes thus, in each case, extends above a cutting plane corresponding to the plane of oscillation $XZ_1$, or, in each case, below a cutting plane corresponding to the plane of oscillation $XZ_2$, as well as, seen 7 in flow direction, in each case, on the right side of a cutting planes corresponding to the plane of oscillation $YZ_1$, or, in each case, on the left side of a cutting plane corresponding to the plane of oscillation $YZ_2$.

According to an additional embodiment of the invention, it is additionally provided that the deformation measuring arrangement is formed by means of at least two sensor elements $30_1$, $30_2$ with deformation dependent electrical resistance, especially essentially equally constructed and/or electrically serially connected, sensor elements $30_1$, $30_2$. In accordance therewith, the deformation measuring arrangement comprises, in at least in this case, a first sensor element $30_1$ having an ohmic resistance dependent on deformation of the measuring transducer and, for instance, again, embodied in the form of a semiconductor strain gage or a metal foil strain gage, and at least a second sensor element $30_2$ having an ohmic resistance dependent on deformation of the measuring transducer and, in given cases, in turn, embodied in the form of a semiconductor strain gage or a metal foil strain gage. Especially, it is, in such case, additionally provided that the first sensor element $30_1$ of the deformation measuring arrangement is affixed on the first measuring tube, preferably such that a translational strain of the first measuring tube $18_1$ changing the measuring tube length of the first measuring tube is registerable by means of the first sensor element $30_1$. The second sensor element $30_2$ of the deformation measuring arrangement is likewise affixed on one of the measuring tubes, preferably on other than the first measuring tube and/or in such a manner that also a translational strain of the said measuring tube changing the measuring tube length of the measuring tube carrying the second sensor element $30_2$ is registerable by means of the second sensor element $30_2$. Shown to be an especially suitable variant for the deformation measuring arrangement 30 has been, in such case, to affix the second sensor element $30_2$, as evident also from the combination of FIG. 5a, 5b, or 6b, on the measuring tube, which is spaced farthest laterally from that carrying the first sensor element $30_1$—in the example of an embodiment shown here, thus, the fourth measuring tube $18_4$. This is especially, therefore, very advantageous, because, for the desired accuracy of measurement, then indeed also two sensor elements can be sufficient for the deformation measuring arrangement. Alternatively, or in supplementation, the at least two sensor elements of the deformation measuring arrangement 30 are additionally so placed in the measuring transducer that the first sensor element and the second sensor element lie in one, namely one and the same, imaginary cutting plane of the measuring transducer, in which one extends to the mentioned longitudinal axis L of the measuring transducer. In the example of an embodiment shown here, the first sensor element $30_1$ and the second sensor element $30_2$ are, in such case, additionally so placed that they are, as also evident from FIG. 6b, removed from the longitudinal axis L extending in the shared, imaginary, cutting plane as equidistantly as possible, or that the deformation measuring arrangement 30 formed by means of the two sensor elements is essentially point symmetric with reference to said longitudinal axis.

Figure 9:
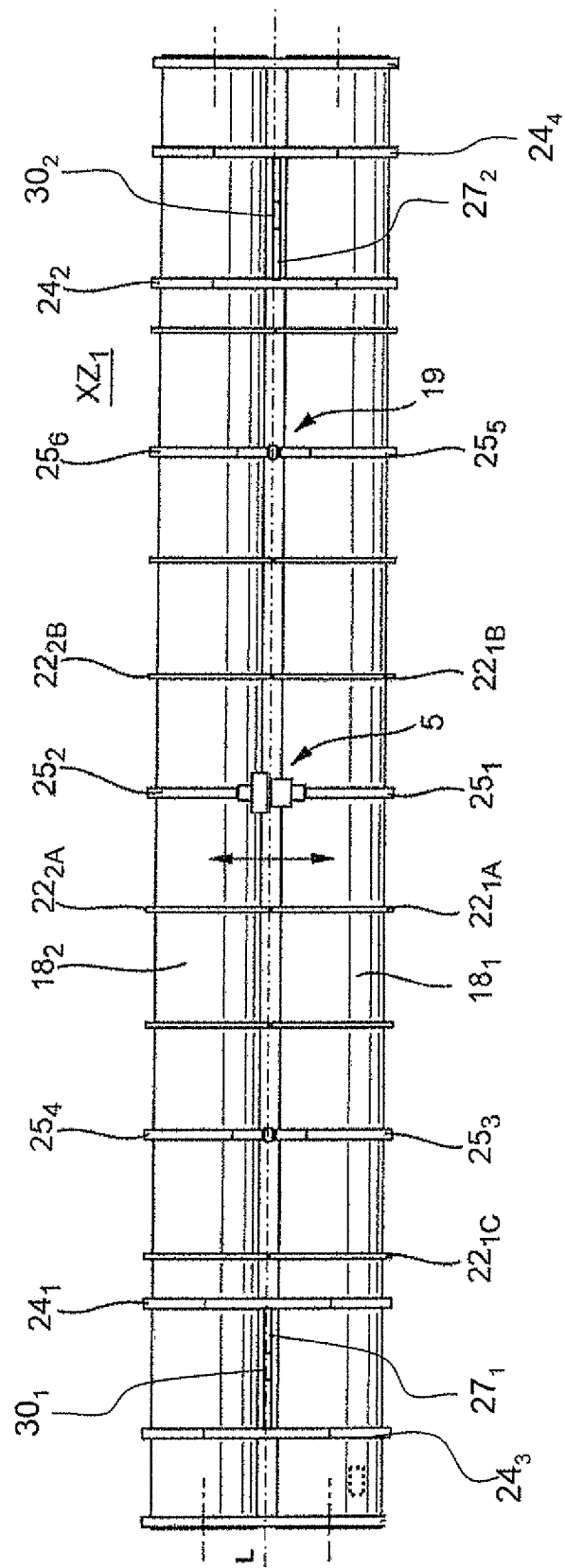
FIG. 9 shows a side view of a further development of an inner part for a measuring transducer according to FIG. 4.

For the mentioned case, in which the measuring transducer is provided with plate shaped stiffening elements $26_1$, $26_2$, $26_3$, $26_4$ for tuning the natural eigenfrequencies of bending oscillations of the measuring tubes $18_1$, $18_2$, $18_3$, or $18_4$ in the oscillation planes $YZ_1$, $YZ_2$, the at least one sensor element of the deformation measuring arrangement 30, or at least one of the sensor elements of the deformation measuring arrangement 30 can, however, be affixed, for example, also on one of the said stiffening elements $26_1$, $26_2$, $26_3$, $26_4$, for instance, in such a manner that the sensor element reacts to a strain of the measuring tubes connected with said stiffening element by changing its ohmic resistance. For example, the first sensor element $30_1$ of the deformation measuring arrangement 30 can, as shown schematically in FIG. 9, in such case, be placed on the first stiffening element $27_1$, so that the first sensor element $30_1$, as a result, reacts to a strain of the first and/or third measuring tube, along with a corresponding strain of the first stiffening element $27_1$, by changing its ohmic resistance, and/or the second sensor element $30_2$ of the deformation measuring arrangement can be placed on the second stiffening element $27_2$, so that the second sensor element, as a result, reacts to a strain of the second and/or fourth measuring tube, along with a corresponding strain of the second stiffening element, by changing its ohmic resistance.

For the other mentioned case, in which, on the inlet side and on the outlet side, in each case, at least two coupling elements of first type are provided, according to an additional embodiment of the invention, the first and third coupling elements of first type are connected by means of a first coupler connecting element $27_1$ (for example, a rod- or plate shaped element extending spaced and parallel relative to the measuring tubes and providing a connection supplemental to the connection in any event brought about by the measuring tubes) affixed, in each case, thereto. The connecting element can then serve (also alternatively or in supplementation to the already mentioned positions for sensor elements of the deformation measuring arrangement, as, for instance, on one of the measuring tubes or on one of the plate shaped stiffening elements $26_1$, $26_2$, $26_3$, $26_4$ pairwise connecting the measuring tubes) for holding and exciting the at least one sensor element of the deformation measuring arrangement. In accordance therewith, in another embodiment of the invention, the at least one sensor element of the deformation measuring arrangement is affixed on the first coupler connecting element, for instance, in such a manner that said sensor element reacts to a strain of one or more of the measuring tubes, transmitted to the coupler connecting element, by changing its ohmic resistance. For the purpose of increasing the sensitivity and/or for the purpose of the detection of asymmetric deformations of the measuring transducer, it can additionally be advantageous to provide also yet a second coupler connecting element $27_2$ (for example, again, a rod, or plate, shaped connecting element, and/or a connecting element extending parallel to the measuring tubes and/or one constructed equally to the first coupler connecting element) affixed both to the second as well as also to the fourth coupling element, so that, in the case of at least two sensor elements being advantageous for the deformation measuring arrangement 30, then, for example, the first sensor element of the deformation measuring arrangement can be affixed in the above-described manner on the first coupler connecting element $27_1$ and/or the second sensor element of the deformation measuring arrangement 30 can be affixed equally on the second coupler connecting element $27_2$.

Alternatively or in supplementation to the application of one or more sensor elements $30_1$, $30_2$ affixed, in each case, on a measuring tube, the deformation measuring arrangement 30 can additionally, however, also be formed by means of at least one sensor element affixed on the transducer housing and reacting to possible deformations of the same with a changes of an ohmic resistance.

For the multiply mentioned case, in which the deformation measuring arrangement 30 is formed by two or more sensor elements, for example, sensor elements, in each case, implemented as strain gages, additionally, the first sensor element and the second sensor element of the deformation measuring arrangement 30 are, in an additional embodiment of the invention, electrically connected with one another by means of at least one wire extending within the transducer housing, especially in such a manner that the at least two or, in given cases, yet more, sensor elements of the deformation measuring arrangement are electrically interconnected in series; this especially for the purpose, on the one hand, of increasing the sensitivity of the deformation arrangement 30 to the deformation(s) to be registered and, on the other hand, to keep the total number of connecting lines to be led through the mentioned feedthrough to the transmitter electronics 12 as small as possible. Particularly for the mentioned case, in which the second or a further sensor element of the deformation measuring arrangement 30 is directly affixed to the transducer housing for the purpose of direct registering of possible deformations thereof, it can be of advantage to provide the sensor element on the housing with another sensitivity to strain than the first sensor element affixed, for instance, to the measuring tube, for example, by using different resistances for the first and second sensor elements, and, thus, correspondingly to weight the different registered deformations, or their influence on the oscillatory behavior of the measuring tubes, thus, the therewith formed tube arrangement, already at the stage of the detecting.

Alternatively, or in supplementation, to the aforementioned application of one or more sensor elements, for instance, sensor elements in the form of strain gages and/or sensor elements reacting to expansions of one or more of the measuring tubes with changes of a respective ohmic resistance, the measuring circuit can ascertain the change of the stress state in the measuring transducer and/or the deviation of the instantaneous stress state in the measuring transducer from the reference stress state predetermined therefor also by means of the at least one oscillation measurement signal produced by the vibration sensor arrangement for representing vibrations of the measuring tubes and, in the generating of the measured values, corresponding corrections can be made, for example, by having the driver circuit actively excite two- or multimodal oscillations of the measuring tubes by means of the exciter mechanism, so that, as a result, the at least one oscillatory signal accordingly has two or more signal components of different signal frequencies. Changes of their respective contributions to the total spectrum of the oscillation signal, or changes of amplitudes of individual oscillation modes relative to one another can, in such case, serve as a measure for the deformation of the measuring transducer to be detected, thus as measure for the change of its stress state, or as a measure for the measuring errors resulting from said change of the stress condition.

For separating changes of the oscillatory behavior of the measuring tubes attributable to thermally related deformation and thermally related change of the flexibility, or of the E-modulus, of individual components of the measuring transducer from changes of its stress state attributable rather to deformations of the measuring transducer attributable to the action of external forces, consequently from changes of its stress state attributable to the action of external forces, the measuring system includes, in an additional embodiment of the invention, additionally, a temperature measuring arrangement 40, especially one formed by means of a resistance thermometer affixed on one of the measuring tubes and/or by means of a resistance thermometer affixed on the transducer housing, for registering a temperature of the measuring transducer, especially a temperature influencing an oscillatory behavior of the measuring tubes and/or effecting a change of at least one resonance frequency of at least one of the measuring tubes, especially temperature of one or more of the measuring tubes. For example, the temperature measuring arrangement can be formed by means of a resistance thermometer, especially one affixed on one of the measuring tubes, wherein the resistance thermometer has an ohmic resistance dependent on a temperature of the measuring transducer, especially a temperature of one of the measuring tubes; alternatively or in supplementation, the temperature measuring arrangement 40 can, however, be formed, for example, also by means of one or more thermocouples correspondingly placed in the measuring transducer.

Moreover, as quite usual in the case of measuring transducers of the type being discussed, supplementally to the oscillation sensors of the vibration measuring arrangement, as well as the, in given cases, present, sensor elements of the deformation measuring arrangement, or the temperature measuring arrangement, other, especially auxiliary-, or disturbance variables registering, sensors can be provided in the measuring transducer. Examples of these other sensors include acceleration sensors and/or pressure sensors, by means of which, for example, the ability of the measuring transducer to function, and/or changes of the sensitivity (as a result of cross sensitivities, or external disturbances) of the measuring transducer for the measured variables primarily to be registered, especially the mass flow rate and/or the density, can be monitored and, in given cases, correspondingly compensated.

Through the application of four instead of, such as to this point in time, two measuring tubes flowed through in parallel, in combination with a measuring circuit registering also mechanical stresses and, respectively, deformation, it is then also possible to manufacture, cost effectively, measuring systems of the described type also for large mass flow rates, or with large nominal diameters of far over 250 mm, on the one hand, with an accuracy of measurement of over 99.8% at an acceptable pressure drop, especially of about 1 bar or less, and, on the other hand, to keep the installed mass, as well as also the empty mass, of measuring transducers used therein sufficiently within limits, that, in spite of large nominal diameter, manufacture, transport, installation, as well as also operation can always still occur economically sensibly. Especially also through implementing of above explained measures for further developing the invention—individually or also in combination—, measuring systems of the type being discussed can also, in the case of large nominal diameter, be so embodied and so dimensioned, that a mass ratio of the measuring transducer, as defined by a ratio of the mentioned empty mass of the measuring transducer to a total mass of the inner part formed by means of the four measuring tubes and the thereon mounted exciter mechanism and vibration sensor arrangement, as well as, in given cases, additional components of the measuring transducer affixed on the measuring tubes and influencing their oscillatory behavior can be kept directly smaller than 3, especially smaller than 2.5.

The invention claimed is:

1. A measuring system for measuring density and/or mass flow rate and/or viscosity of a medium flowing, at least at times, in a pipeline, said measuring system comprising:
  a measuring transducer of the vibration-type for producing oscillation measurement signals; and
  transmitter electronics electrically coupled with said measuring transducer for activating the measuring transducer and for evaluating oscillation measurement signals delivered from the measuring transducer, wherein:
  said measuring transducer includes:
  a transducer housing, of which an inlet-side, first housing end is formed by means of an inlet-side, first flow divider including exactly four, mutually spaced, flow openings, and an outlet-side, second housing end is formed by means of an outlet-side, second flow divider including exactly four, mutually spaced, flow openings;
  exactly four measuring tubes, which are connected to said flow dividers for guiding flowing medium along flow paths connected in parallel, of which measuring tubes a first measuring tube opens with an inlet-side, first measuring tube end into a first flow opening of said first flow divider and with an outlet-side, second measuring tube end into a first flow opening of said second flow divider, a second measuring tube opens with an inlet-side, first measuring tube end into a second flow opening of said first flow divider and with an outlet-side, second measuring tube end into a second flow opening of said second flow divider, a third measuring tube opens with an inlet-side, first measuring tube end into a third flow opening of said first flow divider and with an outlet-side, second measuring tube end into a third flow opening of said second flow divider, and a fourth measuring tube opens with an inlet-side, first measuring tube end into a fourth flow opening of said first flow divider and with an outlet-side, second measuring tube end into a fourth flow opening of said second flow divider;

an electromechanical, exciter mechanism for producing and/or maintaining mechanical oscillations of the four measuring tubes, said exciter mechanism being embodied in such a manner that therewith said first measuring tube and said second measuring tube are excitable during operation to execute opposite equal bending oscillations in a shared, imaginary, first plane of oscillation and said third measuring tube and said fourth measuring tube during operation to opposite equal bending oscillations in a shared, imaginary, second plane of oscillation; and a vibration sensor arrangement reacting to vibrations of the measuring tubes for producing oscillation measurement signals representing vibrations; and said transmitter electronics includes:

a driver circuit for said exciter mechanism; and a measuring circuit, wherein:

said measuring circuit is adapted to generate, with application of at least one oscillation measurement signal delivered from the vibration sensor arrangement, a density measured value representing the density of the medium and/or a mass flow measured value representing the mass flow rate; and, for producing the density measured value and/or the mass flow measured value, said measuring circuit is adapted to correct a change of at least one characteristic variable which changes are caused by at least one of:

a change of a stress state in said measuring transducer; and a deviation of an instantaneous stress state in said measuring transducer from reference stress state predetermined therefor.

2. The measuring system as claimed in claim 1, wherein:
said change of the stress condition in said measuring transducer, and/or said deviation of the instantaneous stress condition in said measuring transducer from the reference stress state predetermined therefor results from a deformation of said measuring transducer.

3. The measuring system as claimed in claim 1, wherein:
said the measuring circuit ascertains the change of the stress condition in said measuring transducer, and/or the deviation of the instantaneous stress state in said measuring transducer from the reference stress state predetermined therefor, by means of at least one oscillation measurement signal produced by said vibration sensor arrangement; and/or said measuring circuit corrects the change of the at least one characteristic variable of the oscillation measurement signals being delivered from said measuring transducer and resulting from said change of the stress state in said measuring transducer and deviation of the instantaneous stress state in said measuring transducer from the reference stress state predetermined therefor, respectively, by means of at least one oscillation measurement signal produced by said vibration sensor arrangement.

4. The measuring system as claimed in claim 1, further comprising:
a deformation measuring arrangement for registering deformation of said measuring transducer.

5. The measuring system as claimed in claim 4, wherein:
said deformation measuring arrangement includes a sensor element with an ohmic resistance dependent on deformation of said measuring transducer.

6. The measuring system as claimed in claim 5, wherein:
said sensor element is affixed on one of said measuring tubes.

7. Measuring system as claimed in claim 5, wherein:
said at least one sensor element is affixed on an outer surface of said measuring tube.

8. The measuring system as claimed in claim 5, wherein:
said at least one sensor element is affixed on an outer surface of said measuring tube-in in such a manner, that it at least partially flushly contacts a detection region covered thereby on said surface of the wall of the tube, and/or that it is connected flushly with a detection region covered thereby on said surface of the wall of the tube, and/or that a detection region, which is covered by said sensor element on said surface of the wall of the tube, especially a region flushly contacted by said sensor element and/or therewith flushly connected, has at least one zone, in which the opposite equal bending oscillations excited by means of said exciter mechanism cause no bending stress.

9. The measuring system as claimed in claim 4, wherein:
each of said measuring tubes exhibits, in each case, a measuring tube length, which corresponds to a respective minimum distance between the flow opening of said first flow divider corresponding to the respective first measuring tube end and the flow opening of said second flow divider corresponding to the respective second measuring tube end; and changes of said measuring tube length of one or more of the measuring tubes are registerable by means of the deformation measuring arrangement.

10. The measuring system as claimed in claim 9, wherein:
said deformation measuring arrangement for registering changes of the measuring tube length of one or more of said measuring tubes comprises at least one strain gage affixed on one of the measuring tubes.

11. The measuring system as claimed in claim 4, wherein:
said deformation measuring arrangement is formed by means of at least one strain gage mechanically coupled with at least one of said measuring tubes.

12. The measuring system as claimed in claim 1, wherein:
said deformation measuring arrangement is formed by means of a first sensor element with an ohmic resistance dependent on deformation of said measuring transducer and by means of at least a second sensor element with an ohmic resistance dependent on deformation of said measuring transducer.

13. The measuring system as claimed in claim 12, wherein:
said first sensor element of said deformation measuring arrangement is affixed on said first measuring tube.

14. The measuring system as claimed in claim 13, wherein:
said second sensor element of said deformation measuring arrangement is affixed on other than said first measuring tube.

15. The measuring system as claimed in claim 4, wherein:
said measuring circuit ascertains the change of the stress state in said measuring transducer and/or the deviation of the instantaneous stress state in said measuring transducer from the reference stress state predetermined therefor based on deformation of said measuring transducer registered by said deformation measuring arrangement; and/or said measuring circuit corrects the change of the at least one characteristic variable of the oscillation measurement signals delivered from said measuring transducer resulting from change of the stress state in said measuring transducer and/or deviation of the instantaneous stress state in said measuring transducer from the reference stress state predetermined therefor based on a deformation of said measuring transducer registered by said deformation measuring arrangement.

16. The measuring system as claimed in claim 1, further comprising:
a temperature measuring arrangement for registering a temperature of said measuring transducer.

17. The measuring system as claimed in claim 16, wherein:
said temperature measuring arrangement is formed by means of a resistance thermometer with an ohmic resistance dependent on a temperature of said measuring transducer.

18. The measuring system as claimed in claim 16, wherein:
said measuring circuit ascertains the change of the stress state in said measuring transducer and/or the deviation of the instantaneous stress state in said measuring transducer from the reference stress state predetermined therefor based on a temperature of said measuring transducer registered by the temperature measuring arrangement; and/or
said measuring circuit corrects the change of the at least one characteristic variable of the oscillation measurement signals delivered from said measuring transducer, which change results from the change of the stress state in said measuring transducer, or from the deviation of the instantaneous stress state in said measuring transducer from the reference stress state predetermined therefor, based on a temperature of said measuring transducer registered by said temperature measuring arrangement.

19. The measuring system as claimed in claim 1, wherein:
said measuring transducer further comprises: a first, plate shaped, stiffening element, which, for tuning resonance frequencies of bending oscillations of said first measuring tube and of said third measuring tube in a third plane of oscillation essentially perpendicular to the first and/or second plane of oscillation, is affixed to said first measuring tube and to said third measuring tube, and, indeed, in each case, to a segment of said first, or third measuring tube lying between said first oscillation exciter and said first flow divider;
a second, plate shaped, stiffening element, which, for tuning resonance frequencies of bending oscillations of said second measuring tube and of said fourth measuring tube in a fourth plane of oscillation essentially perpendicular to the first and/or second plane of oscillation, is affixed to said second measuring tube and to said fourth measuring tube, and, indeed, in each case, to a segment of said second, or fourth measuring tube lying between said first oscillation exciter and said first flow divider;
a third, plate shaped, stiffening element, which, for tuning resonance frequencies of bending oscillations of said first measuring tube and of said third measuring tube in the third plane of oscillation, is affixed to said first measuring tube and to said third measuring tube, and, indeed, in each case, to a segment of said first, or third measuring tube lying between said first oscillation exciter and said second flow divider; and
a fourth, plate shaped, stiffening element, which, for tuning resonance frequencies of bending oscillations of said second measuring tube and of said fourth measuring tube in the fourth plane of oscillation, is affixed to said second measuring tube and to said fourth measuring tube, and, indeed, in each case, to a segment of said second, or fourth measuring tube lying between said first oscillation exciter and said second flow divider.

20. The measuring system as claimed in claim 19, wherein:
said at least one sensor element of said deformation measuring arrangement is affixed on one of said stiffening elements.

21. The measuring system as claimed in claim 19, wherein:
said first sensor element of said deformation measuring arrangement is affixed on said first stiffening element; and/or said second sensor element of said deformation measuring arrangement is affixed on said second stiffening element.

22. The measuring system as claimed in claim 19, wherein:
said first plate shaped stiffening element is affixed to the segment of said first measuring tube lying between said first oscillation sensor and said first flow divider along a straight lateral surface element of said first measuring tube as well as to the segment of said third measuring tube lying between said first oscillation sensor and said first flow divider along a straight lateral surface element of said third measuring tube;
said second plate shaped stiffening element is affixed to the segment of said second measuring tube lying between said first oscillation sensor and said first flow divider along a straight lateral surface element of said second measuring tube as well as to the segment of said fourth measuring tube lying between said first oscillation sensor and the first flow divider along a straight lateral surface element of said fourth measuring tube;
said third plate shaped stiffening element is affixed to the segment of said first measuring tube lying between said second oscillation sensor and said second flow divider along a straight lateral surface element of said first measuring tube as well as to the segment of said third measuring tube lying between said second oscillation sensor and said second flow divider along a straight lateral surface element of said third measuring tube; and
said fourth plate shaped stiffening element is affixed to the segment of said second measuring tube lying between said second oscillation sensor and said second flow divider along a straight lateral surface element of said second measuring tube as well as to the segment of said fourth measuring tube lying between said second oscillation sensor and said second flow divider along a straight lateral surface element of said fourth measuring tube.

23. The measuring system as claimed in claim 22, wherein:
each of the four plate shaped stiffening elements is, in each case, so embodied and so placed in said measuring transducer that it has a breadth corresponding to a smallest distance between the lateral surface elements of two measuring tubes, along which it is, in each case, affixed, wherein the breadth is smaller, especially by more than half, than a length of said plate shaped stiffening element measured in the direction of said lateral surface elements.

24. The measuring system as claimed in claim 23, wherein:
each of the four plate shaped stiffening elements is, in each case, so embodied that the length of each of the plate shaped stiffening elements is greater their thickness.

25. The measuring system as claimed in claim 1, wherein:
a nominal diameter, of said measuring transducer, which corresponds to a caliber of the pipeline, in whose course said measuring transducer is to be inserted, amounts to more than 100 mm.

26. The measuring system as claimed in claim 1, wherein: said transducer housing is embodied essentially tubularly.

27. The measuring system as claimed in claim 26, wherein: said transducer housing exhibits a greatest housing inner diameter, which is greater than 150 mm.

28. The measuring system as claimed in claim 27, wherein:
a housing to measuring tube inner diameter ratio, of said measuring transducer, defined by a ratio of the largest housing inner diameter, to a caliber, of said first measuring tube is greater than 3.

29. The measuring system as claimed in claim 27, wherein:
a housing inner diameter to nominal diameter ratio, of said measuring transducer, defined by a ratio of the largest housing inner diameter, to the nominal diameter, of said measuring transducer is less than 1.5.

30. The measuring system as claimed in claim 1, wherein: an empty mass, of said measuring transducer is greater than 200 kg.

31. The measuring system as claimed in claim 30, wherein:
a mass to nominal diameter ratio, of said measuring transducer, defined by a ratio of the empty mass, of said measuring transducer to the nominal diameter, of said measuring transducer is less than 2 kg/mm.

32. The measuring system as claimed in claim 1, wherein:
a nominal diameter to installed length ratio, of said measuring transducer, defined by a ratio of the nominal diameter of said measuring transducer to the installed length of said measuring transducer is less than 0.3.

33. The measuring system as claimed in claim 1, wherein:
said first flow divider includes a flange for connecting said measuring transducer to a pipe segment of the pipeline serving for supplying medium to said measuring transducer and said second flow divider includes a flange for connecting said measuring transducer to a pipe segment of the pipeline serving for removing medium from said measuring transducer.

34. The measuring system as claimed in claim 33, wherein:
each of said flanges includes, in each case, a sealing surface for fluid tight connecting of said measuring transducer with the, in each case, corresponding tube segment of the pipeline; and a distance between the sealing surfaces of said two flanges defines an installed length, of said measuring transducer.

35. The measuring system as claimed in claim 1, further comprising:
a first coupling element of a first type, which, for forming inlet-side oscillation nodes at least for vibrations of said first measuring tube and for thereto opposite equal vibrations of said second measuring tube, is affixed at least to said first measuring tube and to said second measuring tube and spaced on the inlet side both from said first flow divider as well as also from said second flow divider; and
a second coupling element of the first type, which, for forming outlet-side oscillation nodes at least for vibrations of said first measuring tube and for thereto opposite equal vibrations of said second measuring tube, is affixed at least to said first measuring tube and to said second measuring tube and spaced on the outlet side both from said first flow divider as well as also from said second flow divider, as well as also from said first coupling element.

36. The measuring system as claimed in claim 35, wherein:
said first coupling element of the first type is also affixed to said third measuring tube and to said fourth measuring tube; said second coupling element of the first type is affixed to said third measuring tube and to said fourth measuring tube; and/or
a center of mass of said first coupling element of the first type is spaced a distance from a center of mass of said measuring transducer essentially equal to a distance, with which a center of mass of said second coupling element of the first type is spaced from said center of mass of said measuring transducer.

37. The measuring system as claimed in claim 35, wherein:
said first plate shaped stiffening element is placed between said first coupling element of the first type and said first oscillation sensor;
said second plate shaped stiffening element is placed between said first coupling element of the first type and said first oscillation sensor;
said third plate shaped stiffening element is placed between said second coupling element of the first type and said second oscillation sensor; and
said fourth plate shaped stiffening element is placed between said second coupling element of the first type and said second oscillation sensor.

38. The measuring system as claimed in claim 35, further comprising:
a third coupling element of a first type, which, for forming inlet-side oscillation nodes at least for vibrations, especially bending oscillations, of said third measuring tube and thereto opposite equal vibrations of said fourth measuring tube, is affixed at least to said third measuring tube and to said fourth measuring tube and spaced on the inlet side both from said first flow divider as well as also from said second flow divider; and
a fourth coupling element of the first type, which, for forming outlet-side oscillation nodes at least for vibrations of said third measuring tube and thereto opposite equal vibrations of said fourth measuring tube, is affixed at least to said third measuring tube and to said fourth measuring tube and spaced on the outlet side both from said first flow divider as well as also from said second flow divider, as well as also from said third coupling element of the first type.

39. The measuring system as claimed in claim 38, further comprising:
a first coupler connecting element affixed both to said first coupling element of the first type as well as also to said third coupling element of the first type.

40. The measuring system as claimed in claim 39, wherein:
said at least one sensor element of said deformation measuring arrangement is affixed on said first coupler connecting element.

41. The measuring system as claimed in claim 39, further comprising:
a second coupler connecting element affixed both to said second coupling element of the first type as well as also to said fourth coupling element of the first type.

42. The measuring system as claimed in claim 41, wherein:
said first sensor element of said deformation measuring arrangement is affixed on said first coupler connecting element; and/or said
second sensor element of said deformation measuring arrangement is affixed on said second coupler connecting element.

43. The measuring system as claimed in claim 38, wherein:
said third coupling element of the first type is affixed to said first measuring tube as well as also to said second measuring tube and spaced from said first and second coupling elements of the first type, and said fourth coupling element of the first type is affixed to said first measuring tube as well as also to said second measuring tube and spaced from said first and second coupling elements of the first type are; and/or
a center of mass of said third coupling element of the first type is spaced a distance from a center of mass of said measuring transducer, which is essentially equal to a distance with which a center of mass of said fourth coupling element of the first type is spaced from said center of mass of said measuring transducer.

44. The measuring system as claimed in claim 38, wherein:
said first plate shaped stiffening element is placed between said first coupling element of the first type and said third coupling element of the first type; said second plate shaped stiffening element is placed between said first coupling element of the first type and said third coupling element of the first type; said third plate shaped stiffening element is placed between said second coupling element of the first type and said fourth coupling element of the first type; and said fourth plate shaped stiffening element is placed between said second coupling element of the first type and said fourth coupling element of the first type.

45. The measuring system as claimed in claim 35, wherein:
a free oscillatory length, of said first measuring tube, especially of each of said measuring tubes, corresponding to a minimum distance between said first coupling element of the first type and said second coupling element of the first type amounts to less than 2500 mm.

46. The measuring system as claimed in claim 45, wherein:
an oscillation length to installed length ratio, of said measuring transducer, defined by a ratio of the free oscillatory length, of said first measuring tube to the installed length, of said measuring transducer amounts to more than 0.55.

47. The measuring system as claimed in claim 1, further comprising:
a first coupling element of a second type, of said first measuring tube and of thereto equal frequency vibrations of said third measuring tube, is affixed to said first measuring tube and to said third measuring tube and spaced both from said first coupling element of the first type as well as also from said second coupling element of the first type; as well as
a second coupling element of the second type, which, for synchronizing vibrations of said second measuring tube, and of thereto equal frequency vibrations of said fourth measuring tube, is affixed to said second measuring tube and to said fourth measuring tube and spaced both from said first coupling element of the first type as well as also from said second coupling element of the first type, as well as also from said first coupling element of the second type.

48. The measuring system as claimed in claim 47, wherein:
said first coupling element of the second type is affixed to said first measuring tube as well as to said third measuring tube in the region of 50% of a minimum distance between said first coupling element of the first type and said second coupling element of the first type; and
said second coupling element of the second type is affixed to said second measuring tube and to said fourth measuring tube in the region of 50% of a minimum distance between said first coupling element of the first type and said second coupling element of the first type.

49. The measuring system as claimed in claim 47, further comprising:
a third coupling element of the second type, which, for synchronizing vibrations, especially bending oscillations, of said first measuring tube and of thereto equal frequency vibrations of said third measuring tube, is affixed to said first measuring tube and to said third measuring tube and spaced both from said first coupling element of the first type as well as also from said second coupling element of the first type, as well as also from said first coupling element of the second type; and
a fourth coupling element of the second type, which, for synchronizing vibrations, especially bending oscillations, of said second measuring tube, and of thereto equal frequency vibrations of said fourth measuring tube, is affixed to said second measuring tube and to said fourth measuring tube and spaced from said first and second coupling elements of the first type as well as also from said second and third coupling element of the second type.

50. The measuring system as claimed in claim 49, further comprising:
a fifth coupling element of the second type, which, for synchronizing vibrations of said first measuring tube and of thereto equal frequency vibrations of said third measuring tube, is affixed to said first measuring tube and to said third measuring tube and spaced both from said first and second coupling elements of the first type as well as also from said first and third coupling elements of the second type; and
a sixth coupling element of the second type, which, for synchronizing vibrations of said second measuring tube, and of thereto equal frequency vibrations of said fourth measuring tube, is affixed to said second measuring tube and to said fourth measuring tube and spaced both from said first and second coupling elements of the first type as well as also from said second, fourth and fifth coupling elements of the second type.

51. The measuring system as claimed in claim 47, wherein:
said exciter mechanism includes a first oscillation exciter and second oscillation exciter and each of said first and second oscillation exciters is held, in each case, on two mutually opposing coupling elements of the second type.

52. The measuring system as claimed in claim 51, wherein:
said first oscillation exciter and also said second oscillation exciter are held, in each case, on said first and second coupling elements of the second type.

53. The measuring system as claimed in claim 49, wherein:
the vibration sensor arrangement includes an inlet-side first oscillation sensor, an outlet-side second oscillation sensor, an inlet-side third oscillation sensor, and an outlet-side fourth oscillation sensor, said first oscillation sensor and also said third oscillation sensor are held, in each case, on said third and fourth coupling elements of the second type.

54. The measuring system as claimed in claim 50, wherein:
the vibration sensor arrangement includes an inlet-side first oscillation sensor, an outlet-side second oscillation sensor, an inlet-side third oscillation sensor, and an outlet-side fourth oscillation sensor, said second oscillation sensor and said fourth oscillation sensor are held, respectively, on said fifth and sixth coupling elements of the second type.

55. The measuring system as claimed in claim 1, wherein:
a measuring tube length of said first measuring tube, corresponding to a minimum distance between said first flow opening of said first flow divider and said first flow opening of said second flow divider, amounts to more than 1000 mm.

56. The measuring system as claimed in claim 55, wherein:
a measuring tube length to installed length ratio of said measuring transducer, defined by a ratio of the measuring tube length of said first measuring tube to the installed length of said measuring transducer, amounts to more than 0.7.

57. The measuring system as claimed in claim 1, wherein:
each of said four measuring tubes exhibits a caliber, which amounts to more than 60 mm.

58. The measuring system as claimed in claim 57, wherein:
a caliber to oscillatory length ratio of said measuring transducer, defined by a ratio of the caliber of said first measuring tube to the free oscillatory length of said first measuring tube, amounts to more than 0.07.

59. The measuring system as claimed in claim 57, wherein:
a caliber to installed length ratio of said measuring transducer, defined by a ratio of the caliber of said first measuring tube to the installed length of said measuring transducer, amounts to more than 0.02.

60. The measuring system as claimed in claim 1, wherein:
said vibration sensor arrangement includes an inlet-side, first oscillation sensor and an outlet-side, second oscillation sensor.

61. The measuring system as claimed in claim 60, wherein:
said vibration sensor arrangement includes an inlet-side third oscillation sensor and an outlet-side fourth oscillation sensor.

62. The measuring system as claimed in claim 61, wherein:
said first and third oscillation sensors are electrically serially interconnected in such a manner that a common oscillation measurement signal represents shared inlet-side oscillations of said first and third measuring tubes relative to said second and fourth measuring tubes; and said second and fourth oscillation sensors are electrically serially interconnected in such a manner that a common oscillation measurement signal represents shared outlet-side oscillations of said first and third measuring tubes relative to said second and fourth measuring tubes.

63. The measuring system as claimed in claim 61, wherein:
said third oscillation sensor is formed by means of a permanent magnet held on said third measuring tube and a cylindrical coil permeated by the magnetic field of the permanent magnet and held on said fourth measuring tube; and said fourth oscillation sensors is formed by means of a permanent magnet held on said third measuring tube and a cylindrical coil permeated by the magnetic field and of the permanent magnet and held on said fourth measuring tube.

64. The measuring system as claimed in claim 2, wherein:
a measuring length of said measuring transducer corresponding to a minimum distance between said first oscillation sensor and said second oscillation sensor amounts to more than 500 mm.

65. The measuring transducer as claimed in claim 64, wherein:
a measuring length to installed length ratio of said measuring transducer, defined by a ratio of the measuring length to the installed length of said measuring transducer, amounts to more than 0.3.

66. The measuring system as claimed in claim 57, wherein:
a caliber to measuring length ratio, of said measuring transducer, defined by a ratio of the caliber, of said first measuring tube to the measuring length, of said measuring transducer, amounts to more than 0.05, especially more than 0.09.

67. The measuring system as claimed in claim 45, wherein:
a measuring length to oscillatory length ratio of said measuring transducer, defined by a ratio of the measuring length of said measuring transducer to the free oscillatory length of said first measuring tube, amounts to more than 0.6.

68. The measuring system as claimed in claim 2, wherein:
said first plate shaped stiffening element is placed between said first oscillation sensor and said first flow divider;
said second plate shaped stiffening element is placed between said first oscillation sensor and said first flow divider;
said third plate shaped stiffening element is placed between said second oscillation sensor and said second flow divider; and
said fourth plate shaped stiffening element is placed between said second oscillation sensor and said second flow divider.

69. The measuring system as claimed in claim 1, wherein:
said four measuring tubes are of equal construction as regards material of their tube walls, and/or as regards their geometric dimensions.

70. The measuring system as claimed in claim 69, wherein:
said third measuring tube and said fourth measuring tube are different from said first measuring tube and said second measuring tube as regards their respective geometric dimensions.

71. The measuring system as claimed in claim 1, wherein:
each of said measuring tubes exhibits a bending oscillation fundamental mode of minimum bending oscillation resonance frequency; and the minimum bending oscillation resonance frequencies, at least of said first and second measuring tubes are essentially equal and the minimum bending oscillation resonance frequencies, at least of said third and fourth measuring tube are essentially equal.

72. The measuring system as claimed in claim 71, wherein:
the minimum bending oscillation resonance frequencies, of all four measuring tubes are essentially equal.

73. The measuring system as claimed in claim 72, wherein:
the minimum bending oscillation resonance frequencies, of said four measuring tubes are only pairwise equal.

74. The measuring system as claimed in claim 73, wherein:
said exciter mechanism includes a first oscillation exciter and a second oscillation exciter.

75. The measuring system as claimed in claim 74, wherein:
said first and second oscillation exciters are electrically serially interconnected in such a manner that a common driver signal excites shared oscillations of said first and third measuring tubes relative to said second and fourth measuring tubes.

76. The measuring system as claimed in claim 74, wherein:
said first oscillation exciter is formed by means of a permanent magnet held on said first measuring tube and a cylindrical coil permeated by the magnetic field of the permanent magnet and held on said second measuring tube; and said second oscillation exciter is formed by means of a permanent magnet held on said third measuring tube and a cylindrical coil permeated by the magnetic field of the permanent magnet and held on said fourth measuring tube.

77. The measuring system as claimed in claim 76, wherein:
the vibration sensor arrangement includes an inlet-side first oscillation sensor, an outlet-side second oscillation sensor, an inlet-side third oscillation sensor, and an outlet-side fourth oscillation sensor.

78. The measuring system as claimed in claim 74, wherein:
said oscillation exciters are equally constructed.

79. The measuring system as claimed in claim 77 wherein:
said first oscillation exciter and said second oscillation exciter are held in such a manner that a minimum distance between said first and second oscillation exciters is more than twice as large as a tube outer diameter of said first measuring tube.

80. The measuring system as claimed in claim 79, wherein:
said first oscillation sensor and said third oscillation sensor are held in such a manner that a minimum distance between said first and third oscillation sensors is more than twice as large as a tube outer diameter of said first measuring tube.

81. The measuring system as claimed in claim 80, wherein:
said second oscillation sensor and said fourth oscillation sensor are in such a manner that a minimum distance between said second and fourth oscillation sensors is more than twice as large as a tube outer diameter of said first measuring tube.

82. The measuring system as claimed in claim 1, wherein:
each of said four measuring tubes is so arranged, that: a smallest lateral distance each of said four measuring tubes from a housing side wall of said transducer housing amounts, in each case, to greater than 3 mm and/or greater than twice a respective tube wall thickness; and/or that: a smallest lateral distance between two neighboring measuring tubes amounts, in each case, to greater than 3 mm and/or greater than the sum of their respective tube wall thicknesses; and/or
each of the flow openings is so arranged, that: a smallest lateral distance of each of said flow openings from a housing side wall of said transducer housing amounts, in each case, to greater than zero, especially greater than 3 mm and/or greater than twice a smallest wall thickness of said measuring tubes; and/or that: a smallest lateral distance between said flow openings amounts to greater than 3 mm and/or greater than twice a smallest wall thickness of said measuring tubes.

83. The measuring system as claimed in claim 1, further comprising:
a plurality of annular stiffening elements serving for increasing the oscillation quality factor of said measuring tubes, of which each is so placed on exactly one of said measuring tubes that it grips around such along one of its peripheral surface elements.

84. The measuring system as claimed in claim 83, wherein:
at least four annular stiffening elements are placed on each of said measuring tubes; and/or said stiffening elements are so placed in said measuring transducer that two adjoining stiffening elements mounted on the same measuring tube are spaced from one another a distance, which amounts to at least 70% of a tube outer diameter of said measuring tube, at most, however, 150% of such tube outer diameter.

85. The measuring system as claimed in claim 1, wherein:
a mass ratio, of an empty mass, of the total measuring transducer to an empty mass of said first measuring tube is greater than 10; and/or each of said two flow dividers exhibits a mass of more than 20 kg; and/or an empty mass of said first measuring tube is greater than 20 kg; and/or said first and second measuring tubes are of equal construction at least as regards material of their tube walls and/or as regards their geometrical dimensions; and/or said third and the fourth measuring tube are of equal construction at least as regards material of their walls and/or as regards their geometrical dimensions; and/or a material of the tube walls of said four measuring tubes is, at least partially, titanium and/or zirconium and/or duplex steel and/or super duplex steel; and/or said transducer housing, said flow divider and walls of said measuring tubes are, in each case, steel; and/or said four flow openings of said first flow divider are so arranged that imaginary areal centers of gravity associated with cross sectional areas of said flow openings of said first flow divider form the vertices of an imaginary square, wherein said cross sectional areas lie in a shared, imaginary, cutting plane of said first flow divider extending perpendicular to a longitudinal axis of said measuring transducer; and/or said four flow openings of said second flow divider are so arranged that imaginary areal centers of gravity associated with cross sectional areas of said flow openings of said second flow divider form the vertices of an imaginary square, wherein said cross sectional area lie in a shared, imaginary, cutting plane of said second flow divider extending perpendicular to a longitudinal axis of said measuring transducer; and/or a middle segment of said transducer housing is formed by means of a straight tube.

86. The use of a measuring system according to claim 1, for measuring density and/or mass flow rate of a medium flowing in a pipeline, at least at times, with a mass flow rate of more than 2200 t/h.

87. The measuring system as claimed in claim 1, wherein:
the measuring circuit is adapted to correct a change caused by at least one of: a change of a stress state accompanying thermally related deformation of the measuring transducer, and a deformation of said measuring transducer effected by external forces.

88. The measuring system as claimed in claim 1, wherein:
the measuring circuit is adapted to correct a change caused by a deviation of an instantaneous stress state in said measuring transducer from a reference stress state ascertained earlier in the course of a calibration of the measuring system performed manufacturer side and/or in the installed position.

89. The measuring system as claimed in claim 1, wherein:
said at least one characteristic variable is selected from: signal frequency of oscillation measurement signals delivered from the measuring transducer and/or a change of a phase difference between two oscillation measurement signals generated by the vibration sensor arrangement.

90. The measuring system as claimed in claim 4, wherein:
the deformation measuring arrangement-is electrically connected with said transmitter electronics and/the deformation measuring arrangement-is or mechanically coupled with at least one of said measuring tubes.

91. The measuring system as claimed in claim 4, wherein:
the deformation measuring arrangement-is adapted to register a strain of one or more of said measuring tubes.

92. The measuring system as claimed in claim 91, wherein:
the strain is caused by at least one of: a thermally related deformation, a deformation effected by forces acting externally on said measuring transducer, a deformation influencing an oscillatory behavior of said measuring tubes, a deformation effecting a change of at least one resonance frequency of at least one of said measuring tubes, and a translational deformation.

93. The measuring system as claimed in claim 5, wherein:
the sensor element of said deformation measuring arrangement includes a semiconductor strain gage.

94. The measuring system as claimed in claim 5, wherein:
the sensor element of said deformation measuring arrangement includes a metal foil strain gage.

95. The measuring system as claimed in claim 5, wherein:
the ohmic resistance of said sensor element is dependent on strain of one or more of said measuring tubes.

96. The measuring system as claimed in claim 6, wherein:
said sensor element is adhesively affixed on said one of said measuring tubes.

97. The measuring system as claimed in claim 12, wherein:
the first and second sensor elements of said deformation measuring arrangement are electrically connected with one another by means of at least one wire extending within said transducer housing, and/or the first and second sensor elements of said deformation measuring arrangement are of equal construction; and/or the first and second sensor elements of said deformation measuring arrangement lie in an imaginary cutting plane of said measuring transducer, in which extends a longitudinal axis of said measuring transducer parallel to a principal flow axis of said measuring transducer.

98. The measuring system as claimed in claim 13, wherein:
said second sensor element of said deformation measuring arrangement is affixed on the measuring tube spaced farthest laterally therefrom.

* * * * *